(12) United States Patent  (10) Patent No.: US 8,477,910 B2
Feldman et al.  (45) Date of Patent: Jul. 2, 2013

(54) SYSTEM AND METHOD FOR LOCATION IDENTIFICATION

(75) Inventors: Daniel Feldman, San Jose, CA (US); David Pincu, Holon (IL); Tamir Langer, Givataim (IL)

(73) Assignee: Microsemi Corp.—Analog Mixed Signal Group Ltd., Hod Hasharon (IL)

( * ) Notice: Subject to any disclaimer, the term of this patent is extended or adjusted under 35 U.S.C. 154(b) by 920 days.

(21) Appl. No.: 12/605,343

(22) Filed: Oct. 25, 2009

(65) Prior Publication Data

US 2010/0046506 A1 Feb. 25, 2010

Related U.S. Application Data

(63) Continuation-in-part of application No. 11/676,314, filed on Feb. 19, 2007, now Pat. No. 8,073,110.

(60) Provisional application No. 60/775,776, filed on Feb. 23, 2006.

(51) Int. Cl.
*H04M 11/04* (2013.01)
(52) U.S. Cl.
CPC ..................................... *H04M 11/04* (2013.01)
USPC ............. 379/37; 379/90.01; 379/45; 370/352
(58) Field of Classification Search
USPC ........... 379/37–45; 340/12.32, 12.33, 310.12, 340/568.2, 687; 370/410, 908, 352, 395.2; 375/260, 286
See application file for complete search history.

(56) References Cited

U.S. PATENT DOCUMENTS

| | | | |
|---|---|---|---|
| 6,650,622 B1 | 11/2003 | Austerman, III | |
| 6,650,901 B1 | 11/2003 | Schuster et al. | |
| 6,678,357 B2 | 1/2004 | Stumer et al. | |
| 6,868,265 B2 | 3/2005 | Zodnik | |
| 7,145,439 B2 | 12/2006 | Darshan | |
| 7,376,734 B2 | 5/2008 | Caveney | |
| 7,455,527 B2 | 11/2008 | Nordin et al. | |
| 2003/0156577 A1 | 8/2003 | Dunlap et al. | |
| 2004/0057425 A1 | 3/2004 | Brouwer et al. | |
| 2004/0073597 A1 | 4/2004 | Caveney | |
| 2004/0147232 A1 | 7/2004 | Zodnik | |
| 2005/0027806 A1 | 2/2005 | Schunemann | |
| 2005/0063519 A1 | 3/2005 | James | |
| 2005/0086546 A1 | 4/2005 | Darshan et al. | |
| 2005/0141431 A1 | 6/2005 | Caveney et al. | |
| 2005/0141570 A1* | 6/2005 | Gass | 370/908 |
| 2005/0159036 A1 | 7/2005 | Caveney et al. | |
| 2005/0169248 A1 | 8/2005 | Truesdale | |
| 2005/0286893 A1* | 12/2005 | Horiuchi et al. | 398/71 |

OTHER PUBLICATIONS

Cisco Emergency Responder Version 1.2(2), Downloaded Jun. 20, 2005, Cisco Systems, Inc., San Jose, California.

(Continued)

*Primary Examiner* — Melur Ramakrishnaiah
(74) *Attorney, Agent, or Firm* — Simon Kahn

(57) ABSTRACT

A telecommunications outlet providing location identification in a local area network, the telecommunications outlet constituted of: a network side connection adapted to be connected to a networking device via horizontal cabling; a data terminal side connection adapted to be connected to a data terminal equipment; a control circuitry; a memory adapted for storage of multi-bit data; a transmitter in communication with the memory; and a first switch responsive to the control circuitry, the first switch arranged in a first mode to connect data from the network side connection to the data terminal side connection and in a second mode to connect data from the transmitter to the network side connection and disconnect data from the network side connection to the data terminal side connection.

21 Claims, 26 Drawing Sheets

OTHER PUBLICATIONS

Interim VoIP Architecture for Enhanced 9-1-1 Service (i2), NENA 08-001, Issue 1, Dec. 6, 2005, National Emergency Number Association, Arlington, Virginia.
International Search Report for Parallel Parent PCT application PCT/IL2007.000221, issued by WIPO Jul. 6, 2007—European Patent Office.
Written Opinion for Parallel Parent PCT application PCT/IL2007.000221, issued by WIPO Jul. 6, 2007—European Patent Office.
3COM IntelliJack Switch Family Data Sheet, 3Com Corporation, Marlborough, MA, Apr. 2006.
3COM NJ205 Intellijack Switch Management Feature: Location Mapping, 3Com Corporation, Marlborough, MA, Sep. 2003.
3COM Case Study, Central Kitsap School District (USA), 3Com Corporation, Marlborough, MA, 2006.
Cisco Systems White Paper—LLDP-MED and Cisco Discovery Protocol, Cisco Systems, Inc., San Jose, California, Jun. 2006.

* cited by examiner

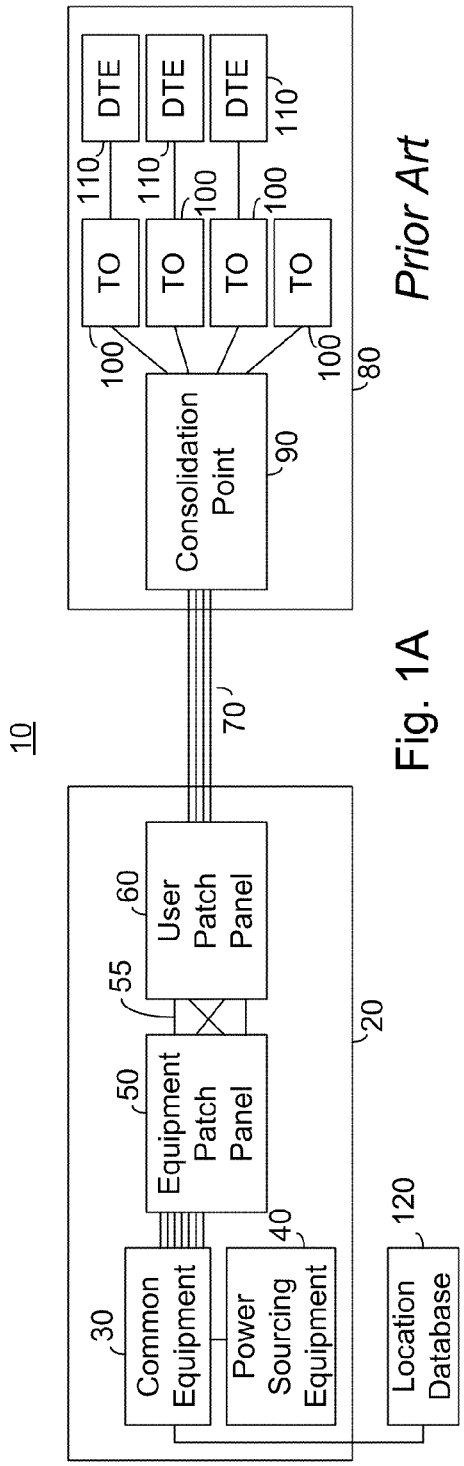

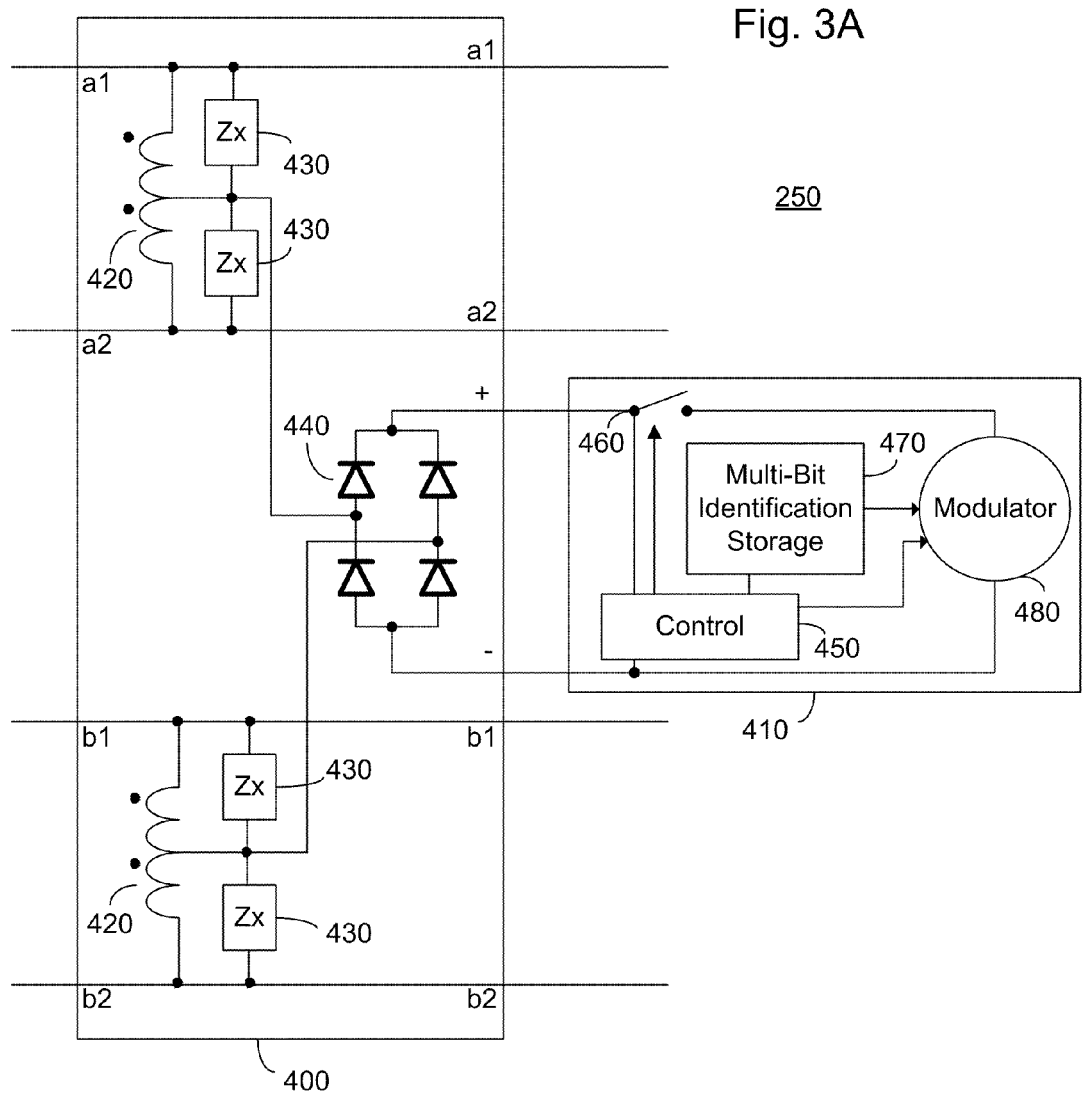

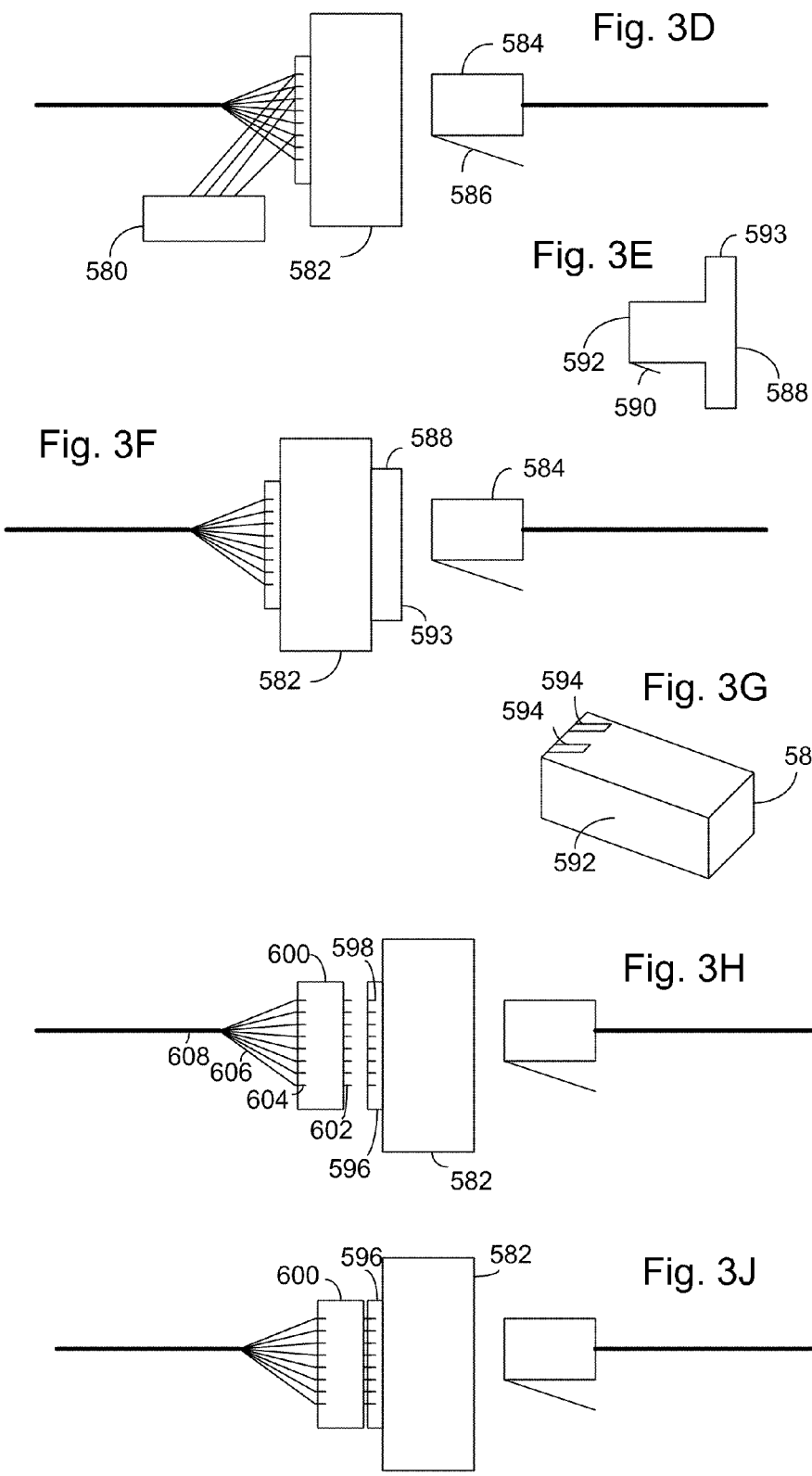

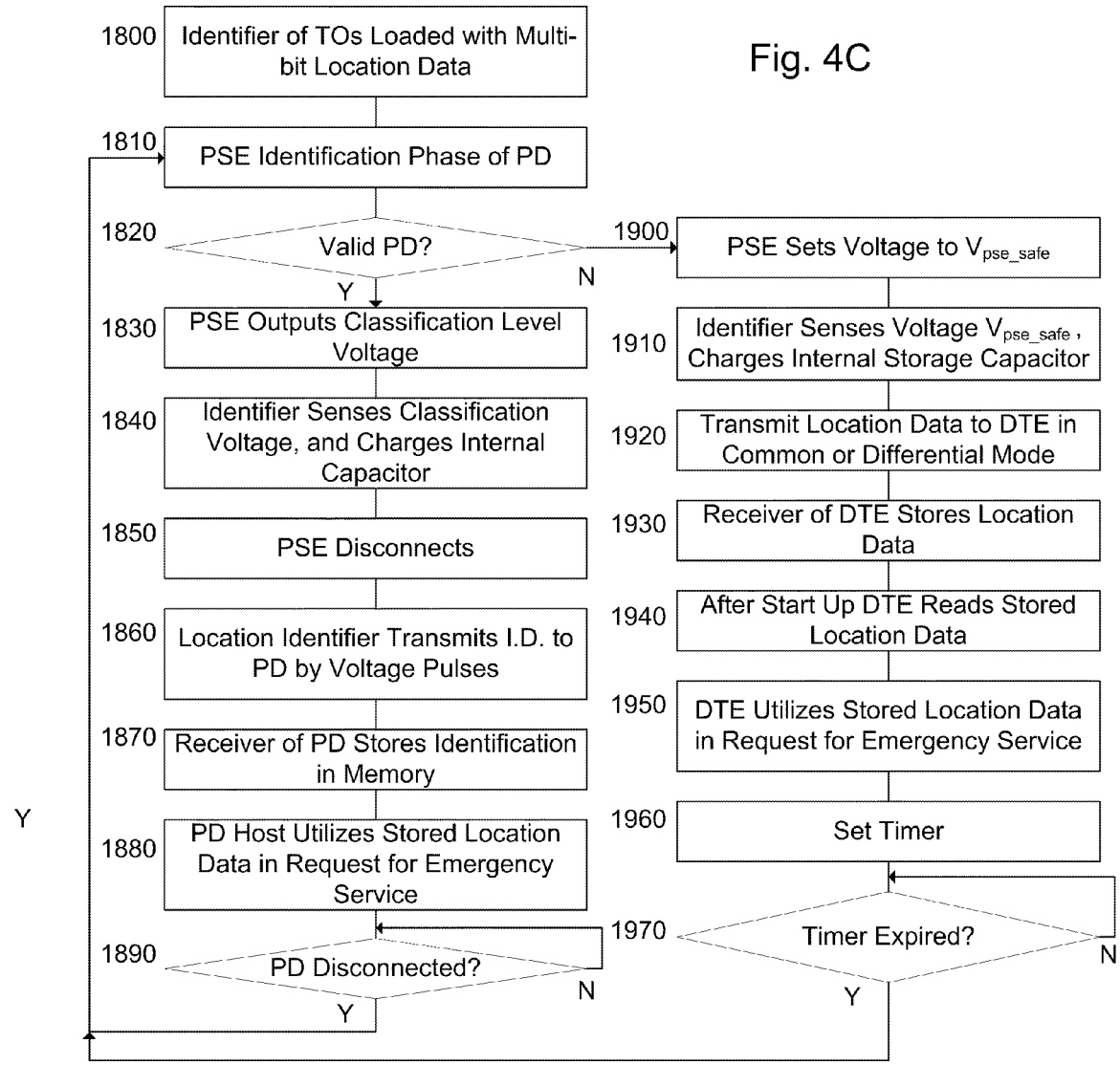

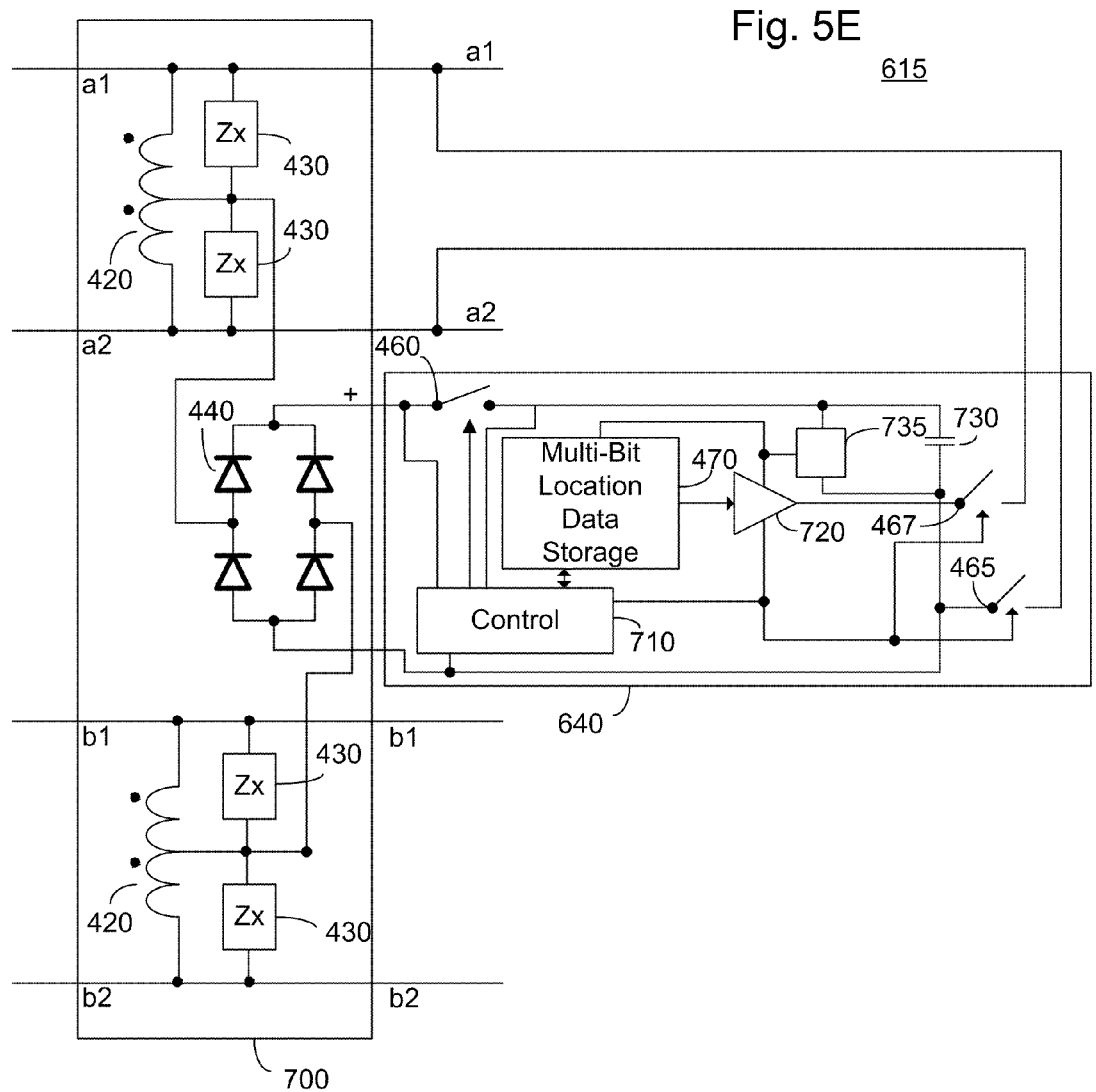

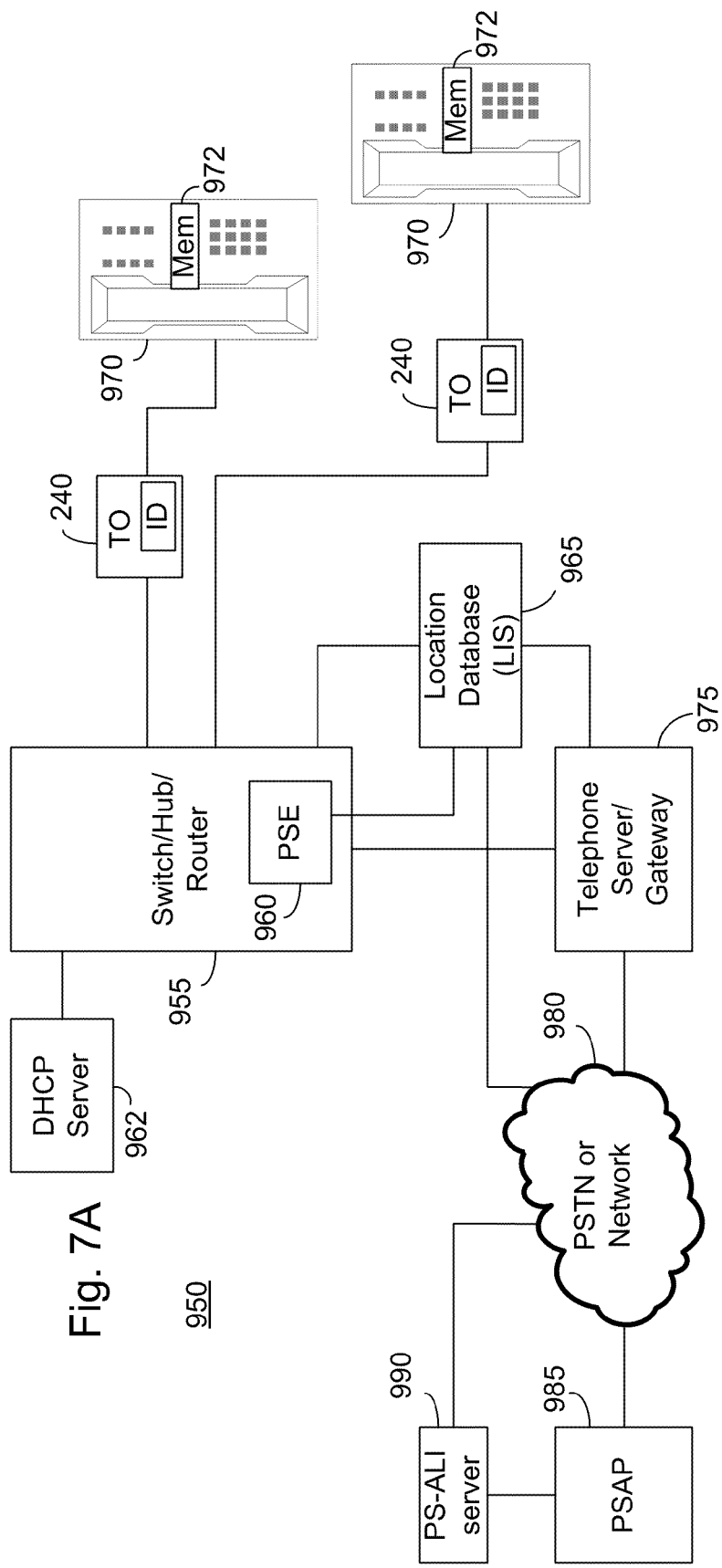

SYSTEM AND METHOD FOR LOCATION IDENTIFICATION

CROSS-REFERENCE TO RELATED APPLICATION

This application is a continuation in part of U.S. patent application Ser. No. 11/676,314 filed Feb. 19, 2007, which claims priority from provisional U.S. Patent Application Ser. No. 60/775,776 filed Feb. 23, 2006, both of which are entitled "System and Method for Location Identification". The entire contents of each of the above applications are incorporated herein by reference.

BACKGROUND OF THE INVENTION

The present invention relates to the field of physical location identification suitable for use with emergency services, and more particularly to a system and method of providing an identifier associated with a fixed physical location of a wall jack.

The use of local area networks, and in particular Ethernet based networks, continues to expand. Additionally, telephony utilizing voice over Internet protocol (VoIP) is rapidly becoming common for new workplace installations at least in part due to its reduced cost of installation and flexibility. VoIP advantageously is powered by power over Ethernet (PoE), as embodied in the IEEE 802.3af-2003 standard, published by the Institute of Electrical and Electronics Engineers, Inc., New York, N.Y. the entire contents of which is incorporate herein by reference. The above standard defines a power sourcing equipment (PSE) which identifies, optionally classifies, and optionally powers a powered device (PD). A PD is defined by the above standard as a device that is either drawing power or requesting power by participating in the PD detection algorithm. The device may comprise a data terminal equipment (DTE), and a DTE receiving power over the communication cabling is often termed a PD.

By utilizing both PoE and VoIP, a single set of low power communication cables provides both computing and telephone connectivity to users throughout an office. VoIP further allows a user to utilize telephone service via wireless access points, which are advantageously powered via PoE. VoIP further allows users to plug in to any Ethernet connection and obtain phone service.

One downside of the expanding use of VoIP is the difficulty in handling emergency calls, and in particular identifying the location of callers to emergency services. The user may connect from any point in the network, and may further be connected via a wireless access point. Traditional telephony has been designed with features which support delivering crucial location information to emergency operators in Public Safety Answering Points (PSAPs). Unfortunately, VoIP, which allows for voice to be handled over data connections, is not designed to support delivering the crucial location information. For example, a roaming user in a wide area network may log in from a different city, and be connected as if he were locally located. In the event of an emergency call, the PSAP in the wrong city would then be notified, resulting in a delayed response or complete lack of response, from emergency services.

As the public adopts VoIP, emergency calls, also known in the United States as E-9-1-1 calls, will increasingly originate from VoIP users. The National Emergency Number Association VoIP-Packet Technical Committee has published a standard entitled "Interim VoIP Architecture for Enhanced 9-1-1 Services (i2)", available from National Emergency Number Association (NENA), Arlington Va., the entire contents of which is incorporated herein by reference. The standard defines an architecture for the interconnection of VoIP domains with existing Emergency Services Network infrastructure in support of the migration toward end-to-end emergency calling over the VoIP networks between callers and PSAPs.

During system installation, cables are laid throughout the premises to be wired, with the cables being terminated at a work area in a telecommunications outlet/connector (TO) as defined by TIE/EIA 568 published by the Telecommunications Industry Association 2001 of Arlington, Va., and by ISO/IEC 11801 the entire contents of both of which are incorporated herein by reference. The TO is connected via horizontal cabling, optionally through at most one each of a transition or consolidation point, a user patch panel and an equipment patch panel to the common equipment which typically comprises a switch/hub or bridge. Optionally, a midspan device may be connected between the common equipment and one user patch panel to provide power. The connections between the common equipment and the TO may be changed by rearranging patch cords connected between any of the common equipment, the user patch panel and the equipment patch panel. In an installation in which both a user patch panel and an equipment patch panel are provided, or a midspan device and a user patch panel are provided, the connections between the common equipment and the TO are typically changed by rearranging patch cords between the equipment patch panel or the midspan device and the user patch panel. The prior art teaches that any such changes are manually uploaded to a database which is designed to supply information to the PSAP within 24 hours. Unfortunately, this is a manual task separate and apart from the reconnection, and is thus liable to be neglected or in error. It is understood that the TO is typically not moved, as moving the TO entails construction work such as moving of walls as well as re-cabling from the transition or consolidation point, or the equipment room.

Large commercial entities typically have a large number of computers, telephones, printers and other network connected electronic equipment, generally referred to as assets. Tracking the location and connection of each of the assets in the network is known as asset management. Prior art systems require special equipment and patch cords in order to register the actual interconnection of network based assets. Such a requirement adds cost, and reduces flexibility. It would be desirable to further provide asset management, wherein the connection path from at least the PSE to the TO is made known. Further preferably the connection path from the common equipment to the TO and/or the DTE or VoIP endpoint is made known. The approach being developed for E-9-1-1 services is based on the premise that the VoIP endpoint, defined as an endpoint IP device that is used to originate an emergency call, is the entity most qualified to store and manage its own location information. Unfortunately, prior art methods rely on a human update of any changes in the connection between the common equipment port and the VoIP Endpoint. In the event that these changes, which commonly occur when moving or changing location of personnel, and are commonly known as "moves, adds and changes", are not properly reflected in the location database or location information server (LIS) the location information sent by the VoIP endpoint will be in error. Such an error may result in a delay in the provisioning of life saving emergency services.

U.S. Patent Application Publication S/N US 2004/0073597 A1 published Apr. 15, 2004 to Caveney et al, issued Apr. 14, 2009 as U.S. Pat. No. 7,519,000, the entire contents of which is incorporated herein by reference, is addressed to a system for managing and documenting a local area communications network which deploys power sourcing equipment and powered devices by the use of active electronic modules, the active having an Ethernet controller and Power over Ethernet forwarding capabilities. The requirement for an Ethernet controller, particularly one with signal regeneration capability, adds to the expense of such a solution.

U.S. Pat. No. 6,650,622 issued Nov. 18, 2003 to Austermann, III et al., the entire contents of which is incorporated herein by reference, is addressed to a communication system for generating and monitoring data over pre-existing conductors in cables between associated pieces of networked computer equipment. The system is not integrated with power over Ethernet. Additionally, asset management functionality is accomplished with a plurality of sender tags and a decoder plug associated with a computer or other DTE, and an immovable object, which is costly and difficult to implement.

What is needed therefore, and is not provided by the prior art, is a system and method providing location information which may be associated with a DTE, and in particular a DTE making an emergency call. Preferably, a DTE comprising either data or voice equipment is automatically associated with location information when plugged in, thus facilitating the transfer of correct location information in the event of an emergency call. Further preferably the system and method should not require attaching additional equipment to a DTE.

SUMMARY OF THE INVENTION

Accordingly, it is a principal object of the present invention to overcome the disadvantages of prior art. This is provided in the present invention by a system and method for identifying the physical location of a DTE connected in a local area network by providing a location identifier associated with each TO. In one embodiment, the TO is provided with a network side connection adapted to be connected to a networking device via horizontal cabling and a data terminal side connection adapted to be connected to a data terminal equipment. A control circuitry, memory and a transmitter are further provided, the control circuitry in communication with the transmitter, and the transmitter in communication with the memory. A switch is provided, responsive to the control circuitry, the switch arranged in a first mode to allow for data passage from the network side connection to the data terminal side connection, and in a second mode to connect the transmitter to the network side connection, preferably by disconnecting the data terminal side connection. The control circuitry is arranged to monitor characteristics of electric power available from the network side connection, and control the switch to connect the transmitter to the network side connection, and enable operation of the transmitter responsive to a predetermined condition of the electric power. The transmitter, when enabled, is operative to transmit multi-bit identifying information stored in the memory towards the network side connection. In an exemplary embodiment the predetermined condition of the electric power is indicative of a power sourcing equipment associated with power over Ethernet transitioning from a detection and/or classification mode to supplying power.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of a principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 1A illustrates a high level block diagram of a system according to the prior art providing PoE from an endpoint PSE;

FIG. 1B illustrates a high level block diagram of a system according to the prior art providing PoE from a midspan PSE;

FIG. 3A illustrates a high level schematic of a first embodiment of the location identifier of FIGS. 2A, 2B in accordance with a principle of the invention;

FIG. 3D illustrates a high level schematic view of a first embodiment of a location identifier according to a principle of the invention connected to a connection block of a TO of the prior art;

FIG. 3E illustrates a high level schematic view of a second embodiment of a location identifier according to a principle of the invention, the second embodiment being designed to be inserted into the face end of a TO of the prior art, prevent user removal and accept a removable plug;

FIG. 3F illustrates a high level schematic view of the location identifier of FIG. 3E inserted within a TO of the prior art;

FIG. 3G illustrates a high level schematic view of the location identifier of FIG. 3E and in particular the latching mechanism to prevent user removal according to a principle of the invention;

FIG. 3H illustrates a high level schematic view of a third embodiment of a location identifier according to a principle of the invention, the third embodiment being designed to be inserted between the connector block of a TO of the prior art and horizontal cabling for connection to a DTE;

FIG. 3J illustrates a high level schematic view of the location identifier of FIG. 3H connected to the connector block of the TO of the prior art;

FIG. 4C illustrates a high level flow chart of an embodiment of the operation of the location identifier of FIG. 4A to transmit multi-bit location data towards the DTE utilizing a classification voltage in accordance with a principle of the invention;

FIG. 5E illustrates a high level block diagram of an embodiment of location identifier of FIG. 4A in which a PSE side interface and a DTE side interface are combined into a combined interface in accordance with a principle of the invention, the location identifier being arranged for differential signaling on a single pair;

FIG. 7A illustrates a high level block diagram of a VoIP system utilizing the location database of FIGS. 2A, 2B, 6A and 6B in accordance with a principle of the invention;

DETAILED DESCRIPTION OF PREFERRED EMBODIMENTS

Figure 2A:
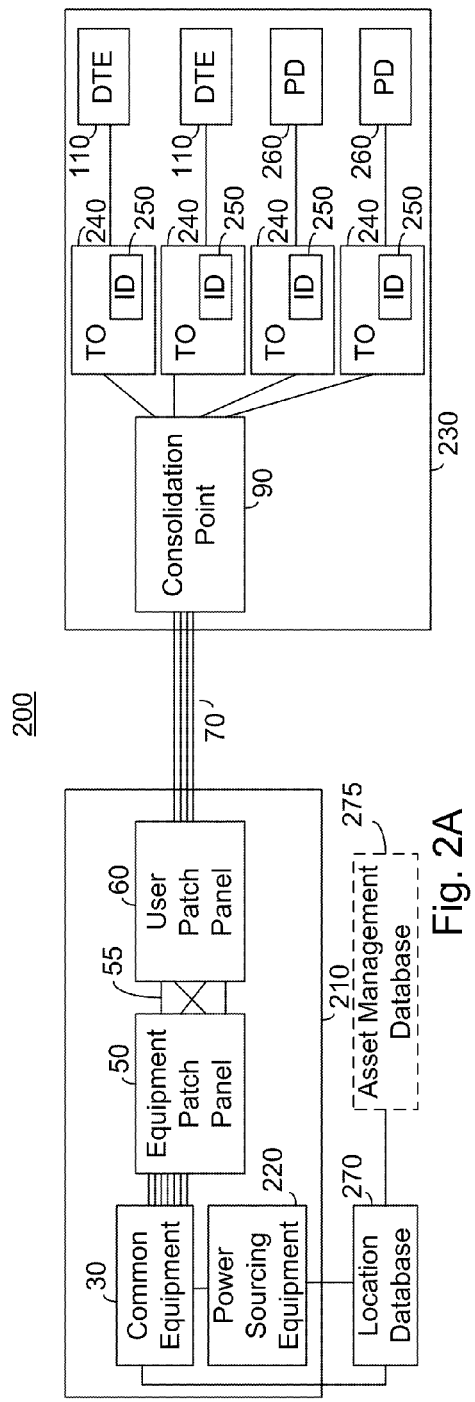
FIG. 2A illustrates a high level block diagram of an embodiment of the invention comprising a location identifier associated with a TO, the location identifier being operative to transmit a multi-bit location data associated with a location towards an endpoint PSE in accordance with a principle of the invention.

The present embodiments enable a system and method for identifying the physical location of a DTE connected in a local area network by providing a location identifier associated with each TO. The location identifier is loaded with multi-bit location data. A current limited voltage source associated with a floor distributor, and preferably further associated with either a common equipment of the floor distributor or a midspan device, is further provided. The location identifier, responsive to a pre-determined voltage level, or a signal, from the current limited voltage source transmits the multi-bit location data. In an exemplary embodiment the current limited voltage source is a PSE.

In one embodiment, the TO is provided with a network side connection adapted to be connected to a networking device via horizontal cabling and a data terminal side connection adapted to be connected to a data terminal equipment. A control circuitry, memory and a transmitter are further provided, the control circuitry in communication with the transmitter, and the transmitter in communication with the memory. A switch is provided, responsive to the control circuitry, the switch arranged in a first mode to allow for data passage from the network side connection to the data terminal side connection, and in a second mode to connect the transmitter to the network side connection, preferably by disconnecting the data terminal side connection. The control circuitry is arranged to monitor characteristics of electric power available from the network side connection, and control the switch to connect the transmitter to the network side connection, and enable operation of the transmitter responsive to a predetermined condition of the electric power. The transmitter, when enabled, is operative to transmit multi-bit identifying information stored in the memory towards the network side connection. In an exemplary embodiment the predetermined condition of the electric power is indicative of a power sourcing equipment associated with power over Ethernet transitioning from a detection and/or classification mode to supplying power.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1A illustrates a high level block diagram of a system 10 according to the prior art providing PoE from an endpoint PSE. System 10 comprises: a floor distributor 20 comprising a common equipment 30, an endpoint PSE 40, an equipment patch panel 50, a plurality of patch cords 55, and a user patch panel 60; a horizontal cabling 70; a work area 80 comprising a consolidation point 90, a plurality of telecommunications outlets (TOs) 100 and a plurality of data terminal equipments (DTEs) 110; and a location database 120. Endpoint PSE 40 is connected to common equipment 30 and is arranged to provide powering for a PD connected to ports of common equipment 30. Common equipment 30 is connected by a plurality of connections to equipment patch panel 50. Common equipment 30 is further connected by a data connection to location database 120. Equipment patch panel 50 is cross-connected to user patch panel 60 by patch cords 55 which provides flexibility in arranging interconnections among elements of system 10. User patch panel 60 is connected by horizontal cabling 70 comprising multiple communication cabling to consolidation point 90. Consolidation point 90 is connected to each of the plurality of TOs 100. Each supplied DTE 110 is connected to a specific TO 100. Location database 120 is also known as a location information server (LIS).

System 10 is shown as comprising each of equipment patch panel 50, user patch panel 60 and consolidation point 90, however this is not meant to be limiting in any way. Each of equipment patch panel 50, user patch panel 60 and consolidation point 90 are optional and are not required for the operation of system 10. Common equipment 30 comprises one of a switch, hub, bridge or router and patch cords. Endpoint PSE 40 provides power over horizontal cabling 70 to power a compatible PD 110, preferably in accordance with IEEE 802.3af. In an exemplary embodiment endpoint PSE 40 is part of common equipment 30 and embedded therein. As described above a powered DTE is typically called a PD. Location database 120 is illustrated as being directly connected to common equipment 30 however this is not meant to be limiting in any way and may comprise a data connection via the local area network.

In operation, location database 120 is manually provided with a listing of locations associated with ports of common equipment 30. In the event of any change in wiring, such as a change in the arrangement of patch cords 55 constituting the cross connection between equipment patch panel 50 and user patch panel 60, the listing is updated manually to reflect the wiring change. Unfortunately the requirement to update the list manually, done as a separate step from the wiring change, may be forgotten or not fully completed and thus location database 120 may not fully reflect the wiring change.

FIG. 1B illustrates a high level block diagram of a system 150 according to the prior art providing PoE from a midspan PSE. System 150 comprises: a floor distributor 160 comprising a common equipment 30, a midspan PSE 170, a plurality of patch cords 55 and a user patch panel 60; a horizontal cabling 70; a work area 80 comprising a consolidation point 90, a plurality of TOs 100 and a plurality of DTEs or PDs 110; and a location database 120. Common equipment 30 is connected by a data connection to location database 120. Common equipment 30 is further connected by a plurality of connections to midspan PSE 170 and midspan PSE 170 is cross-connected to user patch panel 60 via patch cords 55 which provides flexibility in arrange an interconnection among elements of the system. User patch panel 60 is connected by horizontal cabling 70 comprising multiple communication cabling to consolidation point 90. Consolidation point 90 is connected to each of the plurality of TOs 100. Each supplied DTE or PD 110 is connected to a specific TO 100.

System 150 is shown as comprising each of user patch panel 60 and consolidation point 90, however this is not meant to be limiting in any way. Each of user patch panel 60 and consolidation point 90 are optional and are not required for the operation of system 150. Common equipment 30 comprises one of a switch, hub, bridge or router. Midspan PSE 170 injects power over horizontal cabling 70 to power a compatible PD 110, preferably in accordance with IEEE 802.3af. As described above a powered DTE is also called a PD, and midspan PSE 170 is preferably arranged to provide power to each port of common equipment 30 so that a PD may be connected to any port. Location database 120 is illustrated as being directly connected to common equipment 30, however this is not meant to be limiting in any way and may comprise a data connection via the local area network.

In operation location database 120 is manually provided with a listing of locations associated with ports of common equipment 30. In the event of any change in wiring, such as a change in the arrangement of patch cords 55 constituting the cross connection between midspan PSE 170 and user patch panel 60, the listing is updated manually to reflect the wiring change. Unfortunately the requirement to update the list manually, done as a separate step from the wiring change, may be forgotten or not fully completed and thus location database 120 may not fully reflect the wiring change.

FIG. 2A illustrates a high level block diagram of a system 200 exhibiting an embodiment of the invention comprising a location identifier 250 associated with each TO, location identifier 250 being operative to transmit multi-bit location data towards an endpoint PSE in accordance with a principle of the invention. System 200 comprises: a floor distributor 210 comprising a common equipment 30, an endpoint PSE 220, an equipment patch panel 50, a plurality of patch cords 55 and a user patch panel 60; a horizontal cabling 70; and a work area 80 comprising a consolidation point 90, a plurality of TOs 240 each comprising a location identifier 250, a plurality of DTEs 110, and a location database 270; and an optional asset management database 275. Endpoint PSE 220 is connected to common equipment 30 and common equipment 30 is connected by a plurality of connections to equipment patch panel 50. Equipment patch panel 50 is cross-connected to user patch panel 60 via patch cords 55 which provides flexibility in arranging interconnection among elements of system 200, and user patch panel 60 is connected by horizontal cabling 70 comprising multiple communication cabling to consolidation point 90. Consolidation point 90 is connected to each of the plurality of TOs 240. Each DTE 110 and PD 260 is connected to a specific TO 240. Location database 270 is also known as an LIS. Optional asset management database 275 is in communication with location database 270.

System 200 is shown as comprising each of equipment patch panel 50, user patch panel 60 and consolidation point 90, however this is not meant to be limiting in any way. Each of equipment patch panel 50, user patch panel 60 and consolidation point 90 are optional and are not required for the operation of system 200. Common equipment 30 comprises one of a switch, hub, router or bridge. Endpoint PSE 220 provides power over horizontal cabling 70 to power a compatible PD 260 via ports of common equipment 30, preferably in accordance with IEEE 802.3af, and additionally is operative to receive the multi-bit location data associated with location identifier 250 in a manner that will be explained further hereinto below. In an exemplary embodiment endpoint PSE 220 is part of common equipment 30 and embedded therein Location database 270 is illustrated as being directly connected to common equipment 30 and endpoint PSE 220 however this is not meant to be limiting in any way. Location database 270 may be connected to common equipment 30 and/or endpoint PSE 220 by a data connection via the local area network without exceeding the scope of the invention.

In operation, each location identifier 250 is supplied with, loaded with, or set to contain, a multi-bit location data. The multi-bit location data may be a unique multi-bit identification code, and a database is further provided with an association of each of the multi-bit identification codes with a physical location of the TO. In another embodiment the multi-bit location data comprises complete physical location information. Preferably, the location data is formatted as a Presence Information Document Format—Location Object (PIDF-LO). In one embodiment the location data comprises a geographic location including without limitation at least some of latitude, longitude, elevation and the datum which identifies the cording system used. In one further embodiment the location data is formatted using the World Geodetic System datum. In another embodiment the location data comprises a civic location constituted of a set of elements that describe detailed street address information. In one ever further embodiment location data comprises security or access information, including but not limited to company name, floor, cubicle or room location and hazardous material information. In one embodiment the multi-bit location data, being constituted of an identification code, is set via switches associated with location identifier 250, in another embodiment the multi-bit location data is loaded as a unique identifying number drawn from a global numbering pool at manufacturing and preferably further affixed externally with a bar code. Such a bar code enables error free reading of the multi-bit identification and the correct association of the location with the correct multi-bit identification. In another embodiment the multi-bit location data comprises complete physical location information. In another embodiment, in which either an identification code or geographical data may be utilized, the multi-bit location data is loaded at an installation phase by one of a wired and a wireless connection preferably by a dedicated program on a portable computer or through dedicated functionality of a cabling tester. In yet another embodiment the multi-bit location data is transmitted by the PSE to location identifier 250 at installation as an AC signal modulating a voltage. Location database 270 is provided with a listing of TO locations and their associated multi-bit location data if required, as well as any interconnect information required to correlate ports of endpoint PSE 220 with ports of common equipment 30. Location database 270 may be provided with the listing manually or in connection with an automated or semi-automated installation routine. In the rare instance in which a TO 240 is replaced or physically moved, location database 270 is manually updated.

In one embodiment, endpoint PSE 220 identifies a valid attached PD 260, typically in accordance with IEEE 802.3af mentioned above, and then sets the voltage to the classification range to classify the identified valid PD 260. In an exemplary further embodiment in which endpoint PSE 220 is operative in accordance with IEEE 802.3af, the voltage during classification presented by endpoint PSE 220 is to be 14.5V to 20.5V at PD 260. Location identifier 250 senses the classification voltage and in response transmits the multi-bit location data to endpoint PSE 220 by modulating the port current. Preferably, the communication from location identifier 250 to endpoint PSE 220 is thus by common mode signaling, and is orthogonal to normal IEEE 802.3 data transmission. Endpoint PSE 220 is further operative to monitor the port current and extract the multi-bit location data transmitted in combination with the PD supplied classification current.

A DTE 110 attached to TO 240 will not exhibit a valid identification to endpoint PSE 220. Endpoint PSE 220, responsive to a failed identification phase, outputs a current limited DC power exhibiting a voltage less than a pre-determined amount $V_{pse\_safe}$. $V_{pse\_safe}$ is set so that in combination with the current limit the DC power output is less than an amount that would damage DTE 110, and is above the detection voltage. In an exemplary embodiment DTE 110 is not harmed by 150 mW of power. Thus, for a standard 75 ohm termination of DTE 110, a $V_{pse\_safe}$ of about 15 volts for a pre-determined period not exceeding 5% of predetermined time is applied. In an exemplary embodiment $V_{pse\_safe}$ is supplied for no more than 50 milliseconds in a period of 1 second. Thus, for example, transmitting at 1 kilobit/sec will enable transmission of 50 bits per $V_{pse\_safe}$ cycle. The 5% duty cycle thus supplies the power for the pre-determined time sufficient to operate the electrical circuits in the embodiment presented herein and to allow for transmission, while maintaining a low average power.

Preferably $V_{pse\_safe}$ is set to be less than 30 volts so as to avoid unintended powering of a connected valid PD. Preferably, location identifier exhibits a high impedance in the absence of a detected voltage on the order of Vpse_safe. Thus, a voltage in excess of the normative IEEE 802.3af-2003 detection voltage is preferred to avoid interference with detection of a connected PD. In another embodiment $V_{pse\_safe}$ is set to less than the detection voltage, i.e. less than 2.8 volts DC. Alternatively, as described further hereinto below, location identifier 250 is responsive to a specific signal superimposed on $V_{pse\_safe}$. In such an embodiment, a $V_{pse\_safe}$ within the range of the detection voltage may be utilized.

Location identifier 250 senses the voltage set to the predetermined $V_{pse\_safe}$, and in response transmits multi-bit location data to endpoint PSE 220 by modulating the current. Preferably, in order to simplify the operation of location identifier 250, $V_{pse\_safe}$ comprises a voltage level compatible with a classification voltage presented to a PD 260. In one further embodiment location identifier 250 only begins transmitting after sensing the classification voltage for a pre-determined minimum amount of time thereby ensuring the endpoint PSE 220 has sufficient time to classify PD 260 without interference prior to transmitting location data by modulating the classification current. Preferably, the communication from location identifier 250 to endpoint PSE 220 is thus by common mode signaling, and is orthogonal to normal IEEE 802.3 data transmission.

U.S. patent application Ser. No. 10/961,108 filed Oct. 12, 2004 to Darshan et al, entitled "Powered Device Interface Circuit", issued Dec. 5, 2006 as U.S. Pat. No. 7,145,439, the entire contents of which is incorporated herein by reference, describes communication between a PD 260 and an endpoint PSE 200 or midspan PSE 300 by modulating an operating voltage level. Preferably, communication from location identifier 250 according to the present invention is at a time which does not overlap with the communication from PD 260 to endpoint PSE 200.

The above has been described in relation to an embodiment in which detection of a valid PD is first attempted, however this is not meant to be limiting in any way. In another embodiment, as will be described further hereinto below in relation to FIG. 2D, endpoint PSE 220 does not begin with an identification phase, but instead first outputs a current limited voltage exhibiting $V_{pse\_safe}$, and thus location identification is completed prior to initiating a powering cycle. Such an embodiment advantageously avoids multiples uses for the classification current.

Location database 270 and optional asset management database 275 thus receive updates of adds, deletes and changes of all connections between common equipment 30 and DTE 110 without requiring manual intervention. Emergency services are thus supplied with full detail regarding the location of an emergency caller. Similarly, asset management is automatically updated without reference to data communication or human intervention.

Figure 2B:
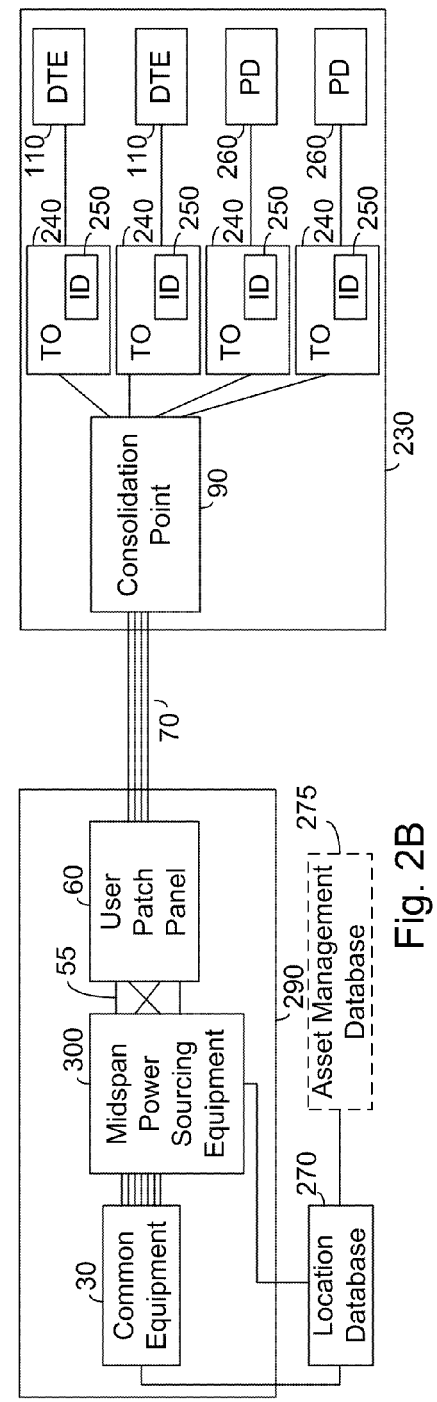
FIG. 2B illustrates a high level block diagram of an embodiment of the invention comprising a location identifier associated with a TO, the location identifier being operative to transmit a multi-bit location data associated with a location towards a midspan PSE in accordance with a principle of the invention.

FIG. 2B illustrates a high level block diagram of a system 280 exhibiting an embodiment of the invention comprising a location identifier 250 associated with each TO, location identifier 250 being operative to transmit a multi-bit location data towards a midspan PSE in accordance with a principle of the invention. System 280 comprises: a floor distributor 290 comprising a common equipment 30, a midspan PSE 300, a plurality of patch cords 55 and a user patch panel 60; a horizontal cabling 70; and a work area 80 comprising a consolidation point 90, a plurality of TOs 240 each comprising a location identifier 250, a plurality of DTEs 110, and a plurality of PDs 260; a location database 270; and an optional asset management database 275. Common equipment 30 is connected by a plurality of connections to midspan PSE 300, midspan PSE 300 is cross-connected to user patch panel 60 via patch cords 55 which provides flexibility in arranging interconnection among elements of system 280, and user patch panel 60 is connected by horizontal cabling 70 comprising multiple communication cabling to consolidation point 90. Consolidation point 90 is connected to each of the plurality of TOs 240. Each DTE 110 and PD 260 is connected to a specific TO 240. Location database 270 is also known as an LIS. Optional asset management database 275 is in communication with location database 270.

System 280 is shown as comprising each of user patch panel 60 and consolidation point 90, however this is not meant to be limiting in any way. Each of equipment patch panel 50, user patch panel 60 and consolidation point 90 are optional and are not required for the operation of system 10. Common equipment 30 comprises one of a switch, hub, bridge or router. Midspan PSE 300 provides power over horizontal cabling 70 to power a compatible PD 260 for each port of common equipment 30, preferably in accordance with IEEE 802.3af, and additionally is operative to receive the multi-bit location data associated with location identifier 250 in a manner that will be explained further hereinto below. Location database 270 is illustrated as being directly connected to common equipment 30 and midspan PSE 300 however this is not meant to be limiting in any way. Location database 270 may be connected to common equipment 30 and/or midspan PSE 300 by a data connection via the local area network without exceeding the scope of the invention.

In operation, each location identifier 250 is supplied with, or loaded with, or set to contain, a multi-bit location data. The multi-bit location data may be a unique multi-bit identification code, and a database is further provided with an association of each of the multi-bit identification codes with a physical location of the TO. In another embodiment the multi-bit location data comprises complete physical location information. Preferably, the location data is formatted as a Presence Information Document Format—Location Object (PIDF-LO). In one embodiment the location data comprises a geographic location including without limitation at least some of latitude, longitude, elevation and the datum which identifies the cording system used. In one further embodiment the location data is formatted using the World Geodetic System datum. In another embodiment the location data comprises a civic location constituted of a set of elements that describe detailed street address information. In one ever further embodiment location data comprises security or access information, including but not limited to company name, floor, cubicle or room location and hazardous material information. In one embodiment the multi-bit location data, being constituted of an identification code, is set via switches associated with location identifier 250, in another embodiment the multi-bit location data is loaded as a unique identifying number drawn from a global numbering pool at manufacturing and preferably further affixed externally with a bar code. Such a bar code enables error free reading of the multi-bit identification and the correct association of the location with the correct multi-bit identification. In another embodiment, in which either an identification code or geographical data may be utilized, the multi-bit location data is loaded at an installation phase by one of a wired and a wireless connection preferably by a dedicated program on a portable computer or through dedicated functionality of a cabling tester. In yet another embodiment the multi-bit location data is transmitted by the PSE to location identifier 250 at installation as a response to an AC signal superimposed on a PSE voltage. Location database 270 is provided with a listing of TO locations and their associated multi-bit location data if required, as well as any interconnect information required to correlate ports of endpoint PSE 220 with ports of common equipment 30. Location database 270 may be provided with the listing manually or in connection with an automated or semi-automated installation routine. In the rare instance in which a TO 240 is replaced or physically moved, location database 270 is manually updated. Similarly in the rare instance in which the wiring between common equipment 30 and midspan PSE 300 is changed, location database 270 is manually updated.

In one embodiment, midspan PSE 300 identifies a valid attached PD 260 and then sets the voltage to the classification range to classify the identified valid PD 260. In an exemplary further embodiment in which midspan PSE 300 is operative in accordance with IEEE 802.3af, the voltage during classification presented by midspan PSE 300 is to be 14.5V to 20.5V at PD 260. Location identifier 250 senses the classification voltage and in response transmits the multi-bit location data to midspan PSE 300 by modulating the port current. Preferably, the communication from location identifier 250 to midspan PSE 300 is thus by common mode signaling, and is orthogonal to normal IEEE 802.3 data transmission. Midspan PSE 300 is further operative to monitor the port current and extract the multi-bit location data transmitted in combination with the PD supplied classification current.

A DTE 110 attached to TO 240 will not exhibit a valid identification to midspan PSE 300. Midspan PSE 300, responsive to a failed identification phase, outputs a current limited DC power exhibiting a voltage less than a pre-determined amount $V_{pse\_safe}$. $V_{pse\_safe}$ is set so that in combination with the current limit the DC power output is less than an amount that would damage DTE 110, and is above the detection voltage. In an exemplary embodiment DTE 110 is not harmed by 150 mW of power. Thus, for a standard 75 ohm termination of DTE 110, a $V_{pse\_safe}$ of about 15 volts for a pre-determined period not exceeding 5% of pre-determined cycle time is applied. In an exemplary embodiment $V_{pse\_safe}$ is supplied for no more than 50 milliseconds in a period of 1 second. Thus, for example, transmitting at 1 kilobit/sec will enable transmission of 50 bits per $V_{pse\_safe}$ cycle. The 5% duty cycle thus supplies the power for the pre-determined time sufficient to operate the electrical circuits in the embodiment presented herein and to allow for transmission, while maintaining a low average power. In another embodiment $V_{pse\_safe}$ is set to less than the detection voltage, i.e. less than 2.8 volts DC. Alternatively, as described further hereinto below, location identifier 250 is responsive to a specific signal superimposed on $V_{pse\_safe}$. In such an embodiment, a $V_{pse\_safe}$ within the range of the detection voltage may be utilized.

Location identifier 250 senses the voltage set to the predetermined $V_{pse\_safe}$, and in response transmits multi-bit location data to midspan PSE 300 by modulating a current flow. Preferably, in order to simplify the operation of location identifier 250, $V_{pse\_safe}$ comprises a voltage level compatible with a classification voltage presented to a PD 260. In one further embodiment location identifier 250 only begins transmitting after sensing the classification voltage for a pre-determined minimum amount of time thereby ensuring the midspan PSE 300 has sufficient time to classify PD 260 without interference prior to transmitting location data by modulating the classification current. Preferably, the communication from location identifier 250 to midspan PSE 300 is thus by common mode signaling, and is orthogonal to normal IEEE 802.3 data transmission. U.S. patent application Ser. No. 10/961,108 filed Oct. 12, 2004 to Darshan et al, entitled "Powered Device Interface Circuit" incorporated above by reference, describes communication between a PD 260 and an endpoint PSE 200 or midspan PSE 300 by modulating an operating voltage level. Preferably, communication from location identifier 250 according to the present invention is at a time which does not overlap with the communication from PD 260 to midspan PSE 300.

The above has been described in relation to an embodiment in which detection of a valid PD is first attempted, however this is not meant to be limiting in any way. In another embodiment, as will be described further hereinto below in relation to FIG. 2D, midspan PSE 300 does not begin with an identification phase, but instead first outputs a current limited voltage exhibiting $V_{pse\_safe}$, and thus location identification is completed prior to initiating a powering cycle. Such an embodiment advantageously avoids multiples uses for the classification current.

Emergency services are thus supplied with full detail regarding the location of an emergency caller. Similarly, asset management is automatically updated without reference to data communication or human intervention.

Figure 2C:
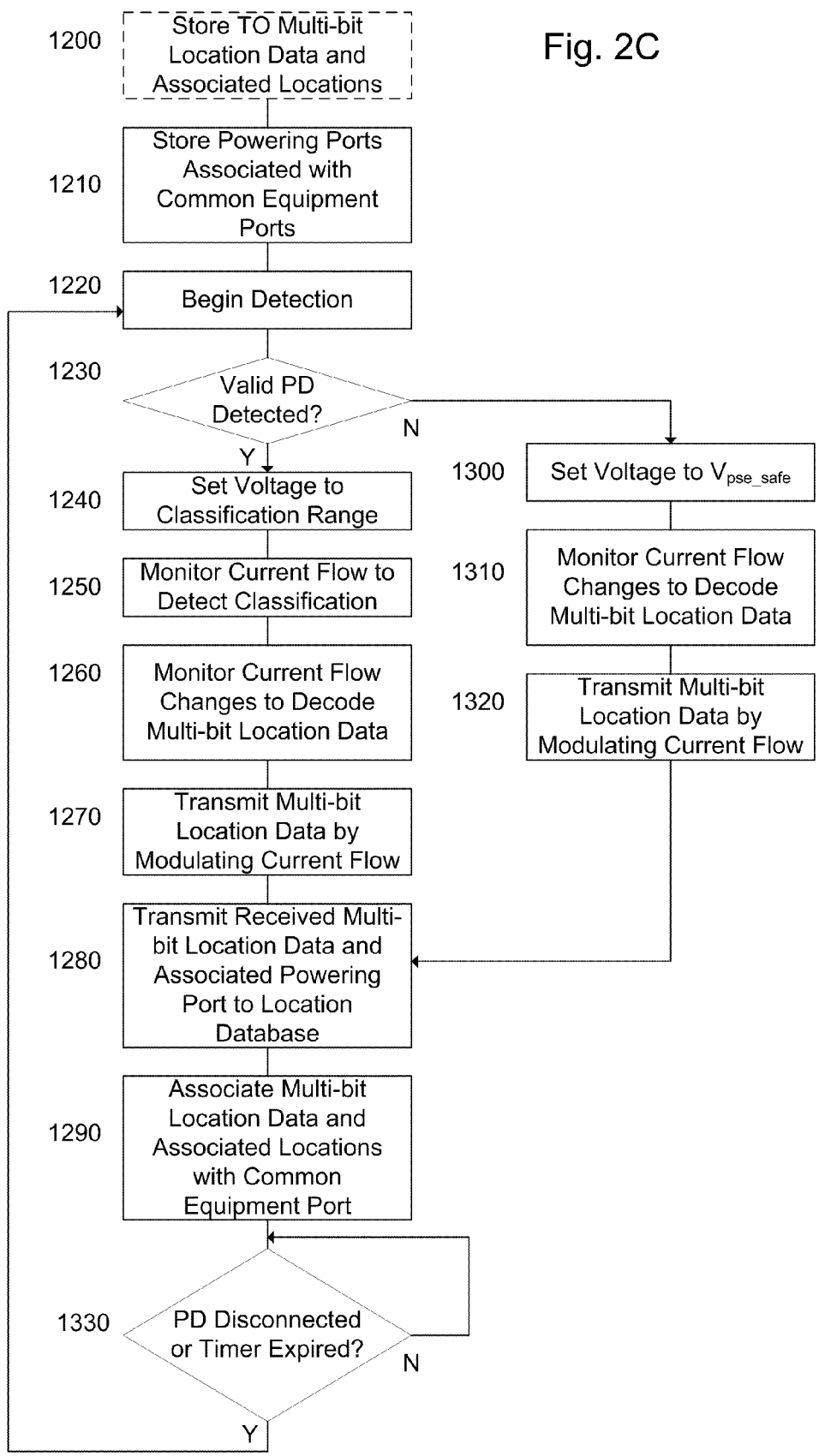
FIG. 2C illustrates a high level flow chart of a first embodiment of the operation of the system of FIGS. 2A and 2B in accordance with a principle of the invention.

FIG. 2C illustrates a high level flow chart of a first embodiment of the operation of the system of FIGS. 2A and 2B in accordance with a principle of the invention. In stage 1200, a multi-bit location data code for each TO 240 within system 200, 280 associated with the respective physical location is stored in location database 270. In the event one or more TO 240 within system 200, 280 is loaded with geographic data as described above, stage 1200 is not required for that TO 240. In an exemplary embodiment stage 1200 is accomplished manually or semi-manually at time of installation, with any updates being similarly accomplished manually or semi-manually as incurred.

In stage 1210 powering ports of endpoint PSE 220 or midspan PSE 300, respectively, associated with ports of common equipment 30 are stored in location database 270. Endpoint PSE 220 and midspan PSE 300 are collectively hereinafter referred to as a PSE. In an exemplary embodiment stage 1210 is accomplished manually or semi-manually at time of installation, with any updates being similarly accomplished manually or semi-manually as incurred. Thus, the combination of stages 1200 and 1210 provide a database of TO multi-bit location data codes, physical locations associated therewith, and an association between ports of a PSE and ports of common equipment 30.

In stage 1220, a PSE beings the detection process, preferably in accordance with IEEE 802.3af. In an exemplary embodiment a current limited voltage is connected to a PSE port, and if present, a signature resistance in a PD 260 connected to the PSE port is detected. In the absence of a PD 260 across the port, the signature resistance will not be detected.

In stage 1230 the results of the detection of stage 1220 are compared with a valid PD detection. In the event that a valid PD 260 has been detected, in stage 1240 voltage to the port exhibiting the valid detected PD is set to a classification range voltage. In an exemplary embodiment PD 260, responsive to the classification range voltage presented by the PSE, exhibits a current draw associated with maximum power usage by PD 260. In stage 1250 the PSE monitors the current drawn during the classification phase to detect the appropriate classification of PD 260.

In stage 1260, the PSE further monitors a change in current flow during the classification phase to detect a multi-bit location data transmitted by location identifier 250. In stage 1270, location identifier 250 transmits the multi-bit location data associated therewith to the PSE by modulating the current flow. In the event that the PD does not exhibit a classification current, a small amount of current is sunk and modulated by location identifier 250. The modulated current flow is monitored and detected at the PSE as described above in relation to stage 1260. Thus, the PSE receives both a classification current if present, and the multi-bit location data of location identifier 250. In one embodiment stage 1270 is delayed from stage 1240 so as to allow the PSE to monitor and unambiguously determine the power requirement of PD 260. Preferably, the communication from location identifier 250 to endpoint PSE 220 or midspan PSE 300 is thus by common mode signaling, and is orthogonal to normal IEEE 802.3 data transmission In stage 1280, the multi-bit location data transmitted and received in stages 1270, 1280 and the associated port of the PSE receiving the multi-bit location data, are transmitted to location database 270. In stage 1290, the received multi-bit location data, which is associated in location database 270 with a physical location as described above in relation to stage 1200, and the associated powering port of the PSE which is associated in location database 270 with a port of common equipment 30 as described above in relation of stage 1210, are utilized to associate a port of common equipment 30 with a physical location. In an embodiment in which multi-bit location data comprises complete physical location information, location database 270 functions to cross identify ports of common equipment 30 to powering ports of the PSE. It is to be understood, that optional asset management database 275 is similarly updated. In one embodiment (not shown) location database 270 further acts to transmit the location information to the associated DTE 110 or PD 260, thus DTE 110 or PD 260 receives and stores location information associated therewith.

In the event that in stage 1230 a valid PD has not been detected, in stage 1300 the voltage output presented by the PSE to the port is set to a voltage $V_{pse\_safe}$. As described above $V_{pse\_safe}$ is set so that in combination with the current limit the DC power output is less than an amount that would damage DTE 110, and is above the detection voltage. In an exemplary embodiment DTE 110 is not harmed by 150 mW of power. Thus, for a standard 75 ohm termination of DTE 110, a $V_{pse\_safe}$ of about 15 volts presented for less than 5% of a cycle time is applied. In an exemplary embodiment, $V_{pse\_safe}$ is thus presented for no more than 50 milliseconds in a period of 1 second. The 5% duty cycle thus supplies the power for the pre-determined time sufficient to operate the electrical circuits in the embodiment presented herein and to allow for transmission, while maintaining a low average power. In another embodiment $V_{pse\_safe}$ is set to less than the detection voltage, i.e. less than 2.8 volts DC. Alternatively, as described further hereinto below, location identifier 250 is responsive to a specific signal superimposed on $V_{pse\_safe}$. In such an embodiment, a $V_{pse\_safe}$ within the range of the detection voltage may be utilized.

In stage 1310 the PSE monitors the current flow resulting from the application of $V_{pse\_safe}$ to the port so as to detect a multi-bit location data transmitted by location identifier 250. In stage 1320, location identifier 250 transmits the multi-bit location data associated therewith to the PSE by modulating the current flow resulting from the application of $V_{pse\_safe}$. The modulated current flow is monitored and detected at the PSE as described above in relation to stage 1310. Thus, the PSE receives the multi-bit location data of location identifier 250. In stage 1280 the multi-bit location data transmitted and received in stages 1310, 1320 and the associated port of the PSE are transmitted to location database 270 as described above. Preferably, the communication from location identifier 250 to endpoint PSE 220 or midspan PSE 300 is thus by common mode signaling, and is orthogonal to normal IEEE 802.3 data transmission.

In stage 1330, the status of PD 260 identified and classified in stages 1230, 1250 is monitored to ensure that PD 260 is still drawing power and thus has not been disconnected. It is to be understood, that preferably the PSE monitors a maintain power signature and thus in the event that a PD 260 is powered and subsequently disconnected the PSE is notified of the disconnection. In the event that no PD 260 has been powered, i.e. stages 1300-1320 are executed, a timer is set and a time out is awaited. Preferably the timer allows for at least the minimum safe time allowed for $V_{pse\_safe}$ as described above. In the event that PD 260 has not disconnected, or the timer has not expired, stage 1330 is repeated. In the event PD 260 has been detected as being disconnected, or the timer has expired, stage 1220 as described above is repeated.

Thus, in the event of an emergency call, system 200 or system 280 is operative to retrieve the physical location associated with the common equipment port originating the emergency call from location database 270 as described above for transmittal to an emergency dispatcher. It is to be understood that in the event of a change in connection between equipment patch panel 50 and user patch panel 60 or a change in connection between midspan power sourcing equipment 300 and user patch panel 60 the system automatically identifies by the operation of the method of FIG. 2C the change and updates location database 270 without manual intervention, and without requiring data transmission of the location data in a format in accordance with IEEE 802.3 Changes and updates for powered devices are immediately sensed and reported. Changes and updates for DTEs are sensed and reporting in a periodic manner. Thus, on a periodic basis, or when a PD is disconnected, both location database 270 and/or optional asset management database 275 is automatically updated without requiring human intervention.

Figure 2D:
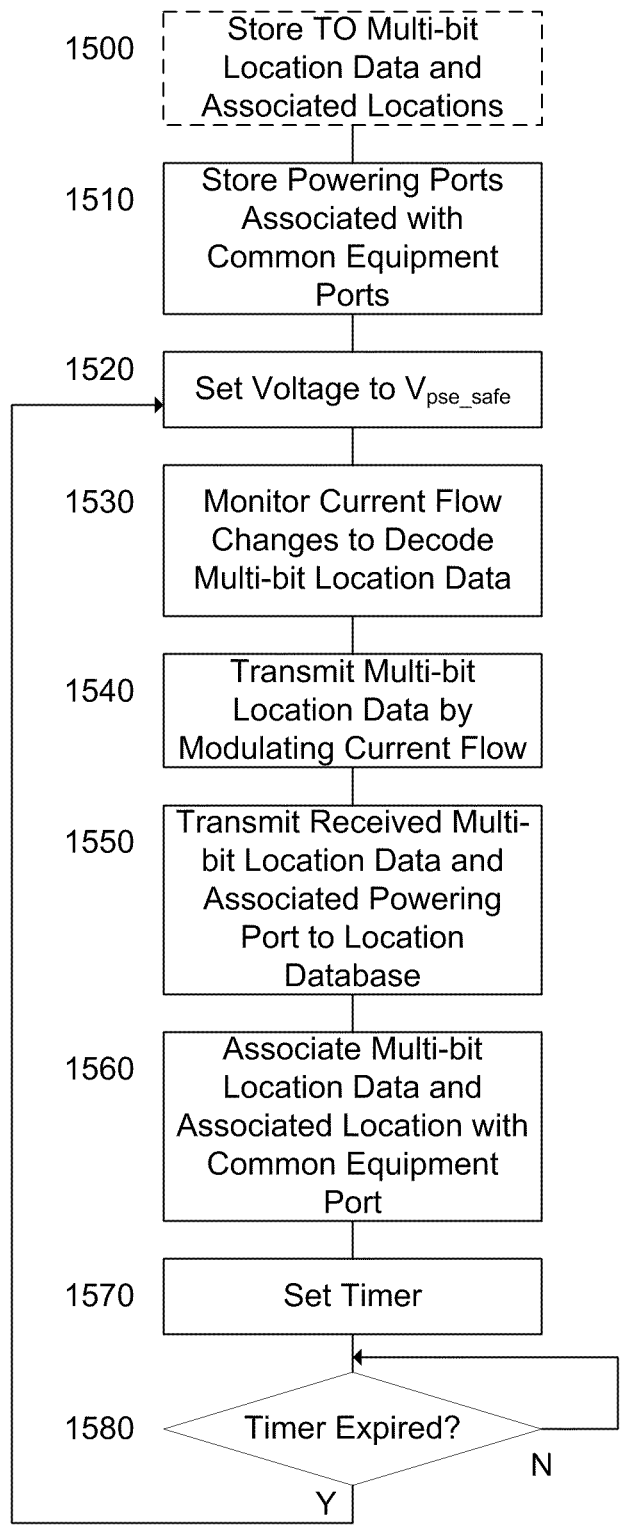
FIG. 2D illustrates a high level flow chart of a second embodiment of the operation of the system of FIGS. 2A and 2B in accordance with a principle of the invention.

FIG. 2D illustrates a high level flow chart of a second embodiment of the operation of the system of FIGS. 2A and 2B in accordance with a principle of the invention. In stage 1500 a multi-bit location data code for each TO 240 within system 200, 280 associated with the respective physical location is stored in location database 270. In the event one or more TO 240 within system 200, 280 is loaded with geographic data as described above, stage 1500 is not required for that TO 240. In an exemplary embodiment stage 1500 is accomplished manually or semi-manually at time of installation, with any updates being similarly accomplished manually or semi-manually as incurred.

In stage 1510 powering ports of endpoint PSE 220 or midspan PSE 300, respectively, associated with ports of common equipment 30 are stored in location database 270. In an exemplary embodiment stage 1510 is accomplished manually or semi-manually at time of installation, with any updates being similarly accomplished manually or semi-manually as incurred. Thus, the combination of stages 1500 and 1510 provide a database of TO multi-bit location data codes, physical locations associated therewith, and an association between ports of a PSE and ports of common equipment 30.

In stage 1520 the voltage output presented by the PSE to the port is set to a voltage $V_{pse\_safe}$. As described above $V_{pse\_safe}$ is set so that in combination with the current limit the DC power output is less than an amount that would damage DTE 110, and is above the detection voltage. In an exemplary embodiment DTE 110 is not harmed by 150 mW of power. Thus, for a standard 75 ohm termination of DTE 110, a $V_{pse\_safe}$ of about 15 volts applied for less than 5% of a pre-determined cycle time is applied. In an exemplary embodiment $V_{pse\_safe}$ is supplied for no more than 50 milliseconds in a period of 1 second. The 5% duty cycle thus supplies the power for the pre-determined time sufficient to operate the electrical circuits in the embodiment presented herein and to allow for transmission, while maintaining a low average power. In another embodiment $V_{pse\_safe}$ is set to less than the detection voltage, i.e. less than 2.8 volts DC. Alternatively, as described further hereinto below, location identifier 250 is responsive to a specific signal superimposed on $V_{pse\_safe}$. In such an embodiment, a $V_{pse\_safe}$ within the range of the detection voltage may be utilized.

In stage 1530 the PSE monitors the current flow resulting from the application of $V_{pse\_safe}$ to the port so as to detect a multi-bit location data transmitted by location identifier 250. In stage 1540, location identifier 250 transmits the multi-bit location data associated therewith to the PSE by modulating the current flow resulting from the application of $V_{pse\_safe}$. The modulated current flow is monitored and detected at the PSE as described above in relation to stage 1530. Thus, the PSE receives the multi-bit location data of location identifier 250. In stage 1550 the multi-bit location data transmitted and received in stages 1530, 1540 and the associated port of the PSE are transmitted to location database 270 as described above. Preferably, the communication from location identifier 250 to endpoint PSE 220 or midspan PSE 300 is thus by common mode signaling, and is orthogonal to normal IEEE 802.3 data transmission.

In stage 1570 a timer is set, the timer being set with a minimum cycle time whose value is pre-determined. As described above the voltage, current levels and on time of $V_{pse\_safe}$ are set at least partially in response to the cycle time. In stage 1580 the time set in stage 1570 is monitored for a time out. If a time out has not occurred stage 1570 is continued. If a time out has occurred, stage 1520 as described above is again performed.

Thus, in the event of an emergency call, system 200 or system 280 is operative to retrieve the physical location associated with the common equipment port originating the emergency call from location database 270 as described above for transmittal to an emergency dispatcher. It is to be understood that in the event of a change in connection between equipment patch panel 50 and user patch panel 60 or a change in connection between midspan power sourcing equipment 300 and user patch panel 60 the system automatically identifies the change by the operation of the method of FIG. 2D and updates location database 270 without manual intervention, and without requiring data transmission of the location data in a format in accordance with IEEE 802.3 Changes and updates are sensed and reporting in a periodic manner and both location database 270 and/or optional asset management database 275 are automatically updated without requiring human intervention.

The embodiments of FIGS. 2A, 2B and 2D have been described as comprising a PSE, such as one of endpoint PSE 220 and midspan PSE 300, however this is not meant to be limiting in any way. In another embodiment the PSE is substituted with current limited voltage source operative to supply $V_{pse\_safe}$ as described herein and monitor the current flow. Thus, the use of a PSE according to IEEE 802.3af is not required for the invention, and is described herein solely as a commercially available means of implementing at least one embodiment of the invention.

FIG. 3A illustrates a first embodiment of location identifier 250 of FIGS. 2A, 2B in accordance with a principle of the invention comprising an interface 400 and a transmitting module 410. Interface 400 comprises: a first and second center tapped inductor 420; a first, second, third and fourth impedance 430; and optionally a diode bridge 440. Transmitting module 410 comprises: a control 450; an electronically controlled switch 460; a multi-bit location data storage 470; and a current modulator 480. A single interface 400 connected to two twisted wire pairs are shown, however this is for ease of illustration and is not meant to be limiting in any way. Preferably a pair of interfaces 400 are supplied, a first interface 400 being attached to the data pairs (equivalent to RJ-45 pins 1, 2, 3 and 6 as described in IEEE 802.3af) and a second interface 400 being attached to the spare pairs (equivalent to RJ-45 pins 4, 5, 7 and 8 as described in IEEE 802.3af).

First center tapped inductor 420 is connected across a first pair of conductors labeled $a_1$, $a_2$, the first pair of conductors representing a first twisted pair connection in accordance with the above mentioned IEEE 802.3af standard. The center tap of first center tapped conductor 420 is connected to a first input of diode bridge 440 and is further connected by way of first and second impedance 430 respectively to conductor $a_1$, $a_2$. Second center tapped inductor 420 is connected across a second pair of conductors labeled $b_1$, $b_2$, the second pair of conductors representing a second twisted pair connection in accordance with the above mentioned IEEE 802.3af standard. The center tap of second center tapped conductor 420 is connected to a second input of diode bridge 440 and is further connected by way of third and fourth impedance 430 respectively to conductor $b_1$, $b_2$.

The positive output of diode bridge 440, representing the positive output of interface 400, is connected to the input of electronically controlled switch 460 and to the input of control 450. Control 450 is connected to the gate input of electronically controlled switch 460, to the data control of multi-bit location data storage 470 and the control input of current modulator 480. The data output of multi-bit location data storage 470 is connected to the input of current modulator 480. The switched output of electronically controlled switch 460 is connected to current modulator 480. The return output of diode bridge 440, representing the return of interface 400 is connected to control 450 and the return output of current modulator 480.

First, second, third and fourth impedance 430 are optional, and are selected as required to match the impedance of the combination of interface 400 and transmitting module 410 to the cable impedance of inductor pairs $a_1$, $a_2$ and $b_1$, $b_2$ so as to reduce attenuation, return loss and transmission loss caused by first and second inductor 420. Preferably, interface 400 enables location identifier 250 to meet connecting hardware level requirements for performance according to Category 5e, Category 6 and Category 7A as defined by TIE/EIA 568 referenced above. Diode bridge 440 is provided to allow polarity insensitive operation, however diode bridge 440 may be optionally removed without exceeding the scope of the invention.

In operation, interface 400 provides power for transmitting module 410 and further provides impedance matching for the twisted wire pairs of the communication cabling. Preferably, transmitting module 410 operates on a minimal amount of current, further preferably on the order of 2 mA. In an exemplary embodiment silicon technology exhibiting low impedance at the high speed data frequency is utilized in the production of interface 400. Interface 400 may be a packaged chip or interface 400 and transmitting module 410 may be packaged in a conventional dual in line package, or in a multi-chip module. Control 450 is operative to monitor the input voltage, and in accordance with the method described above in relation to FIGS. 2C, 2D is operative to detect a voltage within the classification range or within the predetermined parameters for $V_{pse\_safe}$. Responsive to the detected voltage level, control 450 closes electronically controlled switch 460 and operates current modulator 480 to modulate the current flow between the first pair conductors $a_1$, $a_2$ and the second pair of conductors $b_1$, $b_2$ so as to transmit the multi-bit location data stored in multi-bit location data storage 470. Preferably, transmission is accomplished in a common mode signaling orthogonal to high speed data transmission according to IEEE 802.3. After completion of the transmission, control 450 is operative to open electronically controlled switch 460, thereby returning the combination of interface 400 and transmitting module 410 to a high impedance state.

In one further embodiment, control 450 is operative to detect a sequence of voltages modulated on $V_{pse\_safe}$ which constitutes an address thereby allowing for multi-chip parallel operation as will be described further hereinto below in relation to FIGS. 6A-6C, or to prevent accidental transmission due to normal voltage transients.

The multi-bit location data stored within multi-bit location data storage 470 may be a unique multi-bit identification code drawn from a global numbering pool at manufacturing and preferably further affixed externally with a bar code. Such a bar code enables error free reading of the multi-bit identification and the correct association of the location with the correct multi-bit identification. In another embodiment the multi-bit location data comprises complete physical location information. Preferably, the location data is formatted as a Presence Information Document Format—Location Object (PIDF-LO). In one embodiment the location data comprises a geographic location including without limitation at least some of latitude, longitude, elevation and the datum which identifies the cording system used. In one further embodiment the location data is formatted using the World Geodetic System datum. In another embodiment the location data comprises a civic location constituted of a set of elements that describe detailed street address information. In one ever further embodiment location data comprises security or access information, including but not limited to company name, floor, cubicle or room location and hazardous material information. In one embodiment the multi-bit location data, being constituted of an identification code, is set via switches associated with transmitting module 410. In another embodiment, in which either an identification code or geographical data may be utilized, the multi-bit location data is loaded at an installation phase by one of a wired and a wireless connection preferably by a dedicated program on a portable computer or through dedicated functionality of a cabling tester. In yet another embodiment the multi-bit location data is transmitted by the PSE to transmitting module 410 at installation as an AC signal modulating a voltage such as an AC signal modulating $V_{pse\_safe}$. The location data input is stored in multi-bit location data storage 470 by one or more of switches, analog resistor valves, silicon activated fuses, non-volatile RAM, flash memory and read only memory.

Figure 3B:
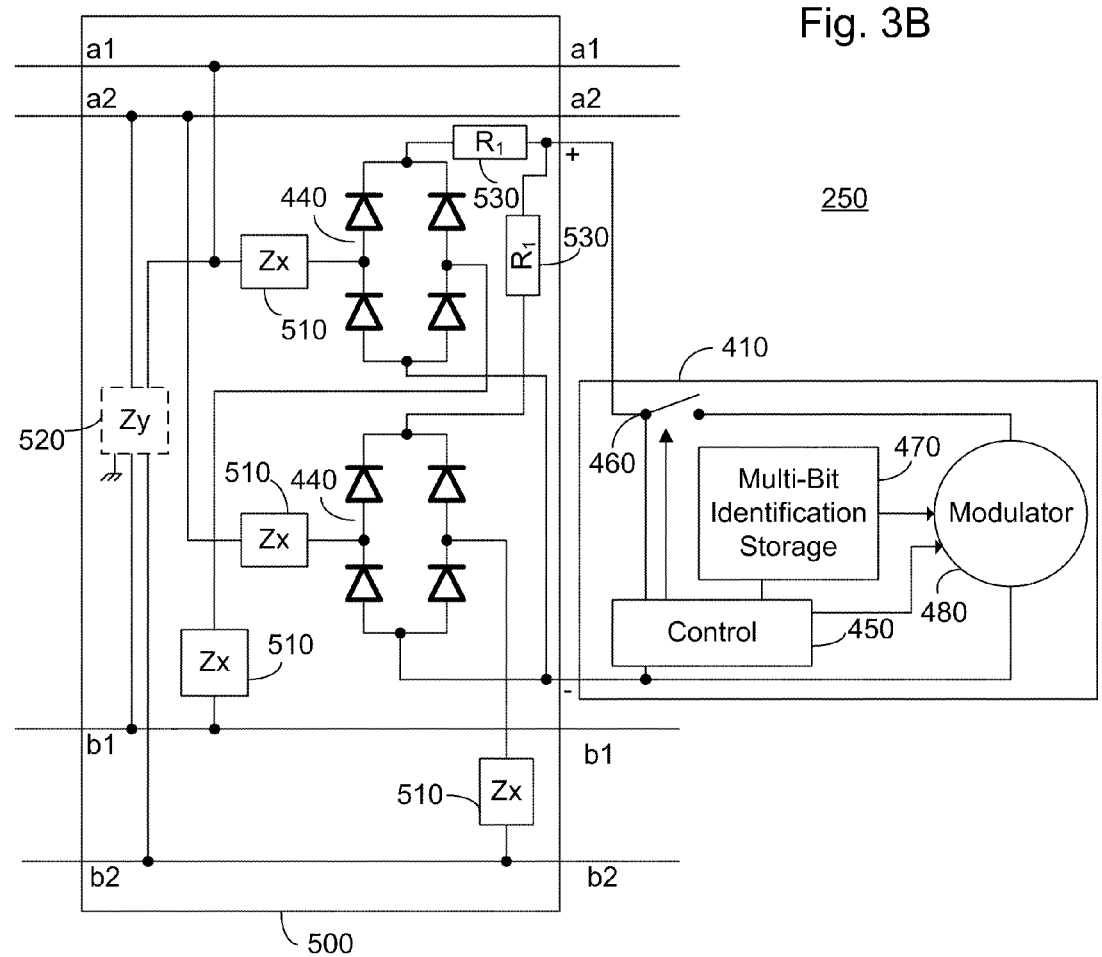
FIG. 3B illustrates a high level schematic of second embodiment of the location identifier of FIGS. 2A, 2B in accordance with a principle of the invention.

FIG. 3B illustrates a second embodiment of location identifier 250 of FIGS. 2A, 2B in accordance with a principle of the invention comprising an interface 500 and a transmitting module 410. Interface 500 comprises: a first and second diode bridge 440; a first, second, third and fourth impedance 510; an impedance 520; and a first and second resistance 530. Transmitting module 410 comprises: a control 450; an electronically controlled switch 460; a multi-bit location data storage 470; and a current modulator 480. A single interface 500 connected to two twisted wire pairs are shown, however this is for ease of illustration and is not meant to be limiting in any way. Preferably a pair of interfaces 500 are supplied, a first interface 500 being attached to the data pairs (equivalent to RJ-45 pins 1, 2, 3 and 6 as described in IEEE 802.3af) and a second interface 500 being attached to the spare pairs (equivalent to RJ-45 pins 4, 5, 7 and 8 as described in IEEE 802.3af).

First impedance 510 is connected between a first conductor, labeled conductor $a_1$, of a first pair of conductors, and a first input of first diode bridge 440. A first input of impedance 520 is further connected to first conductor $a_1$. Second impedance 510 is connected between a second conductor, labeled conductor $a_2$, of the first pair of conductors, and a first input of second diode bridge 440. A second input of impedance 520 is further connected to second conductor $a_2$. Conductors $a_1$, $a_2$ represent a first twisted pair connection in accordance with the above mentioned IEEE 802.3af standard. Third impedance 510 is connected between a first conductor, labeled conductor $b_1$, of a second pair of conductors, and a second input of first diode bridge 440. A third input of impedance 520 is further connected to second conductor $b_1$. Fourth impedance 510 is connected between a second conductor, labeled conductor $b_2$, of the second pair of conductors, and a second input of second diode bridge 440. Conductors $b_1$, $b_2$ represent a second twisted pair connection in accordance with the above mentioned IEEE 802.3af standard. A second input of impedance 520 is further connected to second conductor $b_2$. Impedance 520 is further connected to a chassis ground.

The positive output of first diode bridge 440 is connected via first resistance 530 to the positive output of interface 500, and the positive output of second diode bridge 400 is similarly connected via second resistance 530 to the positive output of interface 500. The return of first diode bridge 440 is connected to the return of second diode bridge 440 and represents the return output of interface 500.

The positive output of interface 500 is connected to the input of electronically controlled switch 460 and to the input of control 450. Control 450 is connected the gate input of electronically controlled switch 460, to the data control of multi-bit location data storage 470 and the control input of current modulator 480. The data output of multi-bit location data storage 470 is connected to the input of current modulator 480. The switched output of electronically controlled switch 460 is connected to current modulator 480. The return of interface 500 is connected to control 450 and to the return output of current modulator 480.

First, second, third and fourth impedance 510 are optional, and are selected as required to match the impedance of the combination of interface 500 and transmitting module 410 to the cable impedance of inductor pairs $a_1$, $a_2$ and $b_1$, $b_2$ so as to reduce attenuation, return loss and transmission loss. Preferably, interface 500 enables location identifier 250 to meet connecting hardware level requirements for performance according to Category 5e, Category 6 and Category 7A as defined by TIE/EIA 568 referenced above Impedance 520 is optionally, and is only required to complete the impedance matching. Preferably, interface 500 is constituted of silicon technology exhibiting a high impedance at the operative high speed data frequency.

In operation, interface 500 provides power for transmitting module 410 and further provides impedance matching for the twisted wire pairs of the communication cabling. Preferably, transmitting module 410 operates on a minimal amount of current, further preferably on the order of 2 mA. Control 450 is operative to monitor the input voltage, and in accordance with the method described in relation to FIGS. 2C, 2D is operative to detect a voltage within the classification range, or within the predetermined parameters for $V_{pse\_safe}$. Responsive to the detected voltage level, control 450 closes electronically controlled switch 460 and operates current modulator 480 to modulate the current flow between the first pair conductors $a_1$, $a_2$ and the second pair of conductors $b_1$, $b_2$ so as to transmit the multi-bit identification stored in multi-bit location data storage 470. Preferably, transmission is accomplished in a common mode signaling orthogonal to high speed data transmission according to IEEE 802.3. After completion of the transmission, control 450 is operative to open electronically controlled switch 460, thereby returning the combination of interface 500 and transmitting module 410 to a high impedance state.

In one further embodiment, control 450 is operative to detect a sequence of voltages modulated on $V_{pse\_safe}$ which constitutes an address thereby allowing for multi-chip parallel operation as will be described further hereinto below in relation to FIGS. 6A-6C, or to prevent accidental transmission due to normal voltage transients.

The multi-bit location data stored within multi-bit location data storage 470 may be a unique multi-bit identification code drawn from a global numbering pool at manufacturing and preferably further affixed externally with a bar code. Such a bar code enables error free reading of the multi-bit identification and the correct association of the location with the correct multi-bit identification. In another embodiment the multi-bit location data comprises complete physical location information. Preferably, the location data is formatted as a Presence Information Document Format—Location Object (PIDF-LO). In one embodiment the location data comprises a geographic location including without limitation at least some of latitude, longitude, elevation and the datum which identifies the cording system used. In one further embodiment the location data is formatted using the World Geodetic System datum. In another embodiment the location data comprises a civic location constituted of a set of elements that describe detailed street address information. In one ever further embodiment location data comprises security or access information, including but not limited to company name, floor, cubicle or room location and hazardous material information. In one embodiment the multi-bit location data, being constituted of an identification code, is set via switches associated with transmitting module 410. In another embodiment, in which either an identification code or geographical data may be utilized, the multi-bit location data is loaded at an installation phase by one of a wired and a wireless connection preferably by a dedicated program on a portable computer or through dedicated functionality of a cabling tester. In yet another embodiment the multi-bit location data is transmitted by the PSE to transmitting module 410 at installation as an AC signal modulating a voltage such as an AC signal modulating $V_{pse\_safe}$. The location data input is stored in multi-bit location data storage 470 by one or more of switches, analog resistor valves, silicon activated fuses, non-volatile RAM, flash memory and read only memory.

Figure 3C:
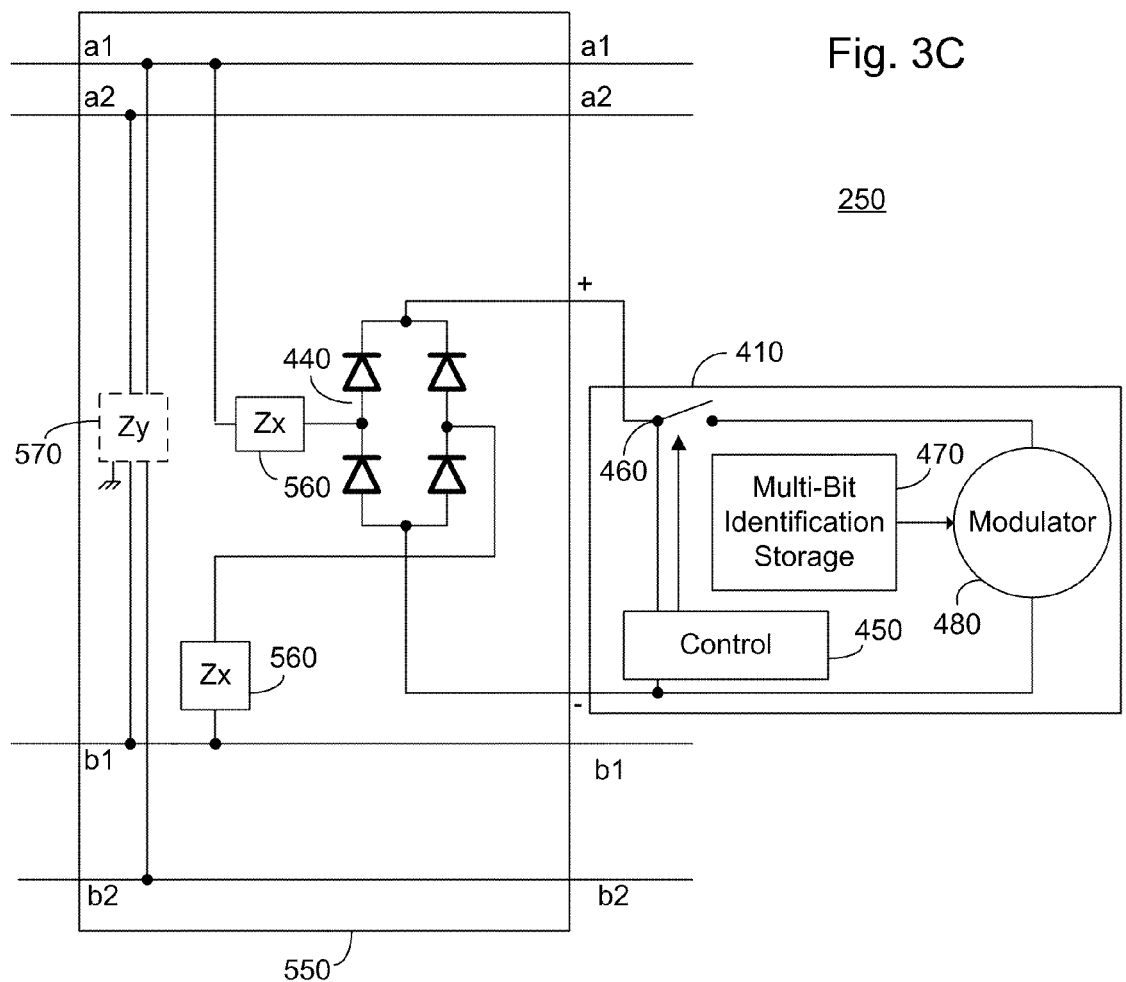
FIG. 3C illustrates a high level schematic of a third embodiment of the location identifier of FIGS. 2A, 2B in accordance with a principle of the invention.

FIG. 3C illustrates a third embodiment of location identifier 250 of FIGS. 2A, 2B in accordance with a principle of the invention comprising an interface 550 and a transmitting module 410. Interface 550 comprises: a diode bridge 440; a first and second impedance 560; and an impedance 570. Transmitting module 410 comprises: a control 450; an electronically controlled switch 460; a multi-bit location data storage 470; and a current modulator 480. A single interface 550 connected to two twisted wire pairs are shown, however this is for ease of illustration and is not meant to be limiting in any way. Preferably a pair of interfaces 550 are supplied, a first interface 550 being attached to the data pairs (equivalent to RJ-45 pins 1, 2, 3 and 6 as described in IEEE 802.3af) and a second interface 550 being attached to the spare pairs (equivalent to RJ-45 pins 4, 5, 7 and 8 as described in IEEE 802.3af).

First impedance 560 is connected between a first conductor, labeled conductor $a_1$, of a first pair of conductors, and a first input of diode bridge 440. A first input of impedance 570 is further connected to first conductor $a_1$. A second input of impedance 570 is further connected to second conductor, labeled conductor $a_2$, of the first pair of conductors. The first pair of conductors labeled $a_1$, $a_2$, represent a first twisted pair connection in accordance with the above mentioned IEEE 802.3af standard. Second impedance 560 is connected between a first conductor, labeled conductor $b_1$, of a second pair of conductors, and a second input of diode bridge 440. A third input of impedance 570 is further connected to first conductor $b_1$. A fourth input of impedance 570 is further connected to a second conductor, labeled $b_2$, of the second pair of conductors. The second pair of conductors labeled $b_1$, $b_2$, represent a second twisted pair connection in accordance with the above mentioned IEEE 802.3af standard. Impedance 570 is further connected to a chassis ground. The positive output of diode bridge 440 represents the positive output of interface 550 and the return of diode bridge 440 represents the return output of interface 500.

The positive output of interface 500 is connected to the input of electronically controlled switch 460 and to the input of control 450. Control 450 is connected the gate input of electronically controlled switch 460, to the data control of multi-bit location data storage 470 and the control input of current modulator 480. The data output of multi-bit location data storage 470 is connected to the input of current modulator 480. The switched output of electronically controlled switch 460 is connected to current modulator 480. The return of interface 500 is connected to control 450 and to the return output of current modulator 480.

First and second impedances 560 are optional, and are selected as required to match the impedance of the combination of interface 550 and transmitting module 410 to the cable impedance of inductor pairs $a_1$, $a_2$ and $b_1$, $b_2$ so as to reduce attenuation, return loss and transmission loss caused by first and second inductor 420. Preferably, interface 400 enables location identifier 250 to meet connecting hardware level requirements for performance according to Category 5e, Category 6 and Category 7A as defined by TIE/EIA 568 referenced above. Impedance 570 is optional and is only required to complete the impedance matching. Preferably, interface 550 is constituted of constituted of silicon technology exhibiting a high impedance at the operative high speed data frequency.

In operation, interface 550 provides power for transmitting module 410 and further provides an impedance matching for the twisted wire pairs of the communication cabling. Preferably, transmitting module 410 operates on a minimal amount of current, further preferably on the order of 2 mA. Control 450 is operative to monitor the input voltage, and in accordance with the method described in relation to FIGS. 2C, 2D is operative to detect a voltage within the classification range or within the predetermined parameters for $V_{pse\_safe}$. Responsive to the detected voltage level, control 450 closes electronically controlled switch 460 and operates current modulator 480 to modulate the current flow between the first pair conductors $a_1$, $a_2$ and the second pair of conductors $b_1$, $b_2$ so as to transmit the multi-bit identification stored in multi-bit location data storage 470. Preferably, transmission is accomplished in a common mode signaling orthogonal to high speed data transmission according to IEEE 802.3. After completion of the transmission, control 450 is operative to open electronically controlled switch 460, thereby returning the combination of interface 550 and transmitting module 410 to a high impedance state.

In one further embodiment, control 450 is operative to detect a sequence of $V_{pse\_safe}$ which constitutes an address thereby allowing for multi-chip parallel operation as will be described further hereinto below in relation to FIGS. 6A-6C, or to prevent accidental transmission due to normal voltage transients.

The multi-bit location data stored within multi-bit location data storage 470 may be a unique multi-bit identification code drawn from a global numbering pool at manufacturing and preferably further affixed externally with a bar code. Such a bar code enables error free reading of the multi-bit identification and the correct association of the location with the correct multi-bit identification. In another embodiment the multi-bit location data comprises complete physical location information. Preferably, the location data is formatted as a Presence Information Document Format—Location Object (PIDF-LO). In one embodiment the location data comprises a geographic location including without limitation at least some of latitude, longitude, elevation and the datum which identifies the cording system used. In one further embodiment the location data is formatted using the World Geodetic System datum. In another embodiment the location data comprises a civic location constituted of a set of elements that describe detailed street address information. In one ever further embodiment location data comprises security or access information, including but not limited to company name, floor, cubicle or room location and hazardous material information. In one embodiment the multi-bit location data, being constituted of an identification code, is set via switches associated with transmitting module 410. In another embodiment, in which either an identification code or geographical data may be utilized, the multi-bit location data is loaded at an installation phase by one of a wired and a wireless connection preferably by a dedicated program on a portable computer or through dedicated functionality of a cabling tester. In yet another embodiment the multi-bit location data is transmitted by the PSE to transmitting module 410 at installation as an AC signal modulating a voltage such as an AC signal modulating $V_{pse\_safe}$. The location data input is stored in multi-bit location data storage 470 by one or more of switches, analog resistor valves, silicon activated fuses, non-volatile RAM, flash memory and read only memory.

It is to be understood that location identifier is designed to not be moved separately from TO 240. This can be accomplished by producing an integrated TO 240 having embedded therein location identifier 250. However, in certain circumstances it may be desirable to provide a location identifier which may be installed with a TO 240 of the prior art. FIGS. 3D-3J as described further hereinto below provide a means of adapting the location identifier of the present invention for use with a TO of the prior art.

FIG. 3D illustrates a high level schematic view of a first embodiment of a location identifier according to a principle of the invention constituted of a module 580 arranged for connection in parallel to the horizontal cabling connection on the rearward end of a TO 582 of the prior art. Module 580 is thus typically connected to the punch down connector of TO 582 in parallel with a DTE or PD connected thereto by horizontal cabling. RJ-45 plug 584 exhibiting tongue 586 is further shown at the front end of TO 582, tongue 586 exhibiting a spring action to removably secure RJ-45 plug 584 within TO 582 as known to those skilled in the art.

FIG. 3E illustrates a high level schematic view of a second embodiment of a location identifier 588 according to a principle of the invention, location identifier 588 being configured and dimensioned to be inserted into the face end of TO 582 of the prior art, prevent user removal and accept a removable RJ-45 plug. Location identifier 588 thus comprises an extended portion 592 exhibiting a shape dimensioned to mate within the female front end of an RJ-45 connector, a widened front end 593 arranged to accommodate an RJ-45 plug, and a shortened tongue 590 configured and dimensioned to prevent the removal for location identifier 588 from the RJ-45 connector as will be described further hereinto below in relation to FIG. 3G.

FIG. 3F illustrates a high level schematic view of location identifier 588 of FIG. 3E inserted within a TO 582 of the prior art, exhibiting widened front end 593 flush with the face of TO 582. RJ-45 plug 584 is further shown adjacent to widened front end 593 arranged to be removably inserted therein.

FIG. 3G illustrates a high level schematic view of location identifier 588 of FIG. 3E and in particular a latching mechanism 594 located near the front end of extended portion 592 preventing removal according to a principle of the invention. Latching mechanism 594 exhibits a pair of shortened tongue portions at either side of the top end of extended portion 592, each exhibiting a spring action. Latching mechanism 594 is configured and dimensioned to be inserted into a TO 582 of the prior art, with latching mechanism 594 in place of tongue 586. Thus, due to the lack of an extended tongue, and preferably further due to the lack of a central portion of the latching mechanism, removal is complicated and is beyond the means of the unsophisticated user.

FIG. 3H illustrates a high level schematic view of a third embodiment of a location identifier 600 according to a principle of the invention, the third embodiment being designed to be inserted between the connector block 596 exhibiting punch down connectors 598 of a TO 582 of the prior art and horizontal cabling 608 for connection to a DTE. Location identifier 600 exhibits a plurality of connection pins 602 configured and dimensioned to mate with connector block 596 of TO 582 and a connector block 604 arranged to receive a plurality of wires 606 of horizontal cabling 608. Thus, a front end of location identifier 600 is configured to be connected at the rearward end of TO 582 of the prior art and a rearward end of location identifier 600 is configured to receive horizontal cabling 608. FIG. 3J illustrates a high level schematic view of location identifier 600 of FIG. 3H connected to connector block 596 of TO 582.

Figure 4A:
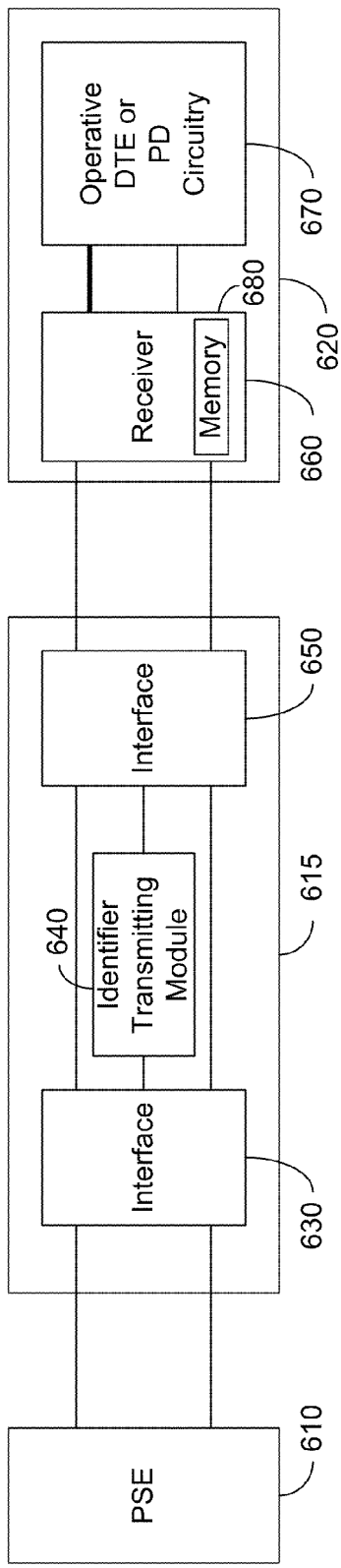
FIG. 4A illustrates a high level block diagram of an embodiment of the invention comprising a location identifier associated with a TO, the location identifier being operative to transmit multi-bit location data towards the DTE in accordance with a principle of the invention.

FIG. 4A illustrates a high level block diagram of an embodiment of the invention comprising an identifier associated with a telecommunications outlet, the identifier being operative to transmit location data towards the data terminal equipment in accordance with a principle of the invention. The embodiment of FIG. 4A comprises: a PSE 610; a location identifier 615; and a DTE or PD 620. PSE 610 may comprise endpoint PSE 220 or midspan power sourcing equipment 300 as described above in relation to FIGS. 2A, 2B, one of endpoint PSE 40 or midspan PSE 170 as described above in relation to FIGS. 1A and 1B, or may be replaced with a current limited voltage source operative to supply the power as described hereinto below. Thus, the use of a PSE according to IEEE 802.3af is not required for the invention, and is described herein solely as a commercially available means of implementing at least one embodiment of the invention. Location identifier 615 comprises a PSE side interface 630, a transmitting module 640, and a DTE or PD side interface 650. DTE or PD 620 comprises a receiver 660 and an operative PD or DTE circuitry 670.

PSE 610 is connected by at least two twisted pair connections to location identifier 615. PSE side interface 630, which may similar to one of interface 400, 500 and 550 of FIGS. 3A, 3B and 3C, is connected to receive a common mode voltage signal from PSE 610, and to exhibit an impedance match to the twisted pair connections. Transmitting module 640 is connected to receive power from PSE side interface 630, and is further connected to transmit a multi-bit location data to receiver 660 via DTE or PD side interface 650. DTE or PD side interface 650 may be similar to interface 400 of FIG. 3A, in which diode bridge 400 is replaced with a plurality of switches controlled by identifier transmitting module 640, and is arranged to connect transmitting module 640 to receiver 660 while exhibiting an impedance match to the twisted pair connections and preventing the input and output of identifier transmitting module 640 from interfering with each other. Operative PD or DTE circuitry 670 is connected to receive decoded location data from receiver 660, to receive high speed data according to IEEE 802.3 from the twisted pair connections, and in the event operative PD or DTE circuitry 670 comprises a PD, to receive operative power from PSE 610 via the twisted pair connections. Receiver 660 is further connected by a communications link to operative PD or DTE circuitry 670.

In one embodiment receiver 660 comprises a common mode receiver, in which a signal is transmitted as a difference between two twisted wire pairs. In another embodiment receiver 660 comprises a differential mode receiver.

In operation, transmitting module 640 senses a voltage presented by PSE 610, the voltage preferably being above the detection voltage. In one embodiment the detected voltage is $V_{pse\_safe}$ as described above; in another embodiment in the event that DTE or PD 620 comprises a PD the detected voltage is the classification voltage; in another embodiment the detected voltage is a voltage above the classification voltage and below the operative voltage; and in yet another embodiment the detected voltage is an operating voltage for the PD. In at least one embodiment such a voltage is supplied by PSE 610 for a pre-determined time period to charge an internal capacitor (not shown) of transmitting module 640. At the expiration of the pre-determined time period, PSE 610 shuts of the power thus isolating transmitting module 640 from the low impedance power source of PSE 610. Furthermore, preferably switches within identifier transmitting module 640 are operative to isolate the output of identifier transmitting module 640 from its input.

Transmitting module 640, responsive to the detected voltage followed by the removal of the detected voltage is operative to transmit a multi-bit location data stored therein towards receiver 660 of DTE or PD 620. After completion of the transmission, transmitting module 640 returns to a high impedance state. Receiver 660, which may be operative in the absence of power being supplied by PSE 610, receives the multi-bit location data. In one embodiment receiver 660 accepts operating power from the transmitted signal from transmitting module 640, and in another embodiment receiver 660 is provided with a power source such as a rechargeable battery. In the event DTE or PD 620 comprises a PD, after powering up of the PD, receiver 660 transmits the received multi-bit location data to operative PD or DTE circuitry 670. In the event that DTE or PD 620 comprises a DTE, after the DTE has completed an initiation phase, the DTE request location data from receiver 660, and in response receiver 660 transmits the received multi-bit location data to operative PD or DTE circuitry 670.

Optionally and additionally, transmitting module 640 is operational in a manner described above in relation to FIGS. 2A-2D to further transmit multi-bit location data to PSE 610.

Figure 4B:
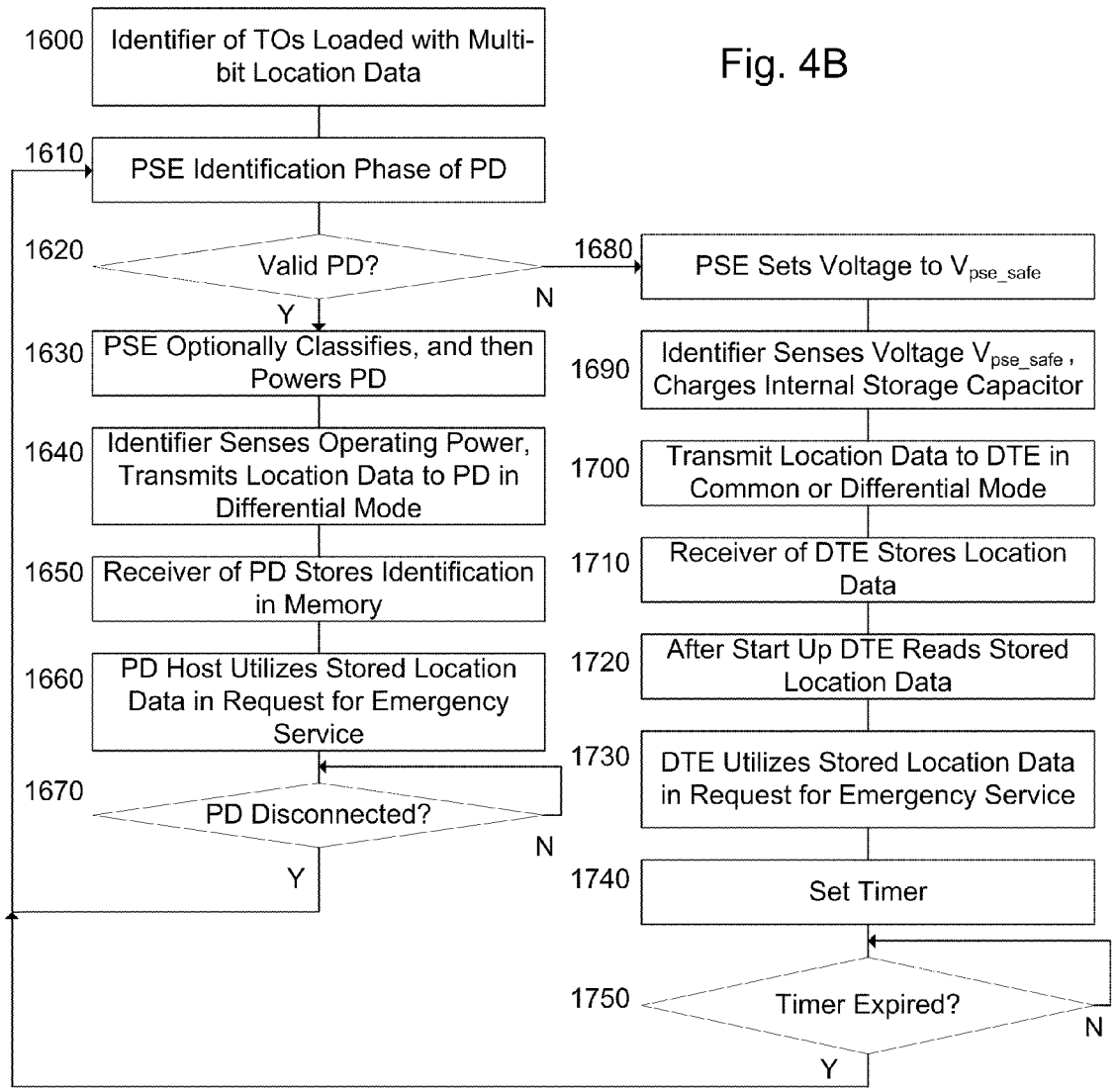
FIG. 4B illustrates a high level flow chart of an embodiment of the operation of the location identifier of FIG. 4A to transmit multi-bit location data towards the DTE in accordance with a principle of the invention.

FIG. 4B illustrates a high level flow chart of an embodiment of the operation of the location identifier of FIG. 4A to transmit a multi-bit location data associated with a location towards the DTE in accordance with a principle of the invention. In stage 1600 the identifier transmitting module 640 of each TO 610 is loaded with location data. Preferably, the location data is formatted as a Presence Information Document Format—Location Object (PIDF-LO). In one embodiment the location data comprises a geographic location including without limitation at least some of latitude, longitude, elevation and the datum which identifies the cording system used. In one further embodiment the location data is formatted using the World Geodetic System datum. In another embodiment the location data comprises a civic location constituted of a set of elements that describe detailed street address information. In one ever further embodiment location data comprises security or access information, including but not limited to company name, floor, cubicle or room location and hazardous material information. In one embodiment the multi-bit location data, being constituted of an identification code, is set via switches associated with transmitting module 640. In another embodiment, in which either an identification code or geographical data may be utilized, the multi-bit location data is loaded at an installation phase by one of a wired and a wireless connection preferably by a dedicated program on a portable computer or through dedicated functionality of a cabling tester. In yet another embodiment the multi-bit location data is transmitted by the PSE to transmitting module 640 at installation as an AC signal modulating a voltage such as an AC signal modulating $V_{pse\_safe}$. The location data is stored in multi-bit location data storage 640 by one or more of switches, analog resistor valves, silicon activated fuses, non-volatile RAM, flash memory and read only memory. In an exemplary embodiment stage 1600 is accomplished manually or semi-manually at time of installation, with any updates being similarly accomplished manually or semi-manually as incurred.

In stage 1610, PSE 610 presents an identification voltage to DTE or PD 620. In the event that DTE or PD 620 comprises a PD, in stage 1620 the identification resistance presented by PD 620 is recognized as being within a valid range, and in stage 1630 PSE 610 optionally classifies PD 620 and then powers PD 620. In stage 1640, identifier transmitting module 640 senses the operating power and transmits the location data loaded in stage 1600 to PD 620 via differential mode signaling in which data is transmitted by a connection to one of the data pairs. In one embodiment PD 620 is operative to prevent powering of operative DTE or PD circuitry 670 for a pre-determined time to allow for receipt of location data without interference. Preferably, identifier transmitting module first charges up an internal capacitor and then disconnects the input connection, so that the output differential signaling does not interfere with the input. In another embodiment in which the communication described in pending U.S. patent application Ser. No. 10/961,108 to Darshan et al incorporated above is present, transmitting module 640 transmits before or after the transmission time of the PD. In yet another embodiment transmission is accomplished by signaling at a lower frequency than the high speed transmission of data according to the IEEE 802.3 Ethernet standard, however using differential signaling as described in the above standard. Receiver 660 is operative to filter out the signals at the lower frequency. In yet another embodiment, transmission is at a frequency as described in the above IEEE 802.3 Ethernet standard, however interference is minimized since data transmission does not occur immediately upon powering.

In stage 1650 receiver 660, powered by operating power from PSE 610 senses the location data transmission, receives the location data and stores the received location data in memory 680.

In stage 1660, in the event of an emergency call being placed by a user utilizing operative PD or DTE circuitry 670, which in an exemplary embodiment comprises a VoIP telephone or computer having VoIP capability, operative PD or DTE circuitry 670 transmits the request for emergency services along with the location data received and stored in stage 1650.

In stage 1670 the status of PD 620 identified and classified in stages 1610, 1630 is monitored to ensure that PD 620 is still drawing power and thus has not been disconnected. It is to be understood, that preferably the PSE monitors a maintain power signature and thus in the event that a PD 620 is powered and subsequently disconnected the PSE is notified of the disconnection. In the event that PD 620 has not disconnected stage 1670 is repeated. In the event PD 620 has been detected as being disconnected stage 1610 as described above is repeated.

In the event that in stage 1620 DTE or PD 620 does not comprise a PD, and thus in stage 1620 the identification resistance presented by DTE or PD 620 is not recognized as being within a valid range, in stage 1680 PSE 610 sets its output voltage to $V_{pse\_safe}$. In an exemplary embodiment DTE 620 is not harmed by 150 mW of power. Thus, for a standard 75 ohm termination of DTE 620, a $V_{pse\_safe}$ of about 15 volts for a pre-determined period not exceeding 5% of predetermined time is applied. In an exemplary embodiment $V_{pse\_safe}$ is supplied for no more than 50 milliseconds in a period of 1 second. Thus, for example, transmitting at 1 kilobit/sec will enable transmission of 50 bits per $V_{pse\_safe}$ cycle. The 5% duty cycle thus supplies the power for the pre-determined time sufficient to operate the electrical circuits in the embodiment presented herein and to allow for transmission, while maintaining a low average power.

In stage 1690, identifier transmitting module 640 senses voltage $V_{pse\_safe}$ and is operative to charge an internal storage capacitor (not shown) from the PSE utilizing the voltage $V_{pse\_safe}$. In stage 1700, after PSE 610 has sourced $V_{pse\_safe}$ for a pre-determined period of time calculated to be sufficient to charge up the internal storage capacitor thus providing sufficient power for identifier transmitting module 640, PSE 610 removes the voltage $V_{pse\_safe}$ and identifier transmitting module 640 outputs a voltage signal to DTE 620 thus transmitting the location data stored in stage 1600. It is to be understood that in the event DTE or PD 620 is a DTE, typically a network interface card is presented, which passes $V_{pse\_safe}$ as a small current. In stage 1710, receiver 660 stores the received data in memory 680. Identifier transmitting module 640 preferably transmits via differential mode signaling. In an alternative embodiment, identifier transmitting module 640 modulates the output signal resulting from $V_{pse\_safe}$ thus transmitting in a common mode. In another embodiment identifier transmitting module 640 transmits the location data via a differential signal in a frequency out of the normal Ethernet transmission frequency.

In stage 1720, after operative PD or DTE circuitry 670 has completed an initialization phase, operative PD or DTE circuitry 670 reads the location data stored in stage 1710.

Thus, in the event of an emergency call being placed by a user utilizing operative PD or DTE circuitry 670, which in an exemplary embodiment comprises a VoIP telephone or computer having VoIP capability, in stage 1730 operative PD or DTE circuitry 670 transmits the request for emergency services along with the location data read in stage 1720.

In stage 1740, PSE 610 sets an internal timer. In one embodiment the internal timer is set for a 1 minute interval. In stage 1750 the timer set is stage 1740 is checked for expiration. In the event the timer has not expired, stage 1750 is repeated. In the event the time has expired stage 1610 as described above is again performed.

FIG. 4C illustrates a high level flow chart of an embodiment of the operation of the location identifier of FIG. 4A to transmit multi-bit location data towards the DTE utilizing a classification voltage in accordance with a principle of the invention.

In stage 1800 the identifier transmitting module 640 of each TO 610 is loaded with location data. Preferably, the location data is formatted as a Presence Information Document Format—Location Object (PIDF-LO). In one embodiment the location data comprises a geographic location including without limitation at least some of latitude, longitude, elevation and the datum which identifies the cording system used. In one further embodiment the location data is formatted using the World Geodetic System datum. In another embodiment the location data comprises a civic location constituted of a set of elements that describe detailed street address information. In one ever further embodiment location data comprises security or access information, including but not limited to company name, floor, cubicle or room location and hazardous material information. In one embodiment the multi-bit location data, being constituted of an identification code, is set via switches associated with transmitting module 640. In another embodiment, in which either an identification code or geographical data may be utilized, the multi-bit location data is loaded at an installation phase by one of a wired and a wireless connection preferably by a dedicated program on a portable computer or through dedicated functionality of a cabling tester. In yet another embodiment the multi-bit location data is transmitted by the PSE to transmitting module 640 at installation as an AC signal modulating a voltage such as an AC signal modulating $V_{pse\_safe}$. The location data is stored in multi-bit location data storage 640 by one or more of switches, analog resistor valves, silicon activated fuses, non-volatile RAM, flash memory and read only memory. In an exemplary embodiment stage 1600 is accomplished manually or semi-manually at time of installation, with any updates being similarly accomplished manually or semi-manually as incurred.

In stage 1810, PSE 610 presents an identification voltage to DTE or PD 620. In the event that DTE or PD 620 comprises a PD, in stage 1820 the identification resistance presented by PD 620 is recognized as being within a valid range, and in stage 1830 PSE 620 outputs a classification level voltage to PD 620. In stage 1840, identifier transmitting module 640 senses the classification voltage level and charges an internal capacitor (not shown). In stage 1850, after a pre-determined time period calculated to be sufficient to charge the internal capacitor of identifier transmitting module 640, PSE 610 disconnects power thus presenting a high impedance to identifier transmitting module 640. In stage 1860 identifier transmitting module 640 transmits the location data loaded in stage 1600 to PD 620 via one of common mode signaling and differential mode signaling to PD 620 via voltage pulses using the energy stored in the internal capacitor charged in stage 1840. In one embodiment PD 620 is operative to prevent powering of operative DTE or PD circuitry 670 for a pre-determined time to allow for receipt of location data without interference. Preferably, identifier transmitting module first charges up the internal capacitor and then disconnects the input connection so that the output differential signaling does not interfere with the input. In another embodiment in which the communication described in pending U.S. patent application Ser. No. 10/961,108 to Darshan et al incorporated above is present, transmitting module 640 transmits before or after the transmission time of the PD. In yet another embodiment transmission is accomplished by signaling at a lower frequency than the high speed transmission of data according to the IEEE 802.3 Ethernet standard, however using differential signaling as described in the above standard. Receiver 660 is operative to filter out the signals at the lower frequency. In yet another embodiment, transmission is at a frequency as described in the above IEEE 802.3 Ethernet standard, however interference is minimized since data transmission does not occur immediately upon powering.

In stage 1870 receiver 660, optionally powered from the voltage pulses transmitted in stage 1860, senses the location data transmission, receives the location data and stores the received location data in memory 680.

In stage 1880, in the event of an emergency call being placed by a user utilizing operative PD or DTE circuitry 670, which in an exemplary embodiment comprises a VoIP telephone or computer having VoIP capability, operative PD or DTE circuitry 670 transmits the request for emergency services along with the location data received and stored in stage 1870.

In stage 1890 the status of PD 620 identified in stage 1810, 1820 is monitored to ensure that PD 620 is still drawing power and thus has not been disconnected. It is to be understood, that preferably the PSE monitors a maintain power signature and thus in the event that a PD 620 is powered and subsequently disconnected the PSE is notified of the disconnection. In the event that PD 620 has not disconnected stage 1890 is repeated. In the event PD 620 has been detected as being disconnected stage 1810 as described above is repeated.

In the event that in stage 1820 DTE or PD 620 does not comprise a PD, and thus in stage 1820 the identification resistance presented by DTE or PD 620 is not recognized as being within a valid range, in stage 1900 PSE 610 sets its output voltage to $V_{pse\_safe}$. In an exemplary embodiment DTE 620 is not harmed by 150 mW of power. Thus, for a standard 75 ohm termination of DTE 620, a $V_{pse\_safe}$ of about 15 volts for a pre-determined period not exceeding 5% of predetermined time is applied. In an exemplary embodiment $V_{pse\_safe}$ is supplied for no more than 50 milliseconds in a period of 1 second. Thus, for example, transmitting at 1 kilobit/sec will enable transmission of 50 bits per $V_{pse\_safe}$ cycle. The 5% duty cycle thus supplies the power for the pre-determined time sufficient to operate the electrical circuits in the embodiment presented herein and to allow for transmission, while maintaining a low average power.

In stage 1920, identifier transmitting module 640 senses voltage $V_{pse\_safe}$ and is operative to charge an internal storage capacitor (not shown) from the PSE utilizing the voltage $V_{pse\_safe}$. In stage 1930, after PSE 610 has sourced $V_{pse\_safe}$ for a pre-determined period of time calculated to be sufficient to charge up the internal storage capacitor thus providing sufficient power for identifier transmitting module 640, PSE 610 removes the voltage $V_{pse\_safe}$ and identifier transmitting module 640 outputs a voltage signal to DTE 620 thus transmitting the location data stored in stage 1800. It is to be understood that in the event DTE or PD 620 is a DTE, typically a network interface card is presented, which passes $V_{pse\_safe}$ as a small current. In stage 1950, receiver 660 stores the received data in memory 680. Identifier transmitting module 640 preferably transmits via differential mode signaling. In an alternative embodiment, identifier transmitting module 640 modulates the output signal resulting from $V_{pse\_safe}$ thus transmitting in a common mode. In another embodiment identifier transmitting module 640 transmits the location data via a differential signal in a frequency out of the normal Ethernet transmission frequency.

In stage 1940, after operative PD or DTE circuitry 670 has completed an initialization phase, operative PD or DTE circuitry 670 reads the location data stored in stage 1930.

Thus, in the event of an emergency call being placed by a user utilizing operative PD or DTE circuitry 670, which in an exemplary embodiment comprises a VoIP telephone or computer having VoIP capability, in stage 1950 operative PD or DTE circuitry 670 transmits the request for emergency services along with the location data read in stage 1940.

In stage 1960, PSE 610 sets an internal timer. In one embodiment the internal timer is set for a 1 minute interval. In stage 1970 the timer set is stage 1960 is checked for expiration. In the event the timer has not expired, stage 1970 is repeated. In the event the time has expired, stage 1810 as described above is again performed.

Figure 5A:
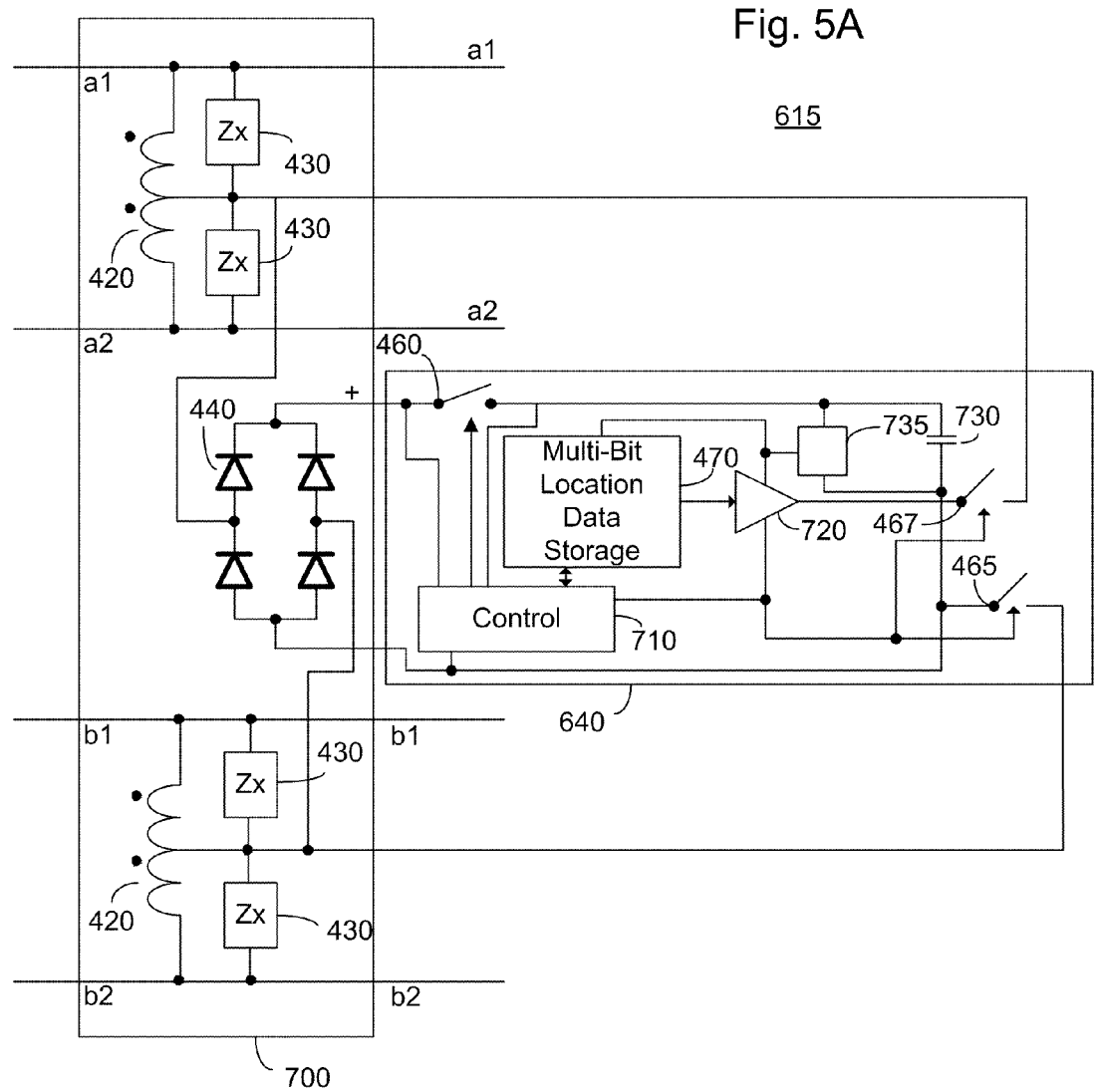
FIG. 5A illustrates a high level block diagram of an embodiment of location identifier of FIG. 4A in which a PSE side interface and a DTE side interface are combined into a combined interface in accordance with a principle of the invention.

FIG. 5A illustrates a high level block diagram of an embodiment of location identifier 615 of FIG. 4A in which PSE side interface 630 and DTE or PD side interface 650 are constituted of a combined interface 700 in accordance with a principle of the invention. Location identifier 615 comprises combined interface 700 and a transmitting module 640. Combined interface 700 comprises: a first and second center tapped inductor 420; a first, second, third and fourth impedance 430; and a diode bridge 440. Transmitting module 640 comprises: a control 710; a multi-bit location data storage 470; an electronically controlled switch 460; an electronically controlled switch 465; an electronically controlled switch 467; a signal driver 720; a storage capacitor 730; and a voltage regulator 735.

First center tapped inductor 420 is connected across a first pair of conductors labeled $a_1$, $a_2$, the first pair of conductors representing a first twisted pair connection in accordance with the above mentioned IEEE 802.3af standard. The center tap of first center tapped conductor 420 is connected to a first input of diode bridge 440 and is further connected by way of first and second impedance 430 respectively, to conductor $a_1$, $a_2$. Second center tapped inductor 420 is connected across a second pair of conductors labeled $b_1$, $b_2$, the second pair of conductors representing a second twisted pair connection in accordance with the above mentioned IEEE 802.3af standard. The center tap of second center tapped conductor 420 is connected to a second input of diode bridge 440 and is further connected by way of third and fourth impedance 430 respectively, to conductor $b_1$, $b_2$.

The positive output of diode bridge 440, representing the positive output of combined interface 700, is connected to the input of electronically controlled switch 460 and to the input of control 710. A first output of control 710 is connected the gate input of electronically controlled switch 460, a second output of control 710 is connected to multi-bit location data storage 470, a third output of control 710 is connected to an enable input of signal driver 720 and a fourth output of control 710 is connected to the gate input of electronically controlled switches 465, 467. The output of electronically controlled switch 460 is connected to one end of storage capacitor 730 to a second isolated power input of control 710 and to the input of voltage regulator 735. The second end of storage capacitor 730 is connected to the input of electronically controlled switch 465, to the return of control 710 and to the return output of bridge 440 representing the return of combined interface 700. The output of multi-bit location data storage 470 is connected to the input of signal driver 720 and the output of signal driver 720 is connected via electronically controlled switch 467 to the center tap of first center tapped inductor 420. Voltage regulator 730 is connected in parallel to capacitor 730 and maintains a regular voltage fed to signal driver 720 and multi-bit location data storage 470. The output of electronically controlled switch 465 is connected to the center tap of second center tapped inductor 420. Power for control 710 is shown as being received from either side of first electronically controlled switch 460, and care must be taken to ensure isolation to avoid leakage around first electronically controlled switch 460. Alternatively, control 710 may comprise two sections connected by an opto-isolator.

In operation, combined interface 700 provides power for transmitting module 640 and further provides an impedance matching for the twisted wire pairs of the communication cabling so as to reduce attenuation, return loss and transmission loss. Preferably, interface 700 enables location identifier 615 to meet connecting hardware level requirements for performance according to Category 5e, Category 6 and Category 7A as defined by TIE/EIA 568 referenced above. Impedance 520 is optionally, and is only required to complete the impedance matching. In an exemplary embodiment low cost silicon based technology exhibiting a low impedance at the operative frequency of the high data transmission may be utilized in the production of combined interface 700. Combined interface 700 may be a packaged chip or a multi-chip module. Control 710 is operative to monitor the input voltage, and upon detection of an appropriate voltage level as will be described further hereinto below, is further operative to close electronically controlled switch 460 thereby charging up storage capacitor 730. Upon detection that the input voltage has dropped to approximately zero, or another pre-determined voltage, control 710 is operative to open electronically controlled switch 460 and close electronically controlled switches 465, 467.

Control 710 is further operative to transmit the multi-bit identification stored in multi-bit location data storage 470 via signal driver 720 towards receiver 660 of FIG. 4A. Power for the operation of multi-bit location data storage 470 and signal driver 720 is preferably supplied by storage capacitor 730. Thus, the operation of electronically controlled switch 460 and electronically controlled switches 465, 467 provide time domain sharing of communication cabling represented by conductors $a_1$, $a_2$ and $b_1$, $b_2$. in order to achieve the required input ot output isolation. Timing of transmission of multi-bit location data storage 470 is such that transmission is completed before a second cycle of $V_{pse\_safe}$ is to be experienced.

After completion of the transmission, control 710 is operative to open electronically controlled switch 465, 467 thereby returning the combination of combined interface 700 and transmitting module 640 to a high impedance state.

The multi-bit location data stored within multi-bit location data storage 470 may be a unique multi-bit identification code drawn from a global numbering pool at manufacturing and preferably further affixed externally with a bar code. Such a bar code enables error free reading of the multi-bit identification and the correct association of the location with the correct multi-bit identification. In another embodiment the multi-bit location data comprises complete physical location information. Preferably, the location data is formatted as a Presence Information Document Format—Location Object (PIDF-LO). In one embodiment the location data comprises a geographic location including without limitation at least some of latitude, longitude, elevation and the datum which identifies the cording system used. In one further embodiment the location data is formatted using the World Geodetic System datum. In another embodiment the location data comprises a civic location constituted of a set of elements that describe detailed street address information. In one ever further embodiment location data comprises security or access information, including but not limited to company name, floor, cubicle or room location and hazardous material information. In one embodiment the multi-bit location data, being constituted of an identification code, is set via switches associated with transmitting module 640. In another embodiment, in which either an identification code or geographical data may be utilized, the multi-bit location data is loaded at an installation phase by one of a wired and a wireless connection preferably by a dedicated program on a portable computer or through dedicated functionality of a cabling tester. In yet another embodiment the multi-bit location data is transmitted by the PSE to transmitting module 640 at installation as an AC signal modulating a voltage such as an AC signal modulating $V_{pse\_safe}$. The location data input is stored in multi-bit location data storage 470 by one or more of switches, analog resistor valves, silicon activated fuses, non-volatile RAM, flash memory and read only memory.

Figure 5B:
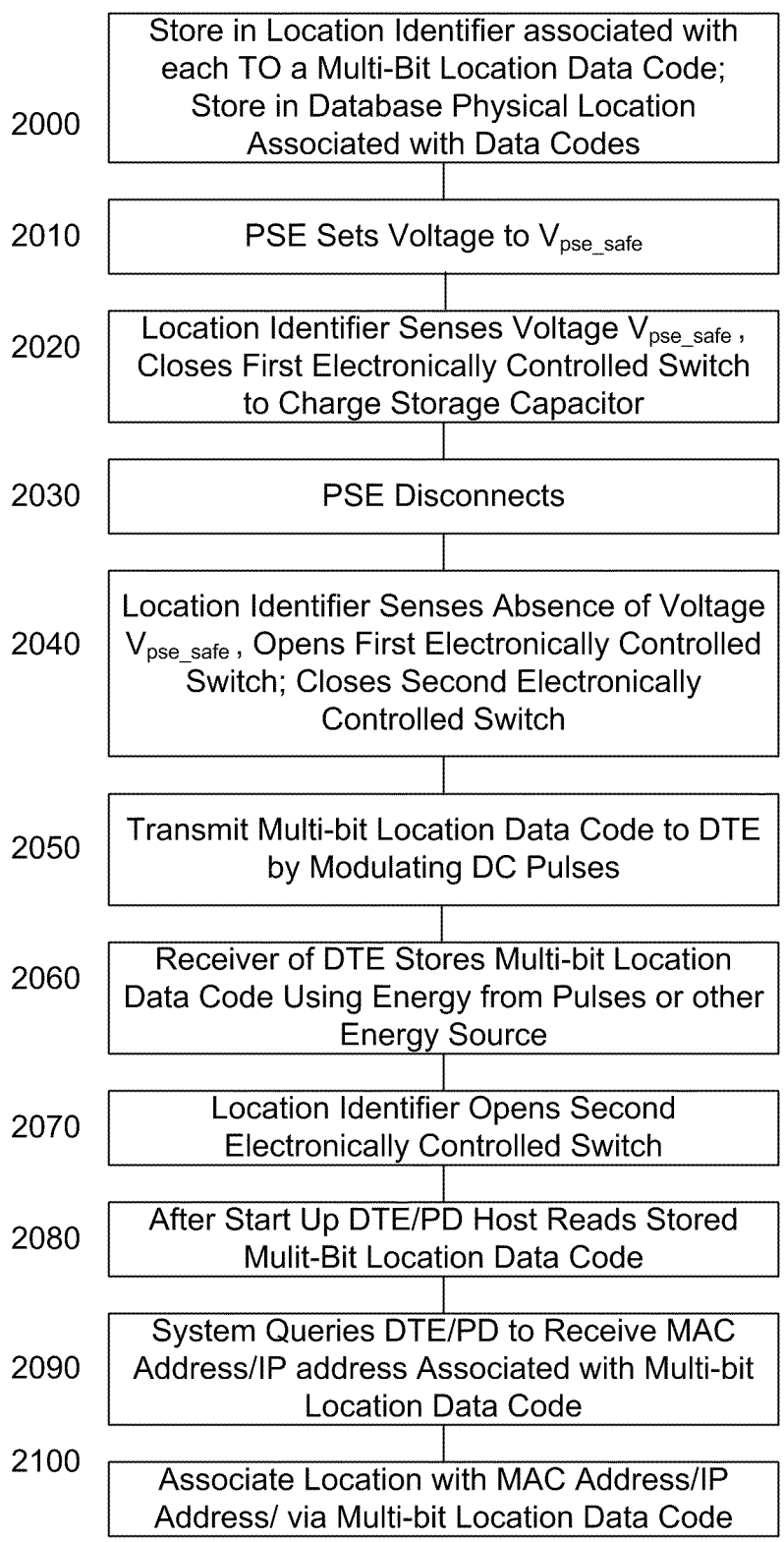
FIG. 5B illustrates a high level flow chart of a first embodiment of the operation of the system of FIG. 5A in accordance with a principle of the invention.

FIG. 5B illustrates a high level flow chart of a first embodiment of the operation of the system of FIGS. 2A, 2B, 4A and 5A in accordance with a principle of the invention. In stage 2000 each location identifier 615 associated with a TO 240 within system 200, 280 is loaded with, or set to contain, a multi-bit location data code stored within multi-bit location data storage 470. The multi-bit location data code is further stored in location database 270 associated with the physical location of the TO 240. Preferably, the physical location information stored in location database 270 is formatted as a Presence Information Document Format—Location Object (PIDF-LO). In one embodiment the location data comprises a geographic location including without limitation at least some of latitude, longitude, elevation and the datum which identifies the cording system used. In one further embodiment the location data is formatted using the World Geodetic System datum. In another embodiment the location data comprises a civic location constituted of a set of elements that describe detailed street address information. In one ever further embodiment location data comprises security or access information, including but not limited to company name, floor, cubicle or room location and hazardous material information. In one embodiment the multi-bit location data code, is set via switches associated with location identifier 615, in another embodiment the multi-bit location data is loaded as a unique identifying number drawn from a global numbering pool at manufacturing and preferably further affixed externally with a bar code. Such a bar code enables error free reading of the multi-bit identification and the correct association of the location with the correct multi-bit identification. In another embodiment the multi-bit location code is loaded at an installation phase by one of a wired and a wireless connection preferably by a dedicated program on a portable computer or through dedicated functionality of a cabling tester. In yet another embodiment the multi-bit location data code is transmitted by a PSE to the location identifier at installation as an AC signal modulating a voltage. In an exemplary embodiment stage 2000 is accomplished manually or semi-manually at time of installation, with any updates being similarly accomplished manually or semi-manually as incurred. The location data code is stored in multi-bit location data storage 470 by one or more of switches, analog resistor valves, silicon activated fuses, non-volatile RAM, flash memory and read only memory.

In stage 2010, the PSE being either endpoint PSE 220 or midspan PSE 290 sets the voltage to $V_{pse\_safe}$ as described above. $V_{pse\_safe}$ is set so that in combination with the current limit the DC power output is less than an amount that would damage DTE 620, and is preferably above the detection voltage. Thus, for a standard 75 ohm termination of a DTE, a $V_{pse\_safe}$ of about 15 volts for a pre-determined period not exceeding 5% of pre-determined cycle time is applied. In an exemplary embodiment $V_{pse\_safe}$ is supplied for no more than 50 milliseconds in a period of 1 second. Thus, for example, transmitting at 1 kilobit/sec will enable transmission of 50 bits per $V_{pse\_safe}$ cycle. The 5% duty cycle thus supplies the power for the pre-determined time sufficient to operate the electrical circuits in the embodiment presented herein and to allow for transmission, while maintaining a low average power.

In stage 2020, control 710 of location identifier 615 senses voltage $V_{pse\_safe}$ and is operative to close electronically controlled switch 460 so as to charge storage capacitor 730 from PSE 610 utilizing the voltage $V_{pse\_safe}$. In stage 2030, after PSE 610 has sourced $V_{pse\_safe}$ for a pre-determined period of time calculated to be sufficient to charge up storage capacitor 730, PSE 610 disconnects the voltage source thus presenting a high impedance to the communication cabling. The high impedance advantageously prevents the loading of the transmission to be described further hereinto below. Preferably, PSE is configured with an FET across the output so as to present a high impedance when off.

In stage 2040, control 710 senses the absence of $V_{pse\_safe}$, and in response opens electronically controlled switch 460 and closes electronically controlled switches 465, 467. The operation of electronically controlled switches 460, 465 and 467 alternatively connects transmitting module 640 to the PSE or receiver 660.

In stage 2050 the multi-bit location data code stored in multi-bit location data storage 470 is transmitted to receiver 660. In stage 2060, receiver 660 stores the received multi-bit location data code in a memory location. In an exemplary embodiment the storage is accomplished using the energy transmitted by signal driver 720. Thus, in the exemplary embodiment, the data transmission is accomplished by DC pulses which transmit both information and energy.

In one embodiment receiver 660 comprises a common mode receiver, in which a signal is transmitted as a difference between two twisted wire pairs by signal driver 720. In another embodiment receiver 660 comprises a differential mode receiver, in which a signal is transmitted as a normal Ethernet network signal by signal driver 720 being so arranged.

In stage 2070, having transmitted the multi-bit location data code stored in multi-bit location data storage 470, control 710 opens second electronically controlled switch 465 thus returning location identifier 615 to a high impedance state. In stage 2080, after operative PD or DTE circuitry 670 has completed an initialization phase, operative PD or DTE circuitry 670 reads the multi-bit identifier stored in stage 2060. In stage 2090, the system queries PD or DTE operative circuitry 670 for a MAC and/or IP address, and in response the system is provided with the MAC and/or IP address and the multi-bit location data code transmitted in stage 2050 and stored in stage 2060. In stage 2100 the location as loaded in stage 2000 is associated via the multi-bit location data code with the MAC and/or IP address.

Thus, in the event of an emergency call, system 200, 280 is operative to retrieve the physical location associated with the common equipment port originating the emergency call from database 270 for transmittal to an emergency dispatcher.

It is to be understood that the method of FIG. 5B may be run periodically to ensure that database 270 is maintained current, or it may be run only when a DTE connection is sensed, such as by a request for an IP address or upon sensing a PD connection requesting power.

Figure 5C:
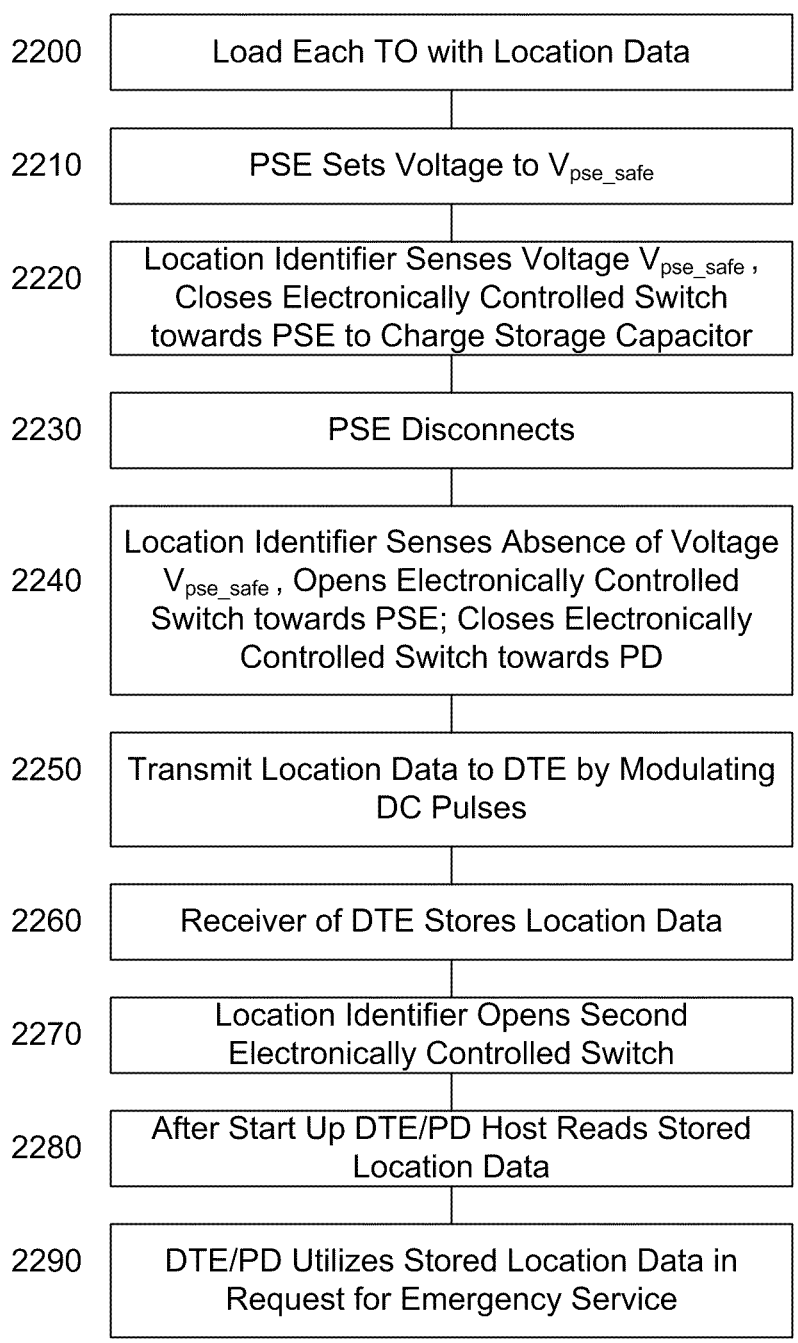
FIG. 5C illustrates a high level flow chart of a second embodiment of the operation of the system of FIG. 5A in accordance with a principle of the invention.

FIG. 5C illustrates a high level flow chart of a second embodiment of the operation of the system of FIG. 5A in accordance with a principle of the invention. In stage 2200 each TO within the system is loaded with multi-bit location data. Preferably, the location data is formatted as a Presence Information Document Format—Location Object (PIDF-LO). In one embodiment the location data comprises a geographic location including without limitation at least some of latitude, longitude, elevation and the datum which identifies the cording system used. In one further embodiment the location data is formatted using the World Geodetic System datum. In another embodiment the location data comprises a civic location constituted of a set of elements that describe detailed street address information. In an exemplary embodiment stage 2200 is accomplished manually or semi-manually at time of installation, with any updates being similarly accomplished manually or semi-manually as incurred. In another embodiment, the multi-bit location data is loaded at an installation phase by one of a wired and a wireless connection preferably by a dedicated program on a portable computer or through dedicated functionality of a cabling tester. In yet another embodiment the multi-bit location data is transmitted by the PSE to location identifier 250 at installation as an AC signal modulating a voltage.

In stage 2210, PSE 610 sets the voltage to $V_{pse\_safe}$ as described above. $V_{pse\_safe}$ is set so that in combination with the current limit the DC power output is less than an amount that would damage DTE 110, and is preferably above the detection voltage. In an exemplary embodiment DTE 110 is not harmed by 150 mW of power. Thus, for a standard 75 ohm termination of DTE 110, a $V_{pse\_safe}$ of about 15 volts for a pre-determined period not exceeding 5% of predetermined time is applied. In an exemplary embodiment $V_{pse\_safe}$ is supplied for no more than 50 milliseconds in a period of 1 second. Thus, for example, transmitting at 1 kilobit/sec will enable transmission of 50 bits per $V_{pse\_safe}$ cycle. The 5% duty cycle thus supplies the power for the pre-determined time sufficient to operate the electrical circuits in the embodiment presented herein and to allow for transmission, while maintaining a low average power.

In stage 2220, control 710 of location identifier 615 senses voltage $V_{pse\_safe}$ and is operative to close electronically controlled switch 460 so as to charge storage capacitor 730 from PSE 610 utilizing the voltage $V_{pse\_safe}$. In stage 2230, after PSE 610 has sourced $V_{pse\_safe}$ for a pre-determined period of time calculated to be sufficient to charge up storage capacitor 730, PSE 610 disconnects the voltage source thus presenting a high impedance to the communication cabling. Preferably PSE 610 is arranged to present a high impedance when in an off condition. The high impedance advantageously prevents the loading of the transmission to be described further hereinto below.

In stage 2240, control 710 senses the absence of $V_{pse\_safe}$, and in response opens electronically controlled switch 460 and closes electronically controlled switch 465, 467. The operation of first and second electronically controlled switches 460, 465 alternatively connects transmitting module 640 to the PSE or receiver 660.

In stage 2250 the location data stored in multi-bit location data storage 470 is transmitted to receiver 660. In stage 2260, receiver 660 stores the received data in a memory location. In an exemplary embodiment the storage is accomplished using the energy transmitted by signal driver 720. Thus, in the exemplary embodiment, the data transmission is accomplished by DC pulses which transmit both information and energy.

In one embodiment receiver 660 comprises a common mode receiver, in which a signal is transmitted as a difference between two twisted wire pairs by signal driver 720. In another embodiment receiver 660 comprises a differential mode receiver, in which a signal is transmitted as a normal Ethernet network signal by signal driver 720 being so arranged.

In stage 2270, having transmitted the location information stored in multi-bit location data storage 470, control 710 opens electronically controlled switches 465, 467 thus returning location identifier 615 to a high impedance state. In stage 2280, after operative PD or DTE circuitry 670 has completed an initialization phase, operative PD or DTE circuitry 670 reads the location information stored in stage 2260.

Thus, in the event of an emergency call being placed by a user utilizing operative PD or DTE circuitry 670, which in an exemplary embodiment comprises a VoIP telephone or computer having VoIP capability, in stage 2290 operative PD or DTE circuitry 670 transmits the request for emergency services along with the location information read in stage 2280.

It is to be understood that the method of FIG. 5C may be run periodically to ensure that database 270 is maintained current, or it may be run only when a DTE connection is sensed, such as by a request for an IP address or upon sensing a PD connection requesting power.

Combined interface 700 of FIG. 5A has been illustrated with a connection which provides for common mode signaling, however this is not meant to be limiting in any way. A connection for differential mode signaling may be provided, as described above, without exceeding the scope of the invention.

Figure 5D:
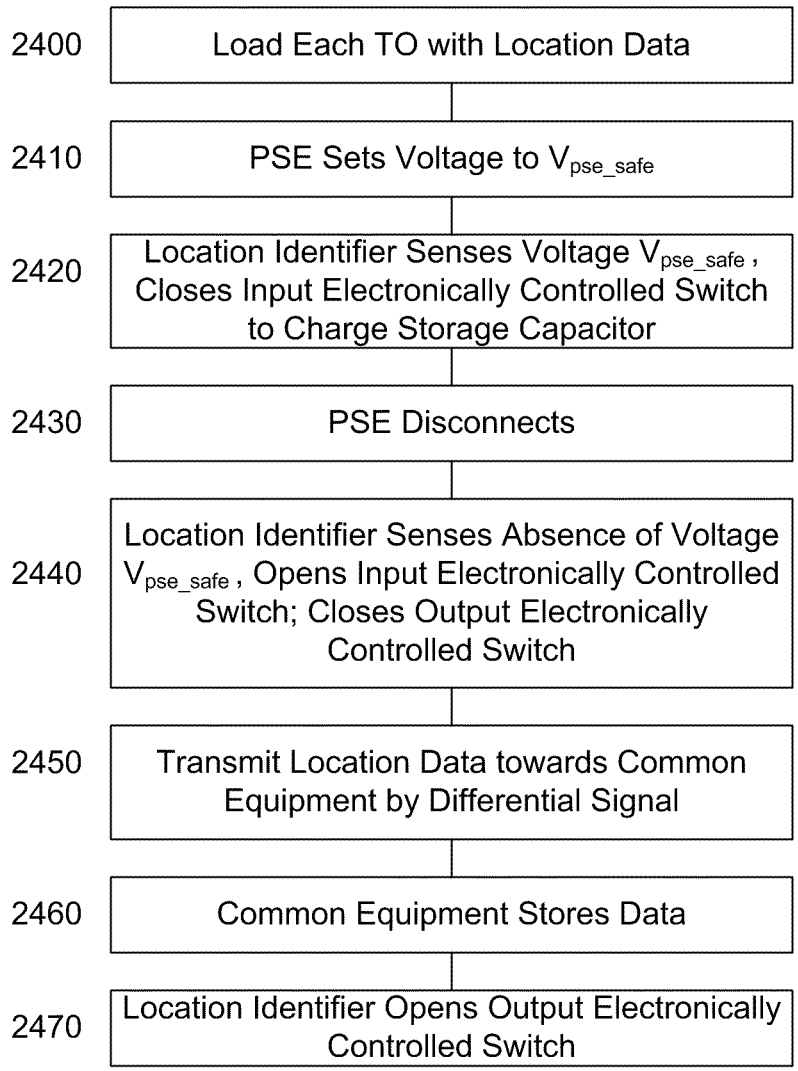
FIG. 5D illustrates a high level flow chart of an embodiment of the operation of the system of FIG. 5A in which location data is transmitted towards the common equipment in accordance with a principle of the invention.

FIG. 5D illustrates a high level flow chart of an embodiment of the operation of the system of FIG. 5A in which location data is transmitted towards the common equipment in accordance with a principle of the invention. In stage 2400 each TO within the system is loaded with multi-bit location data. Preferably, the location data is formatted as a Presence Information Document Format—Location Object (PIDF-LO). In one embodiment the location data comprises a geographic location including without limitation at least some of latitude, longitude, elevation and the datum which identifies the cording system used. In one further embodiment the location data is formatted using the World Geodetic System datum. In another embodiment the location data comprises a civic location constituted of a set of elements that describe detailed street address information. In an exemplary embodiment stage 2400 is accomplished manually or semi-manually at time of installation, with any updates being similarly accomplished manually or semi-manually as incurred. In another embodiment, the multi-bit location data is loaded at an installation phase by one of a wired and a wireless connection preferably by a dedicated program on a portable computer or through dedicated functionality of a cabling tester. In yet another embodiment the multi-bit location data is transmitted by the PSE to location identifier 250 at installation as an AC signal modulating a voltage.

In stage 2410, PSE 610 sets the voltage to $V_{pse\_safe}$ as described above. $V_{pse\_safe}$ is set so that in combination with the current limit the DC power output is less than an amount that would damage DTE 110, and is preferably above the detection voltage. In an exemplary embodiment DTE 110 is not harmed by 150 mW of power. Thus, for a standard 75 ohm termination of DTE 110, a $V_{pse\_safe}$ of about 15 volts for a pre-determined period not exceeding 5% of predetermined time is applied. In an exemplary embodiment $V_{pse\_safe}$ is supplied for no more than 50 milliseconds in a period of 1 second. Thus, for example, transmitting at 1 kilobit/sec will enable transmission of 50 bits per $V_{pse\_safe}$ cycle. The 5% duty cycle thus supplies the power for the pre-determined time sufficient to operate the electrical circuits in the embodiment presented herein and to allow for transmission, while maintaining a low average power. In an alternative embodiment, PSE 610 first identifies if a valid PD is connected, and in the event a valid PD is connected a voltage less than the operating voltage as described above is provided.

In stage 2420, control 710 of location identifier 615 senses voltage $V_{pse\_safe}$ and is operative to close electronically controlled switch 460 so as to charge storage capacitor 730 from PSE 610 utilizing the voltage $V_{pse\_safe}$. In stage 2430, after PSE 610 has sourced $V_{pse\_safe}$ for a pre-determined period of time calculated to be sufficient to charge up storage capacitor 730, PSE 610 disconnects the voltage source thus presenting a high impedance to the communication cabling. Preferably PSE 610 is arranged to present a high impedance when in an off condition. The high impedance advantageously prevents the loading of the transmission to be described further hereinto below.

In stage 2440, control 710 senses the absence of $V_{pse\_safe}$, and in response opens electronically controlled switch 460 and closes electronically controlled switch 465, 467. The operation of first and second electronically controlled switches 460, 465 isolates the input of location identifier 615 from its output.

In stage 2450 the location data stored in multi-bit location data storage 470 is transmitted by differential mode signaling towards the common equipment. In one embodiment a default address is assigned to the signaling, the default address being associated with a location database. In another embodiment, at initial installation an IP address for the destination is downloaded to data storage 470 as part of stage 2400. In stage 2460, common equipment or the location database stores the received location data associated with the common equipment port which received it.

In stage 2470, having transmitted the location information stored in multi-bit location data storage 470, control 710 opens electronically controlled switches 465, 467 thus returning location identifier 615 to a high impedance state.

Thus, in the event of an emergency call being placed by a user utilizing operative PD or DTE circuitry 670, which in an exemplary embodiment comprises a VoIP telephone or computer having VoIP capability, the location database has location information associated with a common equipment port.

It is to be understood that the method of FIG. 5D may be run periodically to ensure that database 270 is maintained current, or it may be run only when a DTE connection is sensed, such as by a request for an IP address or upon sensing a PD connection requesting power.

Combined interface 700 of FIG. 5A has been illustrated with a connection which provides for common mode signaling, however it is to be understood that this is by way of illustration only. The method of FIG. 5D particularly utilizes a differential mode connection.

FIG. 5E illustrates a high level block diagram of an embodiment of location identifier of FIG. 4A in which a PSE side interface and a DTE side interface are combined into a combined interface 700 in accordance with a principle of the invention, the location identifier being arranged to transmit differentially on a single data pair. Location identifier 615 comprises combined interface 700 and a transmitting module 640. Combined interface 700 comprises: a first and second center tapped inductor 420; a first, second, third and fourth impedance 430; and a diode bridge 440. Transmitting module 640 comprises: a control 710; a multi-bit location data storage 470; an electronically controlled switch 460; an electronically controlled switch 465; an electronically controlled switch 467; a signal driver 720; a storage capacitor 730; and a voltage regulator 735.

First center tapped inductor 420 is connected across a first pair of conductors labeled $a_1$, $a_2$, the first pair of conductors representing a first twisted pair connection in accordance with the above mentioned IEEE 802.3af standard. The center tap of first center tapped conductor 420 is connected to a first input of diode bridge 440 and is further connected by way of first and second impedance 430 respectively, to conductor $a_1$, $a_2$. Second center tapped inductor 420 is connected across a second pair of conductors labeled $b_1$, $b_2$, the second pair of conductors representing a second twisted pair connection in accordance with the above mentioned IEEE 802.3af standard. The center tap of second center tapped conductor 420 is connected to a second input of diode bridge 440 and is further connected by way of third and fourth impedance 430 respectively, to conductor $b_1$, $b_2$.

Only conductors of a first set comprising two twisted wire pairs are shown for simplicity however this is not meant to be limiting in any way. In particular a second set of diode bridge 440, first through fourth impedances 430 and first and second inductors 420 may be supplied across a second set of two twisted wire pairs without exceeding the scope of the invention. Thus, power and/or voltage signaling may be received via either first or second set of two twisted wire pairs, representing data and spare pairs, without exceeding the scope of the invention. Differential transmission is preferably on only on a single twisted wire pair, which may not coincide with the pairs providing power without exceeding the scope of the invention.

The positive output of diode bridge 440, representing the positive output of combined interface 700, is connected to the input of electronically controlled switch 460 and to the input of control 710. A first output of control 710 is connected the gate input of electronically controlled switch 460, a second output of control 710 is connected to multi-bit location data storage 470, a third output of control 710 is connected to an enable input of signal driver 720 and a fourth output of control 710 is connected to the gate input of electronically controlled switches 465, 467. The output of electronically controlled switch 460 is connected to one end of storage capacitor 730 to a second isolated power input of control 710 and to the input of voltage regulator 735. The second end of storage capacitor 730 is connected to the input of electronically controlled switch 465, to the return of control 710 and to the return output of bridge 440 representing the return of combined interface 700. The output of multi-bit location data storage 470 is connected to the input of signal driver 720 and the output of signal driver 720 is connected via electronically controlled switch 467 to conductor $a_2$. Voltage regulator 730 is connected in parallel to capacitor 730 and maintains a regular voltage fed to signal driver 720 and multi-bit location data storage 470. The output of electronically controlled switch 465 is connected conductor $a_1$. Power for control 710 is shown as being received from either side of first electronically controlled switch 460, and care must be taken to ensure isolation to avoid leakage around first electronically controlled switch 460. Alternatively, control 710 may comprise two sections connected by an opto-isolator.

In operation, combined interface 700 provides power for transmitting module 640 and further provides an impedance matching for the twisted wire pairs of the communication cabling so as to reduce attenuation, return loss and transmission loss. Preferably, interface 700 enables location identifier 615 to meet connecting hardware level requirements for performance according to Category 5*e*, Category 6 and Category 7A as defined by TIE/EIA 568 referenced above. Impedance 520 is optionally, and is only required to complete the impedance matching. In an exemplary embodiment low cost silicon based technology exhibiting a low impedance at the operative frequency of the high data transmission may be utilized in the production of combined interface 700. Combined interface 700 may be a packaged chip or a multi-chip module. Control 710 is operative to monitor the input voltage, and upon detection of an appropriate voltage level as will be described further hereinto below, is further operative to close electronically controlled switch 460 thereby charging up storage capacitor 730. Upon detection that the input voltage has dropped to approximately zero, or another pre-determined voltage, control 710 is operative to open electronically controlled switch 460 and close electronically controlled switches 465, 467. Control 710 is further operative to transmit the multi-bit identification stored in multi-bit location data storage 470 via signal driver 720 towards either receiver 660 of FIG. 4A or common equipment 30 of FIGS. 2A, 2B. Power for the operation of multi-bit location data storage 470 and signal driver 720 is preferably supplied by storage capacitor 730. Thus, the operation of electronically controlled switch 460 and electronically controlled switches 465, 467 provide time domain sharing of communication cabling represented by conductors $a_1$, $a_2$ and $b_1$, $b_2$. in order to achieve the required input ot output isolation. Timing of transmission of multi-bit location data storage 470 is such that transmission is completed before a second cycle of $V_{pse\_safe}$ is to be experienced.

After completion of the transmission, control 710 is operative to open electronically controlled switch 465, 467 thereby returning the combination of combined interface 700 and transmitting module 640 to a high impedance state.

The multi-bit location data stored within multi-bit location data storage 470 may be a unique multi-bit identification code drawn from a global numbering pool at manufacturing and preferably further affixed externally with a bar code. Such a bar code enables error free reading of the multi-bit identification and the correct association of the location with the correct multi-bit identification. In another embodiment the multi-bit location data comprises complete physical location information. Preferably, the location data is formatted as a Presence Information Document Format—Location Object (PIDF-LO). In one embodiment the location data comprises a geographic location including without limitation at least some of latitude, longitude, elevation and the datum which identifies the cording system used. In one further embodiment the location data is formatted using the World Geodetic System datum. In another embodiment the location data comprises a civic location constituted of a set of elements that describe detailed street address information. In one ever further embodiment location data comprises security or access information, including but not limited to company name, floor, cubicle or room location and hazardous material information. In one embodiment the multi-bit location data, being constituted of an identification code, is set via switches associated with transmitting module 640. In another embodiment, in which either an identification code or geographical data may be utilized, the multi-bit location data is loaded at an installation phase by one of a wired and a wireless connection preferably by a dedicated program on a portable computer or through dedicated functionality of a cabling tester. In yet another embodiment the multi-bit location data is transmitted by the PSE to transmitting module 640 at installation as an AC signal modulating a voltage such as an AC signal modulating $V_{pse\_safe}$. The location data input is stored in multi-bit location data storage 470 by one or more of switches, analog resistor valves, silicon activated fuses, non-volatile RAM, flash memory and read only memory.

Figure 6D:
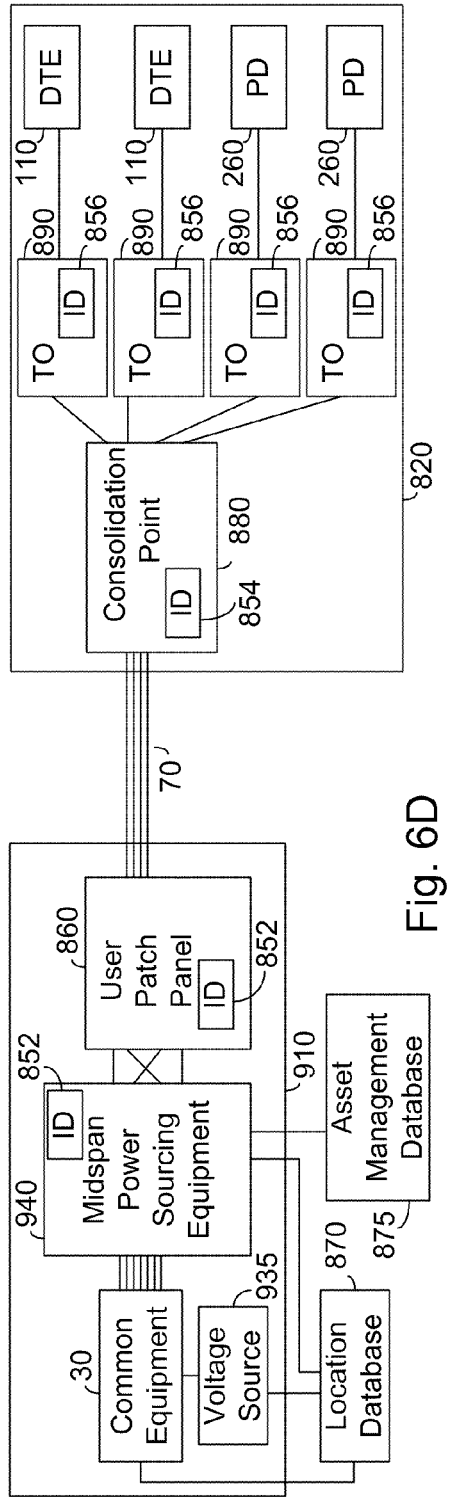
FIG. 6D illustrates a high level block diagram of a further embodiment of the invention comprising a plurality of location identifiers, each location identifier being associated with a type of equipment in the network, each of the plurality of location identifiers being operative to transmit a multi-bit location data towards a midspan PSE in response to an addressed polling signal in accordance with a principle of the invention, in which the midspan PSE further comprises a location identifier responsive to a voltage source of the common equipment.
Figure 6A:
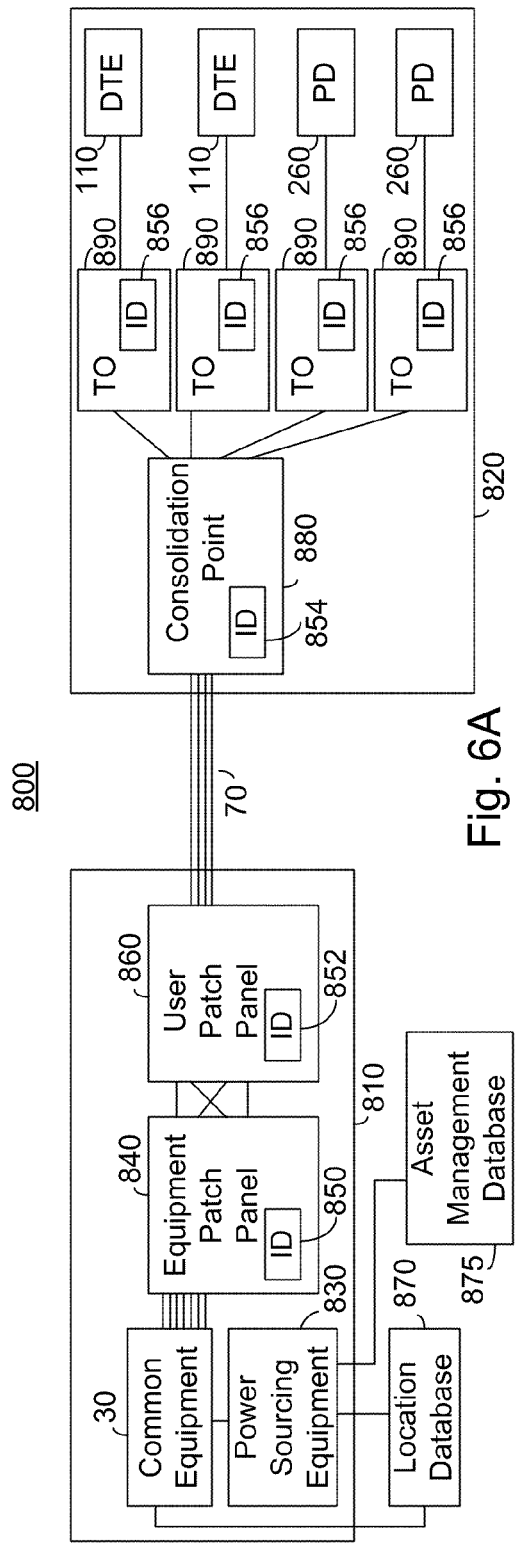
FIG. 6A illustrates a high level block diagram of an embodiment of the invention comprising a plurality of location identifiers, each location identifier being associated with a type of equipment in the network, each of the plurality of location identifiers being operative to transmit a multi-bit location data towards an endpoint PSE in response to an addressed polling signal in accordance with a principle of the invention.

FIG. 6A illustrates a high level block diagram of a system 800 exhibiting an embodiment of the invention comprising a plurality of location identifiers, each location identifier being associated with a unique type of equipment in the network, each of the plurality of location identifiers being operative to transmit a multi-bit location data towards the endpoint PSE in response to an addressed polling signal in accordance with a principle of the invention. System 800 comprises: a floor distributor 810; a horizontal cabling 70; a work area 820; a location database 870; and an asset management database 875. Floor distributor 800 comprises: a common equipment 30; an endpoint PSE 830; an equipment patch panel 840 comprising a location identifier 850 per port; and a user patch panel 860 comprising a location identifier 852 per port. Work area 820 comprises: a consolidation point 880 comprising a location identifier 854 per port; a plurality of TOs 890 each comprising a location identifier 856; a plurality of DTEs 110; and a plurality of PDs 260. Location database 870 is also known as an LIS.

Endpoint PSE 830 is connected to common equipment 30 and common equipment 30 is connected by a plurality of connections to equipment patch panel 840. Equipment patch panel 840 is cross-connected to user patch panel 860, and user patch panel 860 is connected by horizontal cabling 70 comprising multiple communication cabling to consolidation point 880. Consolidation point 880 is connected to each of the plurality of TOs 890. Each DTE 110 and PD 260 is connected to a specific TO 890. As described above the configuration of system 800 is in accordance with a maximum populated channel as defined by the above mentioned EIA/TIA 568 standard.

System 800 is shown as comprising each of equipment patch panel 840, user patch panel 860 and consolidation point

880, however this is not meant to be limiting in any way. Each of equipment patch panel 840, user patch panel 860 and consolidation point 880 are optional and are not required for the operation of system 800. Common equipment 30 comprises one of a switch, hub, bridge or router. Endpoint PSE 830 provides power over horizontal cabling 70 to power a compatible PD 260 via ports of common equipment 30, preferably in accordance with IEEE 802.3af, and additionally is operative to poll each of location identifier 850, 852, 854 and 856 and receive a multi-bit location data associated with each of location identifier 850, 852, 854 and 856 in a manner that will be explained further hereinto below. Location database 870 is illustrated as being directly connected to common equipment 30 and endpoint PSE 830 however this is not meant to be limiting in any way. Location database 870 may be connected to common equipment 30 and/or endpoint PSE 830 by a data connection via the local area network, a wide area network, a wireless connection or over the Internet without exceeding the scope of the invention. Asset management database 875 is in communication with endpoint PSE 830, and the communication may be one of a direct wired connection, a data connection via the local area network, a wireless connection, or an Internet connection without exceeding the scope of the invention. Optionally, location database 870 may be in direct communication with asset management database 875.

In operation, endpoint PSE 830 signals each of location identifier 850, 852, 854 and 856 in turn to transmit a multi-bit location data stored therein. Preferably, endpoint PSE 830 sets the voltage on each port to be less than $V_{pse\_safe}$ as described above, and further modulates the voltage to transmit a signal to each of location identifier 850, 852, 854 and 856. It is to be understood that for each port of endpoint PSE 830, only one each of identifier 850, 852, 854 and 856 is connected. In response to the signal, each of identifier 850, 852, 854 and 856 transmits its multi-bit location data in turn to endpoint PSE 830.

Each location identifier 850, 852, 854 and 856 is supplied with, loaded with, or set to contain, a multi-bit location data. The multi-bit location data may be a unique multi-bit identification code, and location database 870 and/or asset management database 875 is further provided with an association of each of the multi-bit identification codes with a physical location of each of the location identifiers. In another embodiment the multi-bit location data comprises complete physical location information. Preferably, the location data is formatted as a Presence Information Document Format—Location Object (PIDF-LO). In one embodiment the location data comprises a geographic location including without limitation at least some of latitude, longitude, elevation and the datum which identifies the cording system used. In one further embodiment the location data is formatted using the World Geodetic System datum. In another embodiment the location data comprises a civic location constituted of a set of elements that describe detailed street address information. In one ever further embodiment location data comprises security or access information, including but not limited to company name, floor, cubicle or room location and hazardous material information. In one embodiment the multi-bit location data, being constituted of an identification code, is set via switches associated with each of location identifier 850, 852, 584, 856. In another embodiment the multi-bit location data for each location identifier is loaded as a unique identifying number drawn from a global numbering pool at manufacturing and preferably further affixed externally with a bar code. Such a bar code enables error free reading of the multi-bit identification and the correct association of the location with the correct multi-bit identification. In another embodiment the multi-bit location data comprises complete physical location information. In another embodiment, in which either an identification code or geographical data may be utilized, the multi-bit location data is loaded at an installation phase by one of a wired and a wireless connection preferably by a dedicated program on a portable computer or through dedicated functionality of a cabling tester. In yet another embodiment the multi-bit location data is transmitted by endpoint PSE 830 to each location identifier 850, 852, 854, 856 at installation as an AC signal modulating a voltage. Location database 870 is provided with a listing of location identifier physical locations and their associated multi-bit location data if required as well as any interconnect information required to correlate ports of endpoint PSE 830 with ports of common equipment 30. Location database 870 may be provided with the listing manually or in connection with an automated or semi-automated installation routine. In the rare instance in which an element is replaced or physically moved, location database 870 is manually updated.

As will be explained further hereinto below, endpoint PSE 830 receives the multi-bit location data associated with location identifier 850, 852, 854, 856 from each port, and provides the multi-bit location data to location database 870. Thus, location database 870 is provided with both ports of common equipment 30 and location information associated with each TO 890 connected to each port. In the event of an emergency message, the location of the emergency caller is identified via location database 870 utilizing the common equipment port associated with the emergency call, the interconnect information between common equipment ports and endpoint PSE 830 powering port, and the location information obtained from location identifier 856 of the associated TO 890.

Asset management database 875 is provided with a listing of multi-bit location data codes for each of identifier 850, 852, 854 and 856. Preferably, the multi-bit identification codes for each of identifier 850, 852 and 854 further comprises a port number identifier. Thus, endpoint PSE 830 receives a complete listing of port connections between a port of common equipment 30 and TO 890 including the identification of port connections for equipment patch panel 840, user patch panel 860 and consolidation point 880. Endpoint PSE 830 provides multi-bit identification codes associated with each of identifier 850, 852, 854 and 856 to asset management database 875, and thus asset management database 875 is provided with a complete map of all connections in the system. Such a complete map is useful for maintenance, overall asset management, tracking moves adds and changes and enhancing network security by detecting any unauthorized changes which allow unauthorized physical connection.

In an exemplary embodiment, endpoint PSE 830 sets the voltage at each port in turn to $V_{pse\_safe}$, and then modulates the voltage with a type address of one of identifier 850, 852, 854 and 856. It is to be understood that for each port, or channel, only 4 possible location identifiers are connected, and thus only 4 different type addresses are required. Location identifiers 850, 852, 854 and 856 each monitor the voltage on the input port, and in response to sensing voltage $V_{pse\_safe}$, and the address associated with the equipment type in which it is installed, responds by modulating the current flow as a result of $V_{pse\_safe}$ as described above in relation to FIGS. 2A-2D.

Figure 6B:
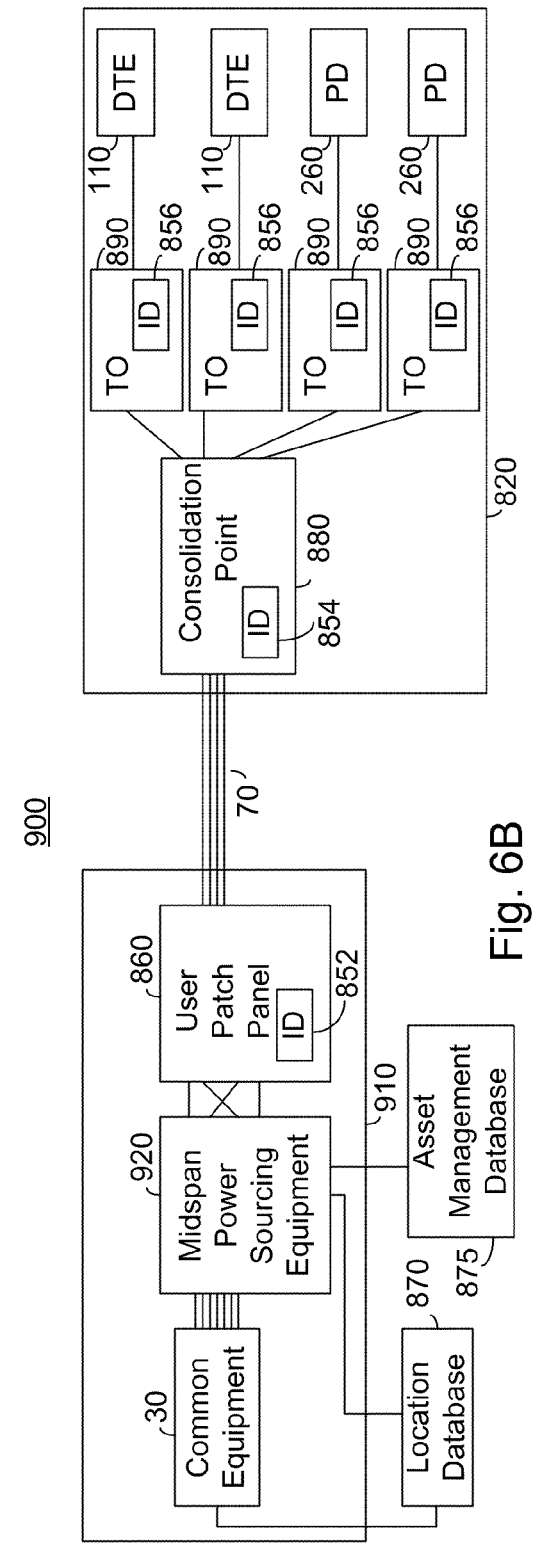
FIG. 6B illustrates a high level block diagram of an embodiment of the invention comprising a plurality of location identifiers, each location identifier being associated with a type of equipment in the network, each of the plurality of location identifiers being operative to transmit a multi-bit location data towards a midspan PSE in response to an addressed polling signal in accordance with a principle of the invention.

FIG. 6B illustrates a high level block diagram of a system 900 exhibiting an embodiment of the invention comprising a plurality of location identifiers, each location identifier being associated with a unique type of equipment in the network, each of the plurality of location identifiers being operative to transmit a multi-bit location data towards the midspan PSE in response to an addressed polling signal in accordance with a principle of the invention. System 900 comprises: a floor distributor 910; a horizontal cabling 70; a work area 820; a location database 870; and an asset management database 875. Floor distributor 910 comprises: a common equipment 30; a midspan PSE 920; and a user patch panel 860 comprising a location identifier 852 per port. Work area 820 comprises: a consolidation point 880 comprising a location identifier 854 per port; a plurality of TOs 890 each comprising a location identifier 856; a plurality of DTEs 110; and a plurality of PDs 260. Location database 870 is also known as an LIS.

Midspan PSE 920 is connected to common equipment 30 and is cross-connected to user patch panel 860 by a plurality of patch cords. User patch panel 860 is connected by horizontal cabling 70 comprising multiple communication cabling to consolidation point 880. Consolidation point 880 is connected to each of the plurality of TOs 890. Each DTE 110 and PD 260 is connected to a specific TO 890. As described above the configuration of system 900 is in accordance with a maximum populated channel as defined by the above mentioned EIA/TIA 568 standard.

System 900 is shown as comprising each of user patch panel 860 and consolidation point 880, however this is not meant to be limiting in any way. Each of user patch panel 860 and consolidation point 880 are optional and are not required for the operation of system 800. Common equipment 30 comprises one of a switch, hub, bridge or router. Midspan PSE 920 provides power over horizontal cabling 70 to power a compatible PD 260 preferably in accordance with IEEE 802.3af, and additionally is operative to poll each of location identifier 852, 854 and 856 and receive a multi-bit location data associated with each of location identifier 852, 854 and 856 in a manner that will be explained further hereinto below. Location database 870 is illustrated as being directly connected to common equipment 30 and midspan PSE 920 however this is not meant to be limiting in any way. Location database 870 may be connected to common equipment 30 and/or midspan PSE 920 by a data connection via the local area network, a wide area network, a wireless connection or over the Internet without exceeding the scope of the invention. Asset management database 875 is in communication with midspan PSE 920, and the communication may be one of a direct wired connection, a data connection via the local area network, a wireless connection, or an Internet connection without exceeding the scope of the invention. Optionally, location database 870 may be in direct communication with asset management database 875.

In operation, midspan PSE 920 signals each of location identifier 852, 854 and 856 in turn to transmit a multi-bit location data stored therein. Preferably, midspan PSE 920 sets the voltage on each port to be less than $V_{pse\_safe}$ as described above, and further modulates the voltage to transmit a signal to each of location identifier 852, 854 and 856. It is to be understood that for each port of midspan PSE 920, only one each of identifier 852, 854 and 856 is connected. In response to the signal, each of identifier 852, 854 and 856 transmits its multi-bit location data in turn to midspan PSE 920.

Each location identifier 852, 854, and 856 is supplied with, loaded with, or set to contain, a multi-bit location data. The multi-bit location data may be a unique multi-bit identification code, and location database 870 and/or asset management database 875 is further provided with an association of each of the multi-bit identification codes with a physical location of each of the location identifiers. In another embodiment the multi-bit location data comprises complete physical location information. Preferably, the location data is formatted as a Presence Information Document Format—Location Object (PIDF-LO). In one embodiment the location data comprises a geographic location including without limitation at least some of latitude, longitude, elevation and the datum which identifies the cording system used. In one further embodiment the location data is formatted using the World Geodetic System datum. In another embodiment the location data comprises a civic location constituted of a set of elements that describe detailed street address information. In one ever further embodiment location data comprises security or access information, including but not limited to company name, floor, cubicle or room location and hazardous material information. In one embodiment the multi-bit location data, being constituted of an identification code, is set via switches associated with each of location identifier 852, 584, 856. In another embodiment the multi-bit location data for each location identifier is loaded as a unique identifying number drawn from a global numbering pool at manufacturing and preferably further affixed externally with a bar code. Such a bar code enables error free reading of the multi-bit identification and the correct association of the location with the correct multi-bit identification. In another embodiment the multi-bit location data comprises complete physical location information. In another embodiment, in which either an identification code or geographical data may be utilized, the multi-bit location data is loaded at an installation phase by one of a wired and a wireless connection preferably by a dedicated program on a portable computer or through dedicated functionality of a cabling tester. In yet another embodiment the multi-bit location data is transmitted by midspan PSE 920 to each location identifier 852, 854, 856 at installation as an AC signal modulating a voltage. Location database 870 is provided with a listing of location identifier physical locations and their associated multi-bit location data if required as well as any interconnect information required to correlate ports of midspan PSE 920 with ports of common equipment 30. Location database 870 may be provided with the listing manually or in connection with an automated or semi-automated installation routine. In the rare instance in which an element is replaced or physically moved, location database 870 is manually updated.

As will be explained further hereinto below, midspan PSE 920 receives the multi-bit location data associated with location identifier 852, 854, 856 from each port, and provides the multi-bit location data to location database 870. Thus, location database 870 is provided with both ports of common equipment 30 and location information associated with each TO 890 connected to each port. In the event of an emergency message, the location of the emergency caller is identified via location database 870 utilizing the common equipment port associated with the emergency call and the location information obtained from location identifier 856 of the associated TO 890 via the associated midspan PSE 920 powering port.

Asset management database 875 is provided with a listing of multi-bit location data codes for each of identifier 852, 854 and 856. Preferably, the multi-bit identification for each of identifier 852, 854 and 856 further comprises a port number identifier. Thus, midspan PSE 920 receives a complete listing of port connections between each output port of midspan PSE 920 and TO 890 including the identification of port connections for user patch panel 860 and consolidation point 880. Midspan PSE 920 provides multi-bit identification information associated with each of identifier 852, 854 and 856 to asset management database 875, and thus asset management database 875 is provided with a complete map of all connections in the system. Such a complete map is useful for maintenance, overall asset management, tracking moves adds and changes and enhancing network security by detecting any unauthorized changes which allow unauthorized physical connection.

In an exemplary embodiment, midspan PSE 920 sets the voltage at each port in turn to $V_{pse\_safe}$, and then modulates the voltage with a type address of one of identifier 852, 854 and 856. It is to be understood that for each port only 3 possible location identifiers are connected, and thus only 4 different type addresses are required. Location identifiers 852, 854 and 856 each monitor the voltage on the input port, and in response to sensing voltage $V_{pse\_safe}$, and the type address associated with the type of equipment in which it is installed, responds by modulated the current flow as a result of $V_{pse\_safe}$ as described above in relation to FIGS. 2A-2D.

Figure 6C:
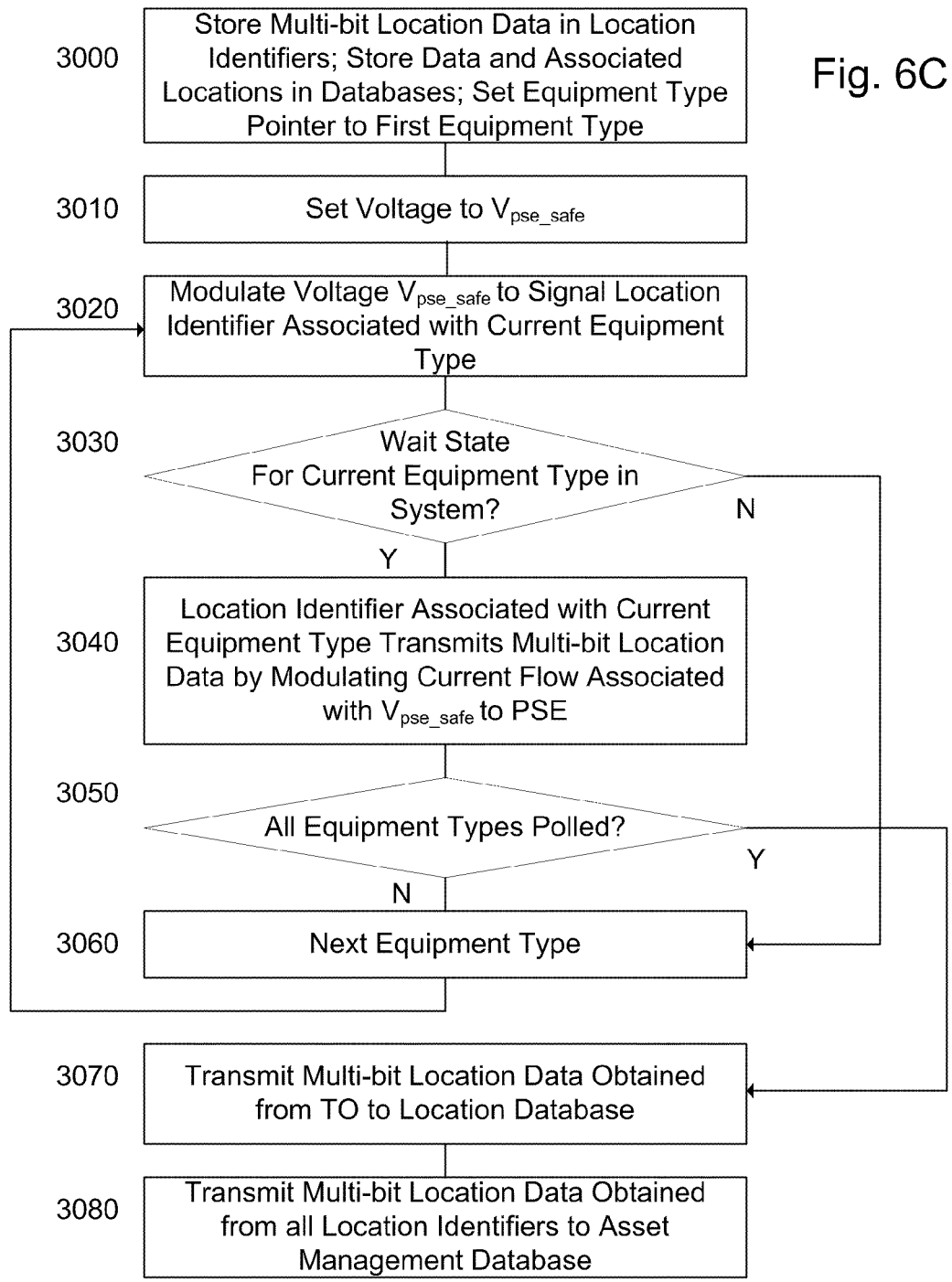
FIG. 6C illustrates a high level flow chart of the operation of the system of FIGS. 6A and 6B in accordance with a principle of the invention.

FIG. 6C illustrates a high level flow chart of the operation of the system of FIGS. 6A and 6B in accordance with a principle of the invention. In stage 3000 each location identifier within system 800, 900, i.e. the location identifier of each element of the channel, is loaded with location data as described above and in the event location data codes are utilized the location data codes associated with their physical location are stored in location database 870. In one embodiment, location identifiers 856 are loaded with location information and all other location identifiers 850, 852 and 854 are loaded with location codes. In an exemplary embodiment stage 3000 is accomplished manually or semi-manually at an installation phase, by one of a wired and a wireless connection preferably by a dedicated program on a portable computer or through dedicated functionality of a cabling tester. Any updates are similarly accomplished manually or semi-manually as incurred. In system 800 of FIG. 6A location database 870 is further loaded with interconnect information between ports of endpoint PSE 830 and ports of common equipment 30. In system 900 of FIG. 6B location database 870 is further loaded with interconnect information between ports of midspan PSE 920 and ports of common equipment 30. An index pointer is set to the first type of equipment. As indicated above a maximum of 4 possible types of equipment may be provided, i.e. a equipment patch panel, a user patch panel, a consolidation point and a TO, and thus a pointer is used to identify each type of equipment in turn.

In stage 3010, the PSE being either endpoint PSE 830 or midspan PSE 920 sets the voltage to $V_{pse\_safe}$ as described above. $V_{pse\_safe}$ is set so that in combination with the current limit the DC power output is less than an amount that would damage DTE 110, and is preferably above the detection voltage. In an exemplary embodiment DTE 110 is not harmed by 150 mW of power. Thus, for a standard 75 ohm termination of DTE 110, a $V_{pse\_safe}$ of about 15 volts for a pre-determined period not exceeding 5% of predetermined time is applied. In an exemplary embodiment $V_{pse\_safe}$ is supplied for no more than 50 milliseconds in a period of 1 second. Thus, for example, transmitting at 1 kilobit/sec will enable transmission of 50 bits per $V_{pse\_safe}$ cycle. The 5% duty cycle thus supplies the power for the pre-determined time sufficient to operate the electrical circuits in the embodiment presented herein and to allow for transmission, while maintaining a low average power.

In stage 3020 the voltage output of the PSE is modulated to signal one type of equipment within the system as indicated by the pointer. In stage 3030, a wait state is inserted to await a response to the signal of stage 3020. In the event the equipment signaled in stage 3020 is present in the system, in stage 3040 the location identifier associated with the equipment type responds to the signal of stage 3020 by transmitting the multi-bit location data stored therein. The transmission is preferably accomplished by modulating the current flow as a result of $V_{pse\_safe}$ and the modulated current flow is detected by the PSE, which extracts from the modulated current flow the transmitted multi-bit location data. In stage 3050, the pointer is checked to see if all types of equipment have been polled. In the event that all types of equipment have not been polled, in stage 3060 the pointer is indexed to the next of equipment and stage 3020 is again performed.

In the event that in stage 3030 the equipment is not present in the system, the wait state will time out without receiving a multi-bit location data, and in stage 3050 the index pointer is again checked to see if all types of equipment have been polled. It is to be understood that the PSE is not aware of the type of equipment present, and thus each type of equipment must be polled in turn.

In the event that in stage 3050 all equipment types have been polled, in stage 3070 the PSE transmits multi-bit location data received from location identifiers associated with TO equipment to location database 870. As indicated above the multi-bit location data may comprise physical location information. In stage 3080, the PSE transmits all multi-bit location data received from all location identifiers within each of the channels to asset management database 875. The above has been described in an embodiment in which data is transmitted to location database 870 and asset management database 875 only after all equipment types have been polled, however this is not meant to be limiting in any way. Transmission of data to location database 870 and asset management database 875 may be performed after each equipment type has transmitted without exceeding the scope of the invention.

FIG. 6D illustrates a high level block diagram of a system 930 exhibiting an embodiment of the invention comprising a plurality of location identifiers, each location identifier being associated with a unique type of equipment in the network, each of the plurality of location identifiers being operative to transmit a multi-bit location data towards the midspan PSE in response to an addressed polling signal, the midspan PSE being further provided with a location identifier response to a voltage source associated with common equipment 30 in accordance with a principle of the invention. System 930 comprises: a floor distributor 932; a horizontal cabling 70; a work area 820; a location database 870; and an asset management database 875. Floor distributor 910 comprises: a common equipment 30; a midspan PSE 940 comprising a location identifier 858; a current limited and monitored voltage source 935; and a user patch panel 860 comprising a location identifier 852 per port. Work area 820 comprises: a consolidation point 880 comprising a location identifier 854 per port; a plurality of TOs 890 each comprising a location identifier 856; a plurality of DTEs 110; and a plurality of PDs 260. Location database 870 is also known as an LIS.

Midspan PSE 940 is connected to common equipment 30 and is cross-connected to user patch panel 860 by a plurality of patch cords. User patch panel 860 is connected by horizontal cabling 70 comprising multiple communication cabling to consolidation point 880. Consolidation point 880 is connected to each of the plurality of TOs 890. Each DTE 110 and PD 260 is connected to a specific TO 890. As described above the configuration of system 900 is in accordance with a maximum populated channel as defined by the above mentioned EIA/TIA 568 standard.

System 930 is shown as comprising each of user patch panel 860 and consolidation point 880, however this is not meant to be limiting in any way. Each of user patch panel 860 and consolidation point 880 are optional and are not required for the operation of system 800. Common equipment 30 comprises one of a switch, hub, bridge or router. Midspan PSE 940 provides power over horizontal cabling 70 to power a compatible PD 260 preferably in accordance with IEEE 802.3af, and additionally is operative to poll each of location identifier 852, 854 and 856 and receive a multi-bit location data associated with each of location identifier 852, 854 and 856 in a manner that will be explained further hereinto below. Location database 870 is illustrated as being directly connected to common equipment 30 and midspan PSE 940 however this is not meant to be limiting in any way. Location database 870 may be connected to common equipment 30 and/or midspan PSE 940 by a data connection via the local area network, a wide area network, a wireless connection or over the Internet without exceeding the scope of the invention. Asset management database 875 is in communication with midspan PSE 940, and the communication may be one of a direct wired connection, a data connection via the local area network, a wireless connection, or an Internet connection without exceeding the scope of the invention. Optionally, location database 870 may be in direct communication with asset management database 875.

In operation, midspan PSE 940 signals each of location identifier 852, 854 and 856 in turn to transmit a multi-bit location data stored therein. Preferably, midspan PSE 940 sets the voltage on each port to be less than $V_{pse\_safe}$ as described above, and further modulates the voltage to transmit a signal to each of location identifier 852, 854 and 856. It is to be understood that for each port of midspan PSE 940, only one each of identifier 852, 854 and 856 is connected. In response to the signal, each of identifier 852, 854 and 856 transmits its multi-bit location data in turn to midspan PSE 940. Additionally, current limited and monitored voltage source 935 sets the voltage on each port to be less than $V_{pse\_safe}$ as described above, and optionally modulates the signal to a pre-determined bit sequence. In response to the voltage level or signal, identifier 858 transmits its multi-bit location data current limited and monitored voltage source 935.

Each location identifier 852, 854, 856 and 858 is supplied with, loaded with, or set to contain, a multi-bit location data. The multi-bit location data may be a unique multi-bit identification code, and location database 870 and/or asset management database 875 is further provided with an association of each of the multi-bit identification codes with a physical location of each of the location identifiers. In another embodiment the multi-bit location data comprises complete physical location information. Preferably, the location data is formatted as a Presence Information Document Format—Location Object (PIDF-LO). In one embodiment the location data comprises a geographic location including without limitation at least some of latitude, longitude, elevation and the datum which identifies the cording system used. In one further embodiment the location data is formatted using the World Geodetic System datum. In another embodiment the location data comprises a civic location constituted of a set of elements that describe detailed street address information. In one ever further embodiment location data comprises security or access information, including but not limited to company name, floor, cubicle or room location and hazardous material information. In one embodiment the multi-bit location data, being constituted of an identification code, is set via switches associated with each of location identifier 852, 584, 856 and 858. In another embodiment the multi-bit location data for each location identifier is loaded as a unique identifying number drawn from a global numbering pool at manufacturing and preferably further affixed externally with a bar code. Such a bar code enables error free reading of the multi-bit identification and the correct association of the location with the correct multi-bit identification. In another embodiment the multi-bit location data comprises complete physical location information. In another embodiment, in which either an identification code or geographical data may be utilized, the multi-bit location data is loaded at an installation phase by one of a wired and a wireless connection preferably by a dedicated program on a portable computer or through dedicated functionality of a cabling tester. In yet another embodiment the multi-bit location data is transmitted by midspan PSE 940 to each location identifier 852, 854, 856 at installation as an AC signal modulating a voltage, and location information is transmitted by current limited and monitored voltage source 935 to location identifier 858. Location database 870 is provided with a listing of location identifier physical locations and their associated multi-bit location data if required. Interconnect information is not required, since the addition of location identifier 858 serves to fully identify all connects in the channel. Location database 870 may be provided with the listing manually or in connection with an automated or semi-automated installation routine. If any is replaced or physically moved, location database 870 and asset management database 875 are automatically updated.

Midspan PSE 940 receives the multi-bit location data associated with location identifier 852, 854, 856 from each port, and provides the multi-bit location data to location database 870. Thus, location database 870 is provided with both ports of common equipment 30 and location information associated with each TO 890 connected to each port. In the event of an emergency message, the location of the emergency caller is identified via location database 870 utilizing the common equipment port associated with the emergency call and the location information obtained from location identifier 856 of the associated TO 890 via the associated midspan PSE 920 powering port.

Asset management database 875 is provided with a listing of multi-bit location data codes for each of identifier 852, 854 and 856. Preferably, the multi-bit identification for each of identifier 852, 854 and 856 further comprises a port number identifier. Thus, midspan PSE 920 receives a complete listing of port connections between each output port of midspan PSE 920 and TO 890 including the identification of port connections for user patch panel 860 and consolidation point 880. Midspan PSE 920 and current limited and monitored voltage source 935 provides multi-bit identification information associated with each of identifier 852, 854 and 856 to asset management database 875, and thus asset management database 875 is provided with a complete map of all connections in the system. Such a complete map is useful for maintenance, overall asset management, tracking moves adds and changes and enhancing network security by detecting any unauthorized changes which allow unauthorized physical connection.

In an exemplary embodiment, midspan PSE 940 sets the voltage at each port in turn to $V_{pse\_safe}$, and then modulates the voltage with a type address of one of identifier 852, 854 and 856. It is to be understood that for each port only 3 possible location identifiers are connected, and thus only 4 different type addresses are required. Location identifiers 852, 854 and 856 each monitor the voltage on the input port, and in response to sensing voltage $V_{pse\_safe}$, and the type address associated with the type of equipment in which it is installed, responds by modulated the current flow as a result of $V_{pse\_safe}$ as described above in relation to FIGS. 2A-2D. Current limited and monitored voltage source 935 sets the voltage at each port in turn to $V_{pse\_safe}$, and then optionally modulates the voltage with a type address of location identifier 858. Location identifier 858 monitors the voltage on the input port, and in response to sensing voltage $V_{pse\_safe}$, and/or type address associated location identifier 858, responds by modulated the current flow as a result of $V_{pse\_safe}$ as described above in relation to FIGS. 2A-2D. Current limited and monitored voltage source 935 monitors the current flow, and thus detects and decodes the location data transmitted by location identifier 858.

FIG. 7A illustrates a high level block diagram of a VoIP system 950 utilizing the location database of FIGS. 2A, 2B, 6A and 6B in accordance with a principle of the invention. VoIP system 950 comprises a switch, hub, router or bridge 955 comprising a PSE 960, a dynamic host configuration protocol (DHCP) server 962, a location database or LIS 965, a plurality of TOs 240, a plurality of VoIP telephones 970 each comprising a memory 972, a telephone server/gateway 975, a PSTN or IP Network 980, a Public Safety Answering Point (PSAP) 985, and a Private Switch Automatic Location Identification (PS-ALI) database server 990. PSE 960 is in all respects similar to one of midspan PSE 300. 920 or endpoint PSE 220, 830 of FIGS. 2A, 2B, 6A and 6B, respectively and location database 965 represents an instance of location database LIS 270, 870 respectively. PSE 960 may also comprise a current limited and monitored voltage source without exceeding the scope of the invention. Switch, hub, router or bridge 955 represent an instance of common equipment 30, and VoIP telephones 970 represent instances of PDs 260 or DTEs 110 of FIGS. 2A, 2B, 6A and 6B. Location database 965 is also known as an LIS.

Switch, hub, router or bridge 955 is connected to each TO 240, and each TO 240 is connected to a particular VoIP telephone 970. DHCP server 962 is in communication with switch, hub, router or bridge 955 preferably through an IP network. PSE 960 is arranged to power VoIP telephones 970 via respective TO 240, and is here illustrated as an endpoint PSE, however this is not meant to be limiting in any way, and a midspan embodiment is specifically included. PSE 960 is further arranged to supply an appropriate voltage to each TO 240 as has been described above to initiate transmission of a multi-bit location data stored thereon. Location database 950 is in communication with both PSE 960 and switch, hub, router or bridge 955. Switch, hub, router or bridge 955 and location database 965 are in communication with telephone server/gateway 975, and telephone server/gateway 975 is in communication with PSAP 985 via PSTN or IP Network 980. PSAP 985 is in communication with PS-ALI server 990. PS-ALI server 990 and location database 965 are further in communication with IP Network 980, and may communicate with each other over IP Network 980.

In operation, DHCP server 952 senses an attached VoIP telephone 970 and assigns an IP address. DHCP server 952 further queries location database 965 to access location information associated with the port of switch, hub, router or bridge 955 to which VoIP telephone 970 is attached, and downloads to memory 972 of VoIP telephone 970 the location information. In the event that a user, or user agent, initiates an emergency call from a VoIP telephone 970, the location information is transferred with the call initiation request. Telephone server/gateway 975 routes the call to an appropriate PSAP in response to the location information, and further functions to forward the call with the location information. In one embodiment, the call is forwarded with an emergency services query key (ESQK) in the automatic number identification (ANI) field, and the PSAP responsive the ESQK identifies the location for dispatch of emergency services. In one embodiment, the location is identified at least partially with reference to PS-ALI server 990. PS-ALI server 990 may further query location database 965 to receive complete location information based on the ESQK. The above is being described as a single embodiment in which the ESQK is used as a pointer, and PS-ALI server 990 requests further information based thereon due to the limited and constrained information transfer capability of PSTN 980. In another embodiment full information is transferred directly over IP Network 980 in parallel with, or as part of, the emergency call.

Figure 7B:
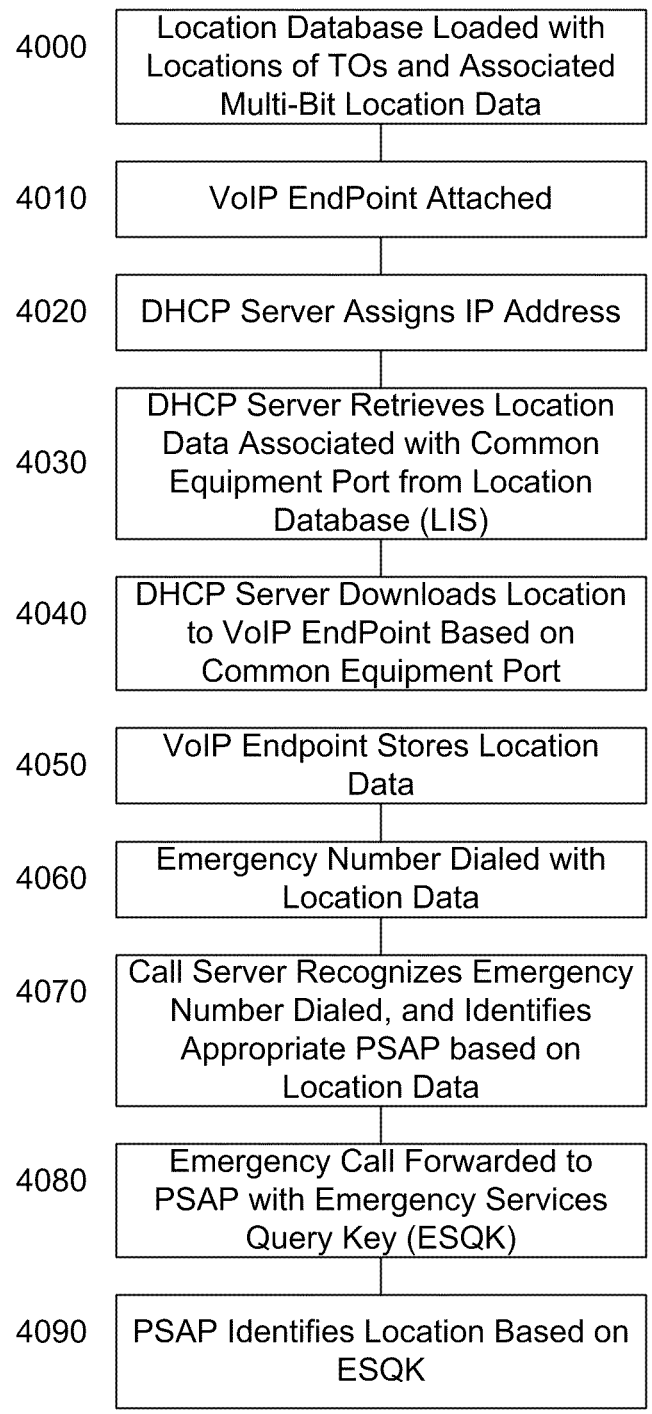
FIG. 7B illustrates a high level flow chart of the operation of the system of FIG. 7A to supply location data for an emergency caller in accordance with a principle of the invention.

FIG. 7B illustrates a high level flow chart of the operation of the system of FIG. 7A to supply location information for an emergency caller in accordance with a principle of the invention. In stage 4000, location database 965, or LIS, is loaded with locations of all TOs 240 in the system, and associated multi-bit location data. The multi-bit location data may be a unique multi-bit identification code, and location database 965 is provided with an association of each of the multi-bit identification codes with a physical location of each of the location identifiers. In another embodiment the multi-bit location data comprises complete physical location information, and thus no further association is required. Preferably, the location data is formatted as a Presence Information Document Format—Location Object (PIDF-LO). In one embodiment the location data comprises a geographic location including without limitation at least some of latitude, longitude, elevation and the datum which identifies the cording system used. In one further embodiment the location data is formatted using the World Geodetic System datum. In another embodiment the location data comprises a civic location constituted of a set of elements that describe detailed street address information. In one ever further embodiment location data comprises security or access information, including but not limited to company name, floor, cubicle or room location and hazardous material information. In one embodiment the multi-bit location data, being constituted of an identification code, is set via switches associated with location identifier of each TO 240. In another embodiment the multi-bit location data for each location identifier is loaded as a unique identifying number drawn from a global numbering pool at manufacturing and preferably further affixed externally with a bar code. Such a bar code enables error free reading of the multi-bit identification and the correct association of the location with the correct multi-bit identification. In another embodiment, in which either an identification code or geographical data may be utilized, the multi-bit location data is loaded at an installation phase by one of a wired and a wireless connection preferably by a dedicated program on a portable computer or through dedicated functionality of a cabling tester. In yet another embodiment the multi-bit location data is transmitted by PSE 960 to each location identifier at installation as an AC signal modulating a voltage. As described above in relation to FIGS. 2A-2D, 4A, 4B and 6A-6C, the multi-bit location data functions to identify the physical location of each VoIP telephone 970 and other sources of emergency calls by at least utilizing the multi-bit location data transmitted by TO 240 responsive to voltage level output by PSE 960.

In stage 4010, a VoIP endpoint is attached, which in an exemplary embodiment is VoIP telephone 970 or computer having VoIP capabilities. In stage 4020, DHCP server 952 assigns the VoIP endpoint attached in stage 4010 an IP address, in a manner known to those skilled in the art. In stage 4030, DHCP server 952 retrieves the location data associated with the TO 240 to which the VoIP endpoint is attached from location database 965. In an exemplary embodiment, the location data is retrieved at least partially by utilizing the port number of switch, hub, router or bridge 955 to which the VoIP endpoint is attached.

In stage 4040, DHCP server 953 downloads the location data retrieved in stage 4030 to the VoIP endpoint attached in stage 4010, and in stage 4050 the downloaded location information is stored in memory 972. In stage 4060, the VoIP endpoint dials, or requests communication with, emergency services. In an exemplary embodiment, emergency services requests are accessed via requesting a voice call to 9-1-1. The request for emergency services is preferably forwarded with the location data downloaded and stored in stage 4040.

In stage 4070 a call server, such as telephone server/gateway 975, recognizes the emergency number dialed, and identifies the appropriate PSAP based on the location information forwarded with the request. In stage 4080, the emergency call is forwarded to the PSAP identified in stage 4070. In one embodiment, the call or request for emergency services, is forwarded with an ESQK in the ANI field. In stage 4090, PSAP 985 receives the request and looks up the location at least partially responsive to the ANI field as is known to those skilled in the art. In one embodiment the physical location data such as street address is found in PS-ALI server 990, and in another embodiment a separate Voice over IP Positioning Center (VPC) is provided which contains a translation between the ESQK and the location data originally stored on location database 965. PSAP 985 is thus operative to identify a physical location of the caller for emergency services personnel. It yet another embodiment PS-ALI server 990 queries location database 965 for full location data.

The above has been described in an embodiment in which a VoIP telephone or other VoIP endpoint receives location information from the DHCP server, however this is not meant to be limiting in any way. Location information may be retrieved by telephone server/gateway 975 from location database 965, or by another server (not shown) without exceeding the scope of the invention. In yet another embodiment, a global positional system (GPS) receiver is further provided in the VoIP endpoint, and provides location information at least partially in response to a location information output of the GPS receiver.

In another embodiment in which the configuration and method of FIGS. 4-5B are preferably utilized, full location information is loaded to identifier transmitting module 640 of TO 240. Operative DTE or PD circuitry, thus receiving full location information form identifier transmitting module 640, is operative to transmit location information with emergency services request without receiving a download of location information from a DHCP server.

Figure 8A:
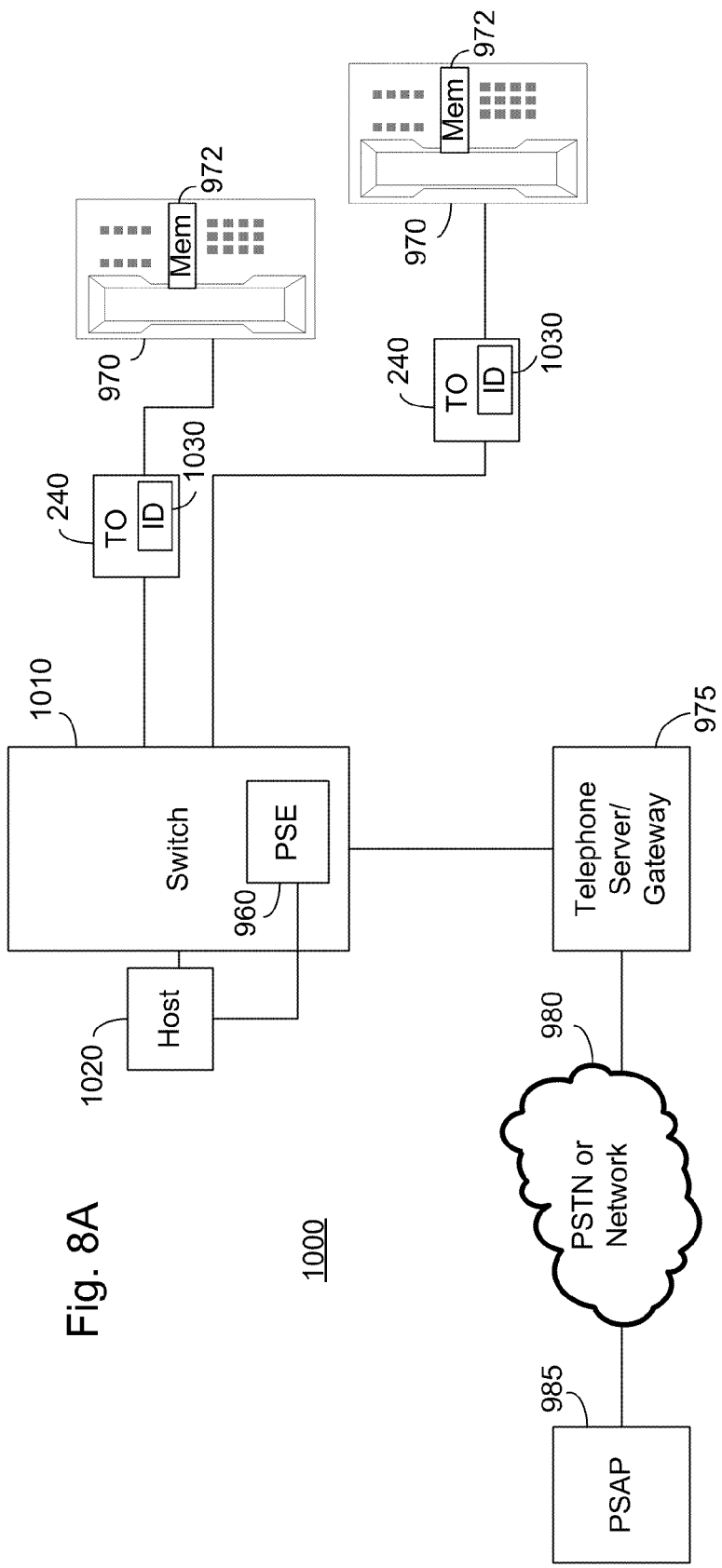
FIG. 8A illustrate a high level block diagram of a VoIP system providing location data to a VoIP endpoint without requiring a database.

FIG. 8A illustrate a high level block diagram of a VoIP system 1000 providing location information to a VoIP endpoint without requiring a database. VoIP system 1000 comprises: a switch 1010 with an associated PSE 960; a switch host 1020; a plurality of TOs 240, each comprising a location identifier 1030; a plurality of VoIP telephones 970 each comprising a memory 972, a telephone server/gateway 975, a PSTN or IP Network 980, and a Public Safety Answering Point (PSAP) 985. PSE 960 is in all respects similar to one of midspan PSE 300, 920 or endpoint PSE 220, 830 of FIGS. 2A, 2B, 6A and 6B, respectively; switch 1010 represents an instance of common equipment 30; and VoIP telephones 970 represent instances of PDs 260 or DTEs 110 of FIGS. 2A, 2B, 6A and 6B.

Switch host 1020 is in communication with switch 1010 and PSE 960, switch 1010 is connected to each TO 240, and each TO 240 is connected to a particular VoIP telephone 970. PSE 960 is arranged to power VoIP telephones 970 via respective TO 240, and is here illustrated as an endpoint PSE, however this is not meant to be limiting in any way, and a midspan embodiment is specifically included. PSE 960 is further arranged to supply an appropriate voltage to each TO 240 as has been described above, and in particular but without limitation in relation to FIG. 5C, to initiate transmission of multi-bit location information stored thereon. Switch 1010 is in communication with telephone server/gateway 975, and telephone server/gateway 975 is in communication with PSAP 985 via PSTN or IP Network 980. Location identifier 1030 may represent an instance of one of location identifier 250 of FIGS. 2A, 2B, location identifier 615 of FIG. 4A or location identifier 856 of FIGS. 6A, 6B without exceeding the scope of the invention.

In operation, PSE 960 regularly sets the output voltage to each TO 240 in turn to $V_{pse\_safe}$. In one embodiment location identifier 1030 of TO 240, responsive to $V_{pse\_safe}$ operates as described above in relation to FIG. 5C to transmit the location information stored thereon to VoIP telephone 970 for storage in memory 972. In another embodiment location identifier 1030, responsive to $V_{pse\_safe}$ or a classification voltage, operates as described above in relation to one of FIGS. 2C, 2D, and 6C to transmit the location information to PSE 960. PSE 960 is further operative to detect, optionally classify and power VoIP telephone 970 via the communication cabling associated with a respective TO 240. Alternatively, VoIP telephone 970 is locally powered, and PSE 960 not recognizing a signature resistance, does not attempt to power VoIP telephone 970 via the communication cabling. VoIP telephone 970 thus operatively receives the location information stored in memory 972, or in an embodiment in which PSE 960 receives the location information, switch host 1020 upon detection of VoIP telephone 970 transmits the received location information by Ethernet or IP data transmission to VoIP telephone 970 for storage in memory 972. Location information may be left stored on memory 972 or transferred to another memory location within VoIP telephone 970 without exceeding the scope of the invention.

In the event that a user, or user agent, initiates an emergency call from a VoIP telephone 970, the location information is transferred with the call initiation request. Telephone server/gateway 975 routes the call to an appropriate PSAP in response to the location information, and further functions to forward the call with the location information. In one embodiment, the call is forwarded with an emergency services query key (ESQK) in the automatic number identification (ANI) field, and the PSAP responsive the ESQK identifies the location for dispatch of emergency services. In another embodiment the location information is forwarded via an IP link to the PSAP, and thus the PSAP is notified of the location of the requester of emergency services.

Figure 8B:
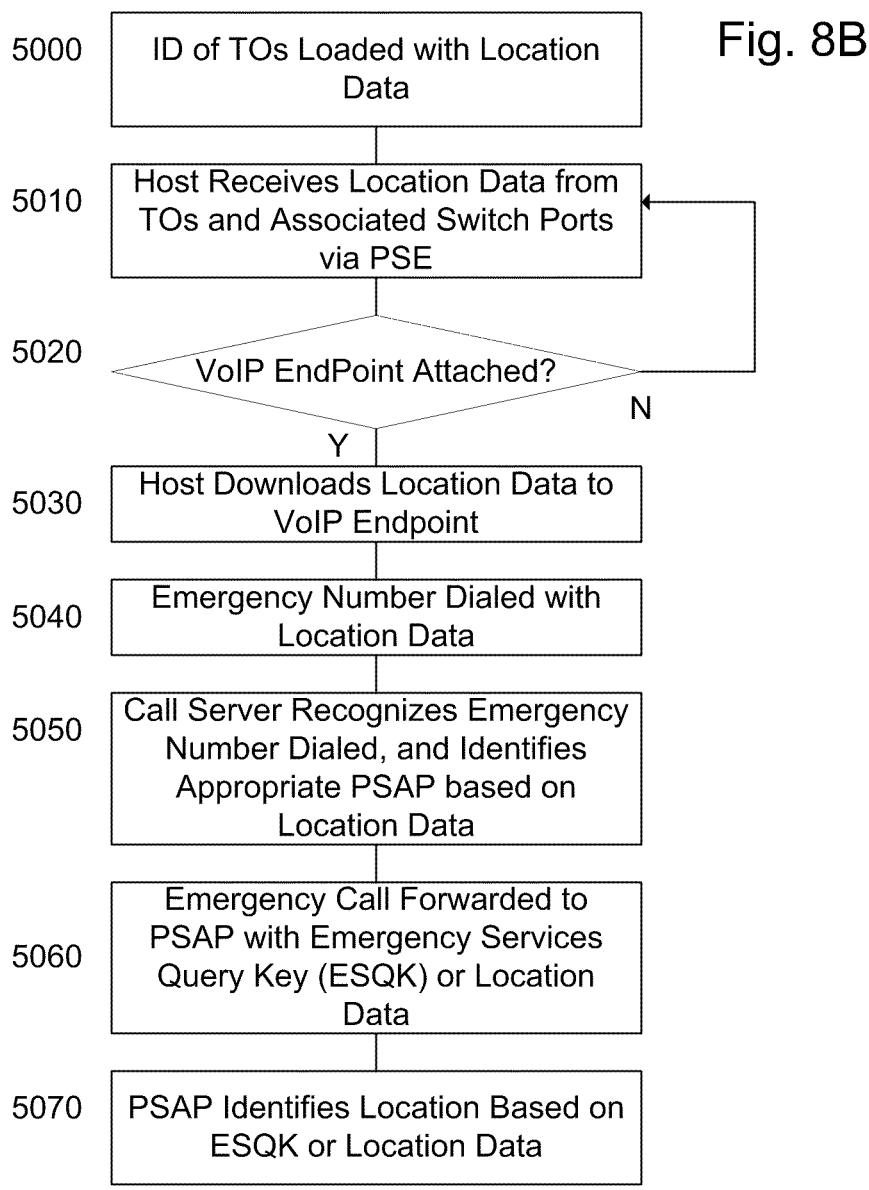
FIG. 8B illustrates a high level flow chart of the operation of the system of FIG. 8A to supply location data to the VoIP endpoint from the switch host, and for use by the VoIP endpoint in placing a call for emergency services.

FIG. 8B illustrates a high level flow chart of the operation of the system of FIG. 8A to supply location information from switch host 1020 to the VoIP endpoint, and for use by the VoIP endpoint in placing a call for emergency services. As described VoIP telephone 970 describes an instance of a VoIP endpoint, and the operation will now be described in relation to VoIP telephone 970, however this is not meant to be limiting and is merely by way of an example.

In stage 5000, each TO 240 within system 1000 is loaded with, or set to contain, multi-bit location data. The multi-bit location data comprises complete physical location information. Preferably, the location data is formatted as a Presence Information Document Format—Location Object (PIDF-LO). In one embodiment the location data comprises a geographic location including without limitation at least some of latitude, longitude, elevation and the datum which identifies the cording system used. In one further embodiment the location data is formatted using the World Geodetic System datum. In another embodiment the location data comprises a civic location constituted of a set of elements that describe detailed street address information. In one ever further embodiment location data comprises security or access information, including but not limited to company name, floor, cubicle or room location and hazardous material information. In one embodiment the multi-bit location data is loaded at an installation phase by one of a wired and a wireless connection preferably by a dedicated program on a portable computer or through dedicated functionality of a cabling tester. Any updates caused by moving a TO 240 are similarly accomplished as incurred.

In stage 5010 switch host 1020 receives location information from each TO 240 within system 1000. In an exemplary embodiment each TO 240 transmits its location information responsive to $V_{pse\_safe}$ or a classification voltage from PSE 960, and the transmitted location information is received by PSE 960 and transferred to switch host 1020. Switch host 1020 is operative as described above in relation to FIGS. 2C, 2D and 6C to associate powering ports of PSE 960, the received location information, and the data ports of switch 1010 to which the TO 240 and VoIP telephone 970 is connected so as to correctly associate the location information received from a respective TO 240 with the VoIP telephone 970 connected thereto.

In stage 5020, switch host 1020 ascertains if a VoIP endpoint, such as VoIP telephone 970 has been attached to a respective TO 240 and is thus connected to system 1000. It is to be understood that in the event VoIP telephone 970 is to be powered over the communication cabling, PSE 960 will further operate to identify, optionally classify and power VoIP telephone 970. In the event that VoIP telephone 970 has not been attached, stage 5010 is repeated. It is to be noted that if powering is not required PSE 960 may be a current limited and monitored voltage source.

In the event that in stage 5020 a VoIP telephone 970 has been detected as attached, in stage 5030 switch host 1020 downloads location information received in stage 5010 to the VoIP telephone 970 detected in stage 5020 and the information is stored in memory 972. In stage 5040, a user utilizing VoIP telephone 970 dials, or requests communication with, emergency services. In an exemplary embodiment, emergency services requests are accessed via requesting a voice call to 9-1-1. The request for emergency services is preferably forwarded with the location information downloaded in stage 5030 and stored in memory 972.

In stage 5050 a call server, such as telephone server/gateway 975, recognizes the emergency number dialed, and identifies the appropriate PSAP based on the location information forwarded with the request and a database of PSAPs according to location. In stage 5060, the emergency call is forwarded to the PSAP identified in stage 5050. In one embodiment, the call or request for emergency services, is forwarded with an ESQK in the ANI field, the ESQK being generated to relay the location information over legacy E-9-1-1 equipment. In another embodiment the location information is directly transferred along with the call request. In stage 5070, PSAP 985 receives the request and looks up the location at least partially responsive to the ANI field and provides the location information to emergency service personnel. In one embodiment a VPC (not shown) is provided which contains a translation between the ESQK and the location information found in switch host 1020. In an embodiment in which the location information is forwarded to PSAP 985, the forwarded location information is provided to emergency services personnel. PSAP 985 is thus operative to identify a physical location of the caller for emergency services personnel.

Figure 8C:
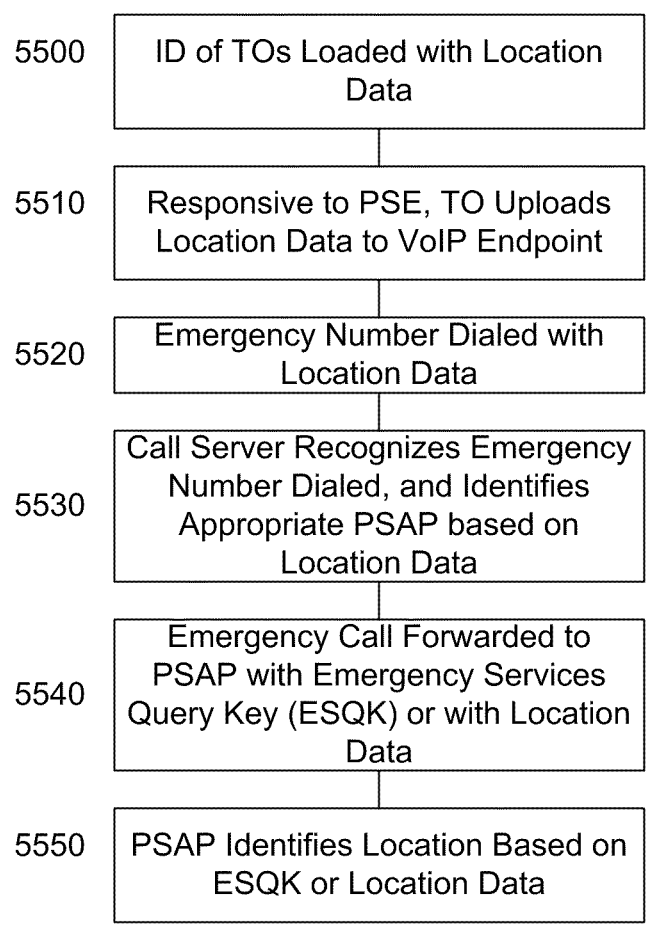
FIG. 8C illustrates a high level flow chart of the operation of the system of FIG. 8A to supply location data directly to the VoIP endpoint from the TO, and for use by the VoIP endpoint in placing a call for emergency services.

FIG. 8C illustrates a high level flow chart of the operation of the system of FIG. 8A to supply location information directly to the VoIP endpoint from the TO, and for use by the VoIP endpoint in placing a call for emergency services. As described VoIP telephone 970 describes an instance of a VoIP endpoint, and the operation will now be described in relation to VoIP telephone 970, however this is not meant to be limiting and is merely by way of an example.

In stage 5500, each TO 240 within system 1000 is loaded with location information. The multi-bit location data comprises complete physical location information. Preferably, the location data is formatted as a Presence Information Document Format—Location Object (PIDF-LO). In one embodiment the location data comprises a geographic location including without limitation at least some of latitude, longitude, elevation and the datum which identifies the cording system used. In one further embodiment the location data is formatted using the World Geodetic System datum. In another embodiment the location data comprises a civic location constituted of a set of elements that describe detailed street address information. In one ever further embodiment location data comprises security or access information, including but not limited to company name, floor, cubicle or room location and hazardous material information. In one embodiment the multi-bit location data is loaded at an installation phase by one of a wired and a wireless connection preferably by a dedicated program on a portable computer or through dedicated functionality of a cabling tester. Any updates caused by moving a TO 240 are similarly accomplished as incurred.

In stage 5510, each TO 240 responsive to a received $V_{pse\_safe}$ from a respective PSE 960, transmits location information stored in stage 5500 to a connected VoIP telephone 970, and the transmitted information is stored in memory 972. Optionally, VoIP telephone 970 is further operational to transmit the location information to one of switch host 1020 of FIG. 8A or location database 965 of FIG. 7A.

In stage 5520, a user utilizing VoIP telephone 970 dials, or requests communication with, emergency services. In an exemplary embodiment, emergency services requests are accessed via requesting a voice call to 9-1-1. The request for emergency services is preferably forwarded with the location information received in stage 5510 and stored in memory 972.

In stage 5530 a call server, such as telephone server/gateway 975, recognizes the emergency number dialed, and identifies the appropriate PSAP based on the location information forwarded with the request and a database of PSAPs according to location. In stage 5540, the emergency call is forwarded to the PSAP identified in stage 5530. In one embodiment, the call or request for emergency services, is forwarded with an ESQK in the ANI field, the ESQK being generated to relay the location information over legacy E-9-1-1 equipment. In another embodiment the location information is directly transferred along with the call request. In stage 5550, PSAP 985 receives the request and looks up the location at least partially responsive to the ANI field and provides the location information to emergency service personnel. In one embodiment a VPC (not shown) is provided which contains a translation between the ESQK and the location information found in switch host 1020 or location database 965 of FIG. 7A. In an embodiment in which the location information is forwarded to PSAP 985, the forwarded location information is provided to emergency services personnel. PSAP 985 is thus operative to identify a physical location of the caller for emergency services personnel.

Figure 9:
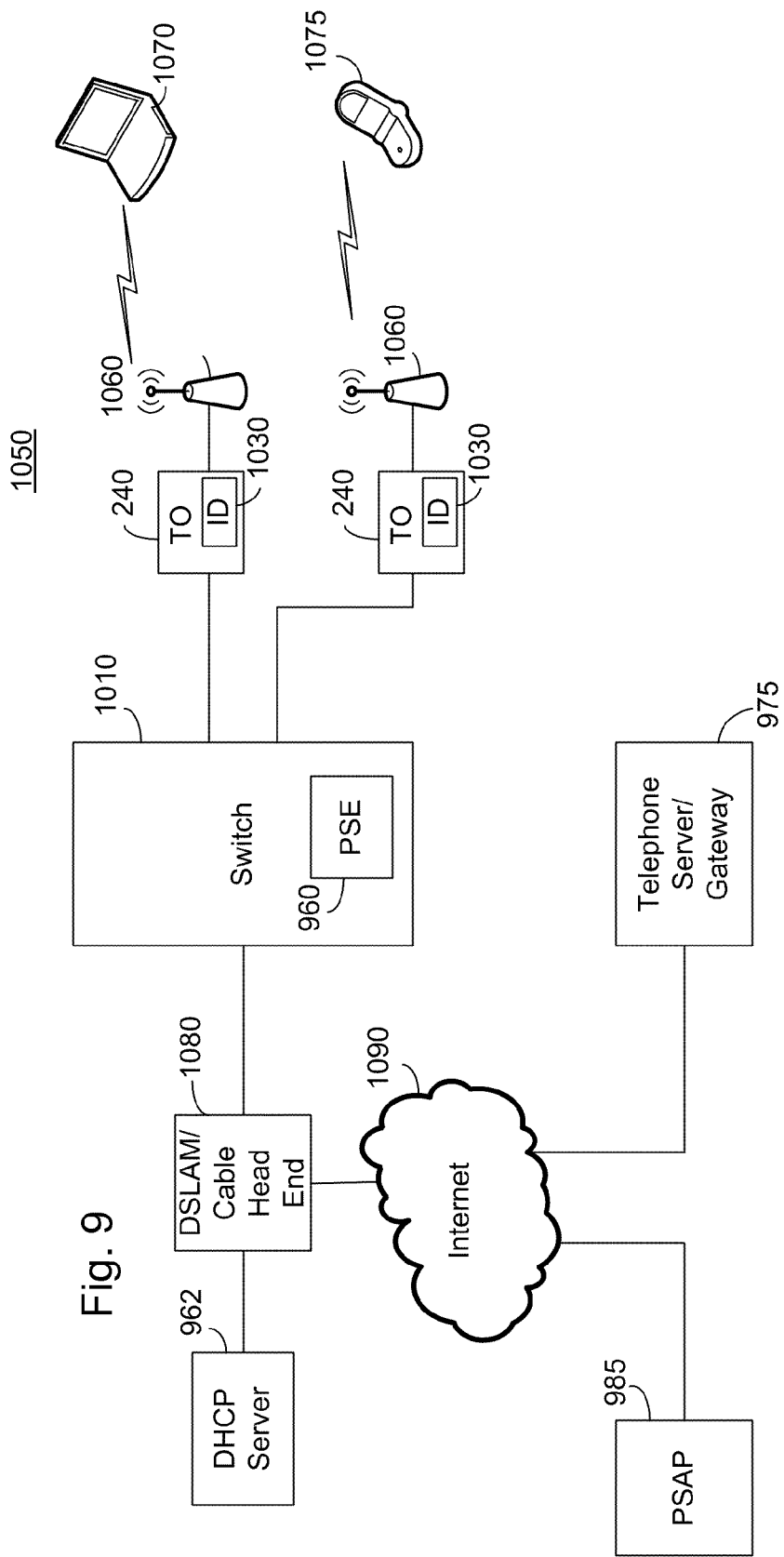
FIG. 9 illustrates a high level block diagram of a system according to the invention exhibiting wireless access points and a distributed architecture according to the principle of the invention.

FIG. 9 illustrates a high level block diagram of a system 1050 according to the invention exhibiting wireless access points and a distributed architecture according to the principle of the invention. System 1050 comprises a switch, hub, router or bridge 1010 comprising a PSE 960, a plurality of TOs 240 each comprising a location identifier 1030, a plurality of wireless access points 1060, a portable computer 1070, a cellular telephone 1075, a dynamic host configuration protocol (DHCP) server 962, a digital subscriber line access multiplexer (DSLAM) or cable head end 1080, an Internet 1090, a telephone server/gateway 975, and a PSAP 985. DSLAM/Cable head end 1080 is connected to switch 1010 via a cable or ADSL connection, and DHCP server 962 is arranged to provide provisioning for switch 1010. DSLAM/Cable head end 1080 is connected to Internet 1090, PSAP 985 and telephone server gateway 975 are similarly connected via Internet 1090. Each TO 240 is connected to switch 1010 and is further connected to a wireless access point 1060. Portable computer 1070 and cellular telephone 1075 are each within wireless access range of a wireless access point 1060. PSE 960 is in all respects similar to one of midspan PSE 300, 920 or endpoint PSE 220, 830 of FIGS. 2A, 2B, 6A and 6B, respectively. PSE 960 may also comprise a current limited and monitored voltage source without exceeding the scope of the invention.

PSE 960 may power wireless access points 1060 via respective TO 240, and is here illustrated as an endpoint PSE, however this is not meant to be limiting in any way. PSE 960 is further arranged to supply an appropriate voltage to each TO 240 as has been described above to initiate transmission of a multi-bit location data stored thereon. PSE 960 is arranged as a node to switch 960 and communicates with each wireless access point 1060.

In operation DCHP server assigns an IP address to switch 1010 and DSLAM/cable head end 1080 provides Internet access to Internet 1090 to switch 1010. Telephone server/gateway 975 provides telephone service to switch 1010 and all nodes connected thereto. Location identifier 1030 of each TO 240 within system 1050 is loaded with, or set to contain, multi-bit location data. The multi-bit location data comprises complete physical location information. Preferably, the location data is formatted as a Presence Information Document Format—Location Object (PIDF-LO). In one embodiment the location data comprises a geographic location including without limitation at least some of latitude, longitude, elevation and the datum which identifies the cording system used. In one further embodiment the location data is formatted using the World Geodetic System datum. In another embodiment the location data comprises a civic location constituted of a set of elements that describe detailed street address information. In one ever further embodiment location data comprises security or access information, including but not limited to company name, floor, cubicle or room location and hazardous material information. In one embodiment the multi-bit location data is loaded at an installation phase by one of a wired and a wireless connection preferably by a dedicated program on a portable computer or through dedicated functionality of a cabling tester. Any updates caused by moving a TO 240 are similarly accomplished as incurred.

As described above, responsive to a voltage signal from PSE 960, each location identifier 1030 transmits stored location data to PSE 960. Each device connected thereto, such as portable computer 1070 and cellular telephone 1075 accesses PSE 960 and uploads respective location data. In the event that a user, or user agent, initiates an emergency call the location information is transferred with the call initiation request. Telephone server/gateway 975 routes the call to an appropriate PSAP in response to the location information and a PSAP location databaase, and further functions to forward the call with the location information.

Figure 10:
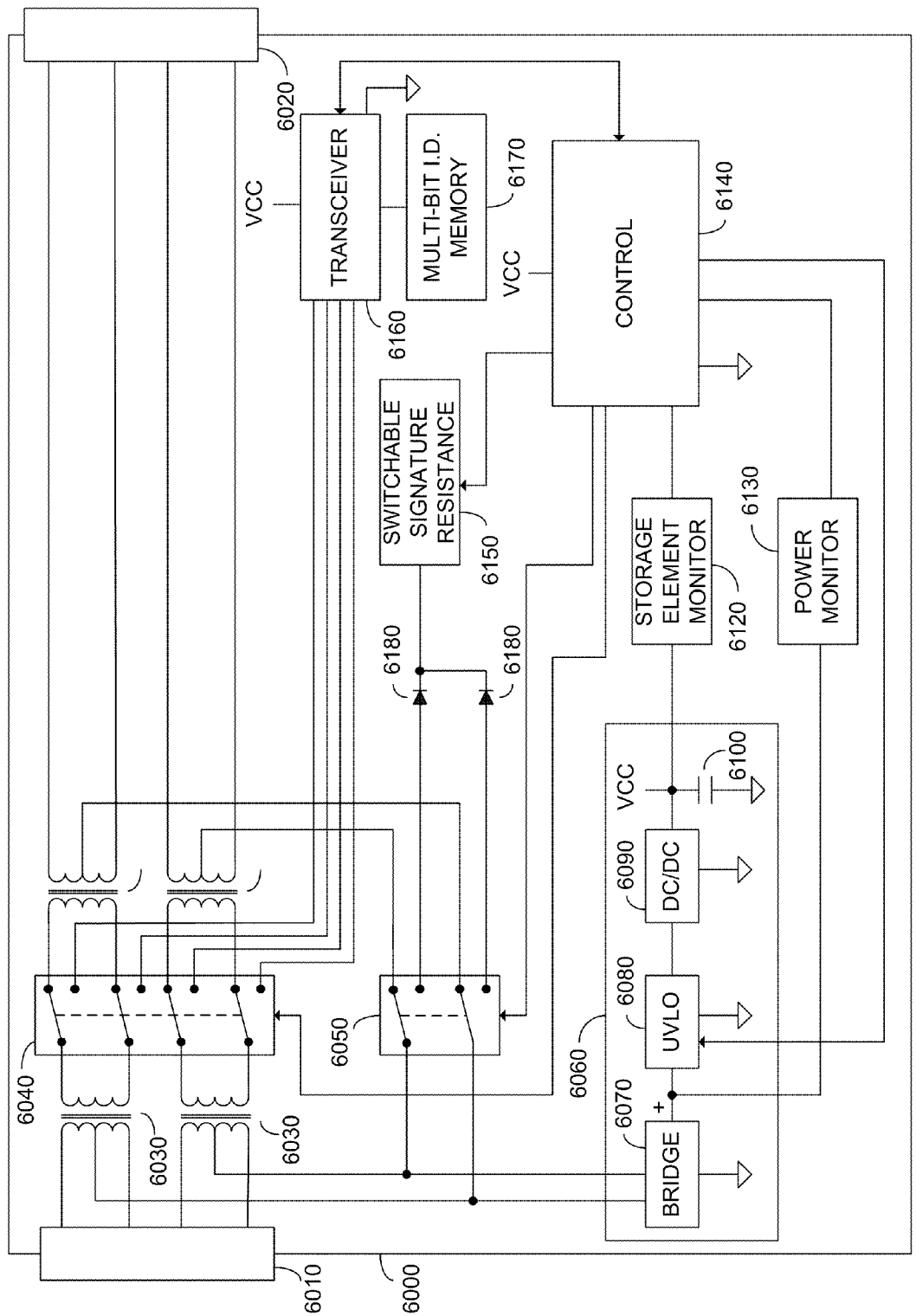
FIG. 10 illustrates a high level schematic diagram of an embodiment of a TO comprising a switchable connection between a network side connection and a data terminal side connection arranged for operation in cooperation with a PSE of the prior art.

FIG. 10 illustrates a high level schematic diagram of an embodiment of a TO 6000, arranged for operation in cooperation with a PSE of the prior art, comprising a switchable connection between a network side connection and a data terminal side connection. TO 6000 comprises: a network side connection 6010, arranged for connection by horizontal cabling to towards common equipment as described above in relation to FIGS. 1A, 1B, 2A and 2B; a data terminal side connection 6020 arranged for pluggable connection to a DTE as described above in relation to FIGS. 1A, 1B, 2A and 2B; a first, second, third and fourth data transformer 6030; a four pole switch 6040; a two pole switch 6050; a power supply 6060 comprising a bridge circuit 6070, and under voltage lockout (UVLO) circuit 6080, a DC/DC converter 6090 and an electrical storage element 6100 illustrated as an output capacitor 6100, one terminal of output capacitor 6100 defining a voltage point VCC; a storage element monitor 6120; a power monitor 6130; a control circuitry 6140; a switchable signature resistance 6150; a transceiver 6160; a memory 6170 arranged to store multi-bit identification information; and a first and second diode 6180. The combination of first, second, third and fourth data transformer 6030; four pole switch 6040; two pole switch 6050; power supply 6060; storage element monitor 6120; power monitor 6130; control circuitry 6140; switchable signature resistance 6150; transceiver 6160; memory 6170; and first and second diode 6180 form a location identifier, as will be described further hereinto below.

Network side connection 6010 comprises a plurality of connections for individual wires of horizontal cabling, and typically comprises 8 connections. While network side connection 6010 typically comprises 8 connections, only 4 connections are described herein, typically associated with conductors 1, 2, 3 and 6. In one embodiment conductors 4, 5, 7 and 8 are passed through from network side connection 6010 to like terminals of data terminal side connection 6020. In an alternative embodiment an additional 4 pole switch is provided (not shown) for switchable connection of conductors 4, 5, 7 and 8 between network side connection 6010 and like terminals of data terminal side connection 6020. In such an alternative embodiment, operation of the additionally supplied switch is in all respects similar to the operation of 4 pole switch 6040, to be described further hereinto below. In one particular implementation of such an alternative embodiment, a single 8 pole switch is provided in place of two 4 pole switches. In yet another embodiment, one or more of four pole switch 6040 and two pole switch 6050 are replaced by Ethernet switches, without exceeding the scope.

A first two connections of network side connection 6010, typically associated with conductors 1 and 2, are respectively connected to opposing ends of a first winding of first data transformer 6030. A second two connections of network side connection 6010, typically associated with conductors 3 and 6, are respectively connected to opposing ends of a first winding of second data transformer 6030. A first end of a second winding of first data transformer 6030 is connected to a first pole of 4 pole switch 6040 and a second end of the second winding of first data transformer 6030 is connected to a second pole of 4 pole switch 6040. A first end of a second winding of second data transformer 6030 is connected to a third pole of 4 pole switch 6040 and a second end of the second winding of second data transformer 6030 is connected to a fourth pole of 4 pole switch 6040. The poles of 4 pole switch 6040 are ganged together, as illustrated by the dashed line connection.

A first terminal of the first pole of 4 pole switch 6040 is connected to a first end of a first winding of third data transformer 6030, and a second terminal of the first pole of 4 pole switch 6040 is connected to a respective output of transceiver 6160. A first terminal of the second pole of 4 pole switch 6040 is connected to a second end of the first winding of third data transformer 6030, and a second terminal of the second pole of 4 pole switch 6040 is connected to a respective output of transceiver 6160. A first terminal of the third pole of 4 pole switch 6040 is connected to a first end of a first winding of fourth data transformer 6030, and a second terminal of the first pole of 4 pole switch 6040 is connected to a respective output of transceiver 6160. A first terminal of the fourth pole of 4 pole switch 6040 is connected to a second end of the first winding of fourth data transformer 6030, and a second terminal of the fourth pole of 4 pole switch 6040 is connected to a respective output of transceiver 6160.

A center tap connection of the first winding of first data transformer 6030 is connected to a respective input of bridge circuit 6070 and to a first pole of 2 pole switch 6050. A center tap connection of the first winding of second data transformer 6030 is connected to a respective input of bridge circuit 6070 and to a second pole of 2 pole switch 6050. A first terminal of the first pole of 2 pole switch 6050 is connected to a center tap of a second winding of third data transformer 6030. A first terminal of the second pole of 2 pole switch 6050 is connected to a center tap of a second winding of fourth data transformer 6030.

A first two connections of data terminal side connection 6020, typically associated with conductors 1 and 2, are respectively connected to opposing ends of the second winding of third data transformer 6030. A second two connections of data terminal side connection 6020, typically associated with conductors 3 and 6, are respectively connected to opposing ends of the second winding of fourth data transformer 6030.

The second terminal of the first pole of 2 pole switch 6050 is connected via first diode 6180 to switchable signature resistance 6150, and the second terminal of the second pole of 2 pole switch 6050 is connected via second diode 6180 to switchable signature resistance 6050. Thus the second terminal of the first pole of 2 pole switch 6050 is connected in a wired OR arrangement with the second terminal of the second pole of 2 pole switch 6050. In an alternative embodiment, a full bridge circuit is supplied in place of first and second diodes 6180.

The positive output of full bridge circuit 6070 is connected to the input of UVLO circuit 6080 and to the input of power monitor 6130, and the output of UVLO circuit 6080 is connected to the input of DC/DC converter 6090. The output of DC/DC converter 6090 is connected to a first end of output capacitor 6100 and to the input of storage element monitor 6120. The output of storage element monitor 6120 is connected to a respective input of control circuitry 6140. The output of power monitor 6130 is connected to a respective input of control circuitry 6140. The first end of output capacitor 6100, which as indicated above defines voltage point VCC is connected to respective inputs of transceiver 6160 and control circuitry 6140. The return of full bridge circuit 6070 is connected to a common point, and each of UVLO circuit 6080, DC/DC converter 6090, a second end of output capacitor 6100, control circuitry 6140 and transceiver 6160 are respectively connected thereto. Memory 6170 is in communication with transceiver 6160. Respective outputs of control circuitry 6140 are connected to the control input of 4 pole switch 6040, the control input of 2 pole switch 6050, the control input of switchable signature resistance 6150 the control input of transceiver 6160 and the control input of UVLO circuit 6080.

In operation, memory 6170 is loaded with multi-bit identification data. In one embodiment an MAC address or other identification information is loaded into memory 6170, and in another embodiment location data is loaded into memory 6170 as described above in relation to any of location identifiers 250, 850, 852, 854 and 856 and multi-bit location data storage 470. Switchable signature resistance 6150 is enabled and connected to network side connection 6010 by 2 pole switch 6050 responsive to control circuitry 6140. In an exemplary embodiment 2 pole switch 6050 is a bistable switch, and switchable signature resistance 6150 is arranged to present a predetermined signature resistance in the absence of an affirmative signal from control circuitry 6140. UVLO circuit 6080 is similarly enabled, and preferably is arranged to be functional in the in the absence of an affirmative disabling signal from control circuitry 6140.

A PSE, such as one of endpoint PSE 40 or midspan PSE 170 as described above in relation to FIGS. 1A, 1B is supplied and performs detection, and optional classification, upon switchable signature resistance 6150, with polarity assured by the operation of first and second diodes 6180. After one of endpoint PSE 40 or midspan PSE 170 performs detection, and optional classification upon switchable signature resistance 6150, in the event that sufficient power is available, one of endpoint PSE 40 or midspan PSE 170 raises the voltage towards an operating voltage, typically in excess of 30 volts, with the voltage appearing as a differential between the respective center tap connections of the first windings of first and second data transformers 6030. Bridge circuit 6070 functions to ensure that polarity is set irrespective of the connection condition of the one of endpoint PSE 40 or midspan PSE 170. UVLO circuit 6080 is set to close an isolating switch responsive to the one of endpoint PSE 40 or midspan PSE 170 raising the voltage towards the operating voltage, in particular responsive to the voltage of the received power exceeding a minimum operating level, thus passing voltage from bridge circuit 6070 to DC/DC converter 6090. It is to be noted that in the event that a PD is connected to data terminal side connection 6020, no power is received by the PD due to the operation of 2 pole switch 6050.

Once DC/DC converter 6090 receives an input voltage from UVLO circuit 6080, power is generated at the output of DC/DC converter 6090 charging up output capacitor 6100, and generating operating voltage VCC, thus powering control circuitry 6140 and transceiver 6160. Control circuitry 6140 is operative to read the output of storage element monitor 6120 to determine if output capacitor 6100 is charged above a predetermined minimum level, indicating the power is successfully received from one of endpoint PSE 40 or midspan PSE 170.

In the event that control circuitry 6140 determines that output capacitor 6100 is charged above the predetermined minimum level, control circuitry 6140 is operative to set 4 pole switch 6040 to connect transceiver 6160 to first and second data transformers 6030, thus connecting transceiver 6160 to network side connection 6010. Preferably, the operation of 4 pole switch 6040 is operative to disconnect data terminal side connection 6020 from network side connection 6010. Control circuitry 6140 is further operative to disable switchable signature resistance 6150, preferably by asserting a signal. The above is described in an embodiment in which switchable signature resistance 6150 may be disabled, however this is not meant to be limiting in any way, and a signature resistance which can not be disabled may be substituted for switchable signature resistance 6150 without exceeding the scope.

Control circuitry is further operative to enable transceiver 6160 to broadcast the multi-bit information stored in memory 6170. Preferably, transmitter 6106 is operative to perform a handshake with responding network equipment, and communicate success of the broadcast transaction to control circuitry 6140.

Control circuitry 6140, responsive the success of the broadcast transaction of transceiver 6160, disables transceiver 6160, disables UVLO circuit 6080, thus reducing the current draw of power supply 6060 to near zero. It is to be noted that upon dropping power draw below a pre-determined minimum, the one of endpoint PSE 40 or midspan PSE 170 is programmed to shut of power towards TO 6000 after a pre-determined time period. Control circuitry 6140, powered by energy stored in output capacitor 6100, monitors the voltage provided by one of endpoint PSE 40 or midspan PSE 170, via power monitor 6130, to ensure that the one of endpoint PSE 40 or midspan PSE 170 has disconnected power. In one particular embodiment, power monitor 6130 is operative to compare the voltage at the output of bridge circuit 6070 with a threshold level indicative that power from one of endpoint PSE 40 or midspan PSE 170 has been disabled. In an exemplary embodiment the threshold level is less than the minimum operating level voltage described above in relation to UVLO circuit 6080.

Upon detection, via power monitor 6130, that power from one of endpoint PSE 40 or midspan PSE 170 has been disconnected, control circuitry 6140 is operative to set 4 pole switch 6040 to connect network side connection 6010 to data terminal side connection 6020, preferably further disconnecting transceiver 6160 from network side connection 6010. Control circuitry 6140 is further operative to set 2 pole switch 6050 to respectively connect the center taps of the first windings of first and second data transformers 6030 to the center taps of the second windings of third and second data transformers 6030, thus disconnecting switchable signature resistance 6150 from network side connection 6010. Thus, in the event of a subsequent detection from one of endpoint PSE 40 or midspan PSE 170 connected to network side connection 6010, detection and subsequent powering will occur in relation to a PD connected to data terminal side connection 6020. There is no requirement that a PD be actually connected to data terminal side connection 6020.

Control circuitry 6140 is further operative to monitor the status of the charge on output capacitor 6100 via storage element monitor 6120, and in the event that power is below a predetermined maximum discharge level, control circuitry 6140 is operative to enable UVLO circuit 6080. Thus, in the event that a PD is actually connected to data terminal side connection 6020, a negligible amount of power is drawn by power supply 6060, as it charges up output capacitor 6100 to again be above the predetermined minimum level. Control circuitry is operative, as described above, to monitor the charge on output capacitor 6100. In the event that capacitor 6100 charges up to the predetermined minimum level, control circuitry is again operative to disable UVLO circuit 6080.

In the event a PD is not actually connected to data terminal side connection 6020, no power will be available for DC/DC converter 6090. Control circuitry 6140 monitors the charge on output capacitor 6100, and in the event that within a predetermined time period the charge on output capacitor 6100 has not reached the predetermined minimum level, control circuitry 6100 is operative to connect switchable signature resistance 6150 to network side connection 6010 via the operation of 2 pole switch 6050, and enable switchable signature resistance 6150. In an alternative embodiment, storage element monitor 6120 is operative to report a rate of charge on output capacitor 6100, and in the event that the rate of charge is below a predetermined minimum charging rate, control circuitry 6100 is operative to connect switchable signature resistance 6150 to network side connection 6010 via the operation of 2 pole switch 6050, and enable switchable signature resistance 6150. As described above, a PSE connected to network side connection 6010 will detect enabled switchable signature resistance 6150 and provide power to charge up output capacitor 6100. In such an embodiment, there is no requirement to retransmit the multi-bit data stored on memory 6170.

In the event that control circuitry 6140 is unable to charge capacitor 6100 to the predetermined minimum level, for example due to the failure of one of endpoint PSE 40 or midspan PSE 170 to supply power, preferably control circuitry 6100 is operative to transmit a failure broadcast via transceiver 6160 before the power on capacitor 6100 falls below a critical level, wherein power for transceiver 6160 or control circuitry 6140 is no longer supported.

In one embodiment, one of endpoint PSE 40 or midspan PSE 170 is arranged to periodically shut down power to all PDs. Upon restart of the PSE, TO 6000 is operative as described above to broadcast the multi-bit information stored in memory 6170.

Information broadcast by transceiver 6160 is received by network equipment, such as by DHCP server 962, as described above in relation to FIGS. 7A and 9, by a dedicated manager (not shown), or by telephone server/gateway 975 as described above in relation to FIGS. 7A, 8A and 9. Information broadcast by transceiver 6160 may conform to the address resolution protocol (ARP) as defined by RFC 826 of the Internet Engineering Task Force, or to the Neighbor Discovery Protocol as defined by RFC 4861 of the Internet Engineering Task Force without exceeding the scope. It is to be understood that communication is thus preferably in accordance with IEEE802.3, and does not require the use of common mode signaling described above in relation to FIGS. 2A-3C. In an exemplary embodiment, the location information, including the port of the common equipment connected thereto is used to update the information stored on location database 120, as described above in relation to FIGS. 1A, 2A, thus automatically updating location database 120. In the event of a VoIP call, telephone server/gateway 975 routes the call to an appropriate PSAP in response to the location information, and further functions to forward the call with the location information.

The above has been described in an embodiment in which capacitor 6100 monitored by storage element monitor 6120 is connected to the output of DC/DC converter 6090, however this is not meant to be limiting in any way. In an alternative embodiment, a capacitor is placed at the input to DC/DC converter 6090, and storage element monitor 6120 is arranged to monitor the charge across the input capacitor. DC/DC converter 6090 is thus operative at all times.

The above has been described in an embodiment in which the identification information is stored in the TO, however this is not meant to be limiting in any way. In another embodiment, the identification information is stored in the transition or consolidation point, such as consolidation point 90 of FIGS. 2A-2B. In such an embodiment a listing of wiring connections between each port of consolidation point 90 and the respective TO is maintained in a table uploaded to the location database, such as any of location database 270, 870, 965. Additionally, multiple ports may share a common control circuitry, such as control circuitry 6140. Advantageously, changes in wiring between consolidation point 90 and the respective TO are relatively infrequent. In yet another embodiment, the identification information is stored in user patch panel 60 of FIGS. 2A-2B. In such an embodiment a listing of wiring connections between each port of user patch panel 60 and the respective TO is maintained in a table uploaded to the location database, such as any of location database 270, 870, 965. Additionally, multiple ports may share a common control circuitry, such as control circuitry 6140. Advantageously, changes in wiring between patch panel 60 and the respective TO are relatively infrequent.

Figure 11:
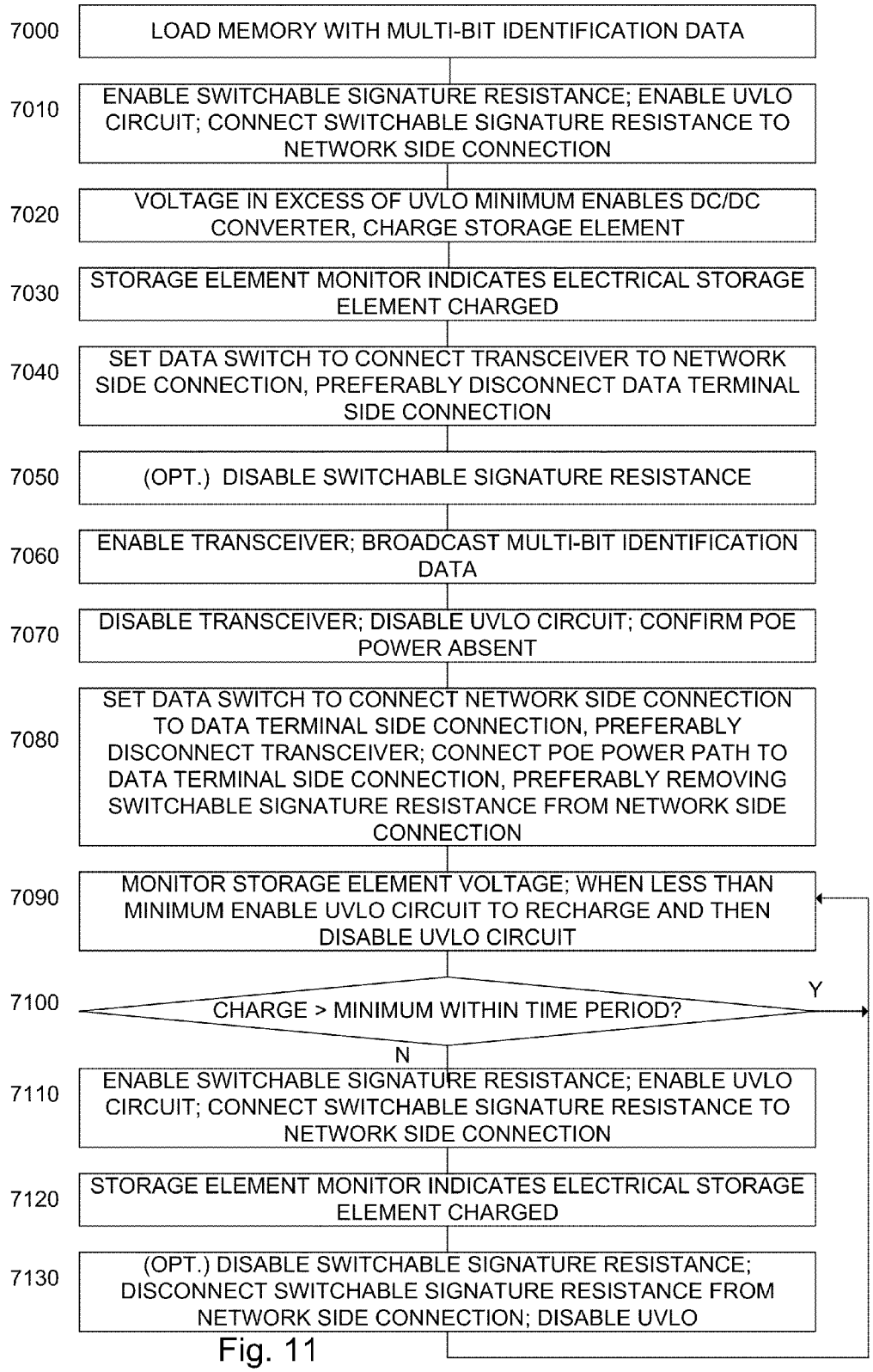
FIG. 11 illustrates a high level flow chart of the method of operation of TO of FIG. 10.

FIG. 11 illustrates a high level flow chart of the method of operation of TO 6000 of FIG. 10. In stage 7000, memory 6170 is loaded with, or set to contain, multi-bit identification data. The multi-bit location data may be a unique multi-bit identification code, and location database 120 is further provided with an association of each of the multi-bit identification codes with a physical location of each of the location identifiers. In another embodiment the multi-bit location data comprises complete physical location information. Preferably, the location data is formatted as a Presence Information Document Format—Location Object (PIDF-LO). In one embodiment the location data comprises a geographic location including without limitation at least some of latitude, longitude, elevation and the datum which identifies the cording system used. In one further embodiment the location data is formatted using the World Geodetic System datum. In another embodiment the location data comprises a civic location constituted of a set of elements that describe detailed street address information. In one ever further embodiment location data comprises security or access information, including but not limited to company name, floor, cubicle or room location and hazardous material information. In one embodiment the multi-bit location data for each TO 6000 is loaded as a unique identifying number drawn from a global numbering pool at manufacturing and preferably further affixed externally with a bar code. Such a bar code enables error free reading of the multi-bit identification and the correct association of the location with the correct multi-bit identification. In another embodiment the multi-bit location data comprises complete physical location information. In another embodiment, in which either an identification code or geographical data may be utilized, the multi-bit location data is loaded at an installation phase by one of a wired and a wireless connection preferably by a dedicated program on a portable computer or through dedicated functionality of a cabling tester.

In stage 7010 a signature resistance is enabled. In an exemplary embodiment, switchable signature resistance 6150 is enabled and connected to network side connection 6010 via the operation of 2 pole switch 6050. A UVLO circuit, such as UVLO circuit 6080 is enabled.

In stage 7020, responsive to the operation of one of endpoint PSE 40 and midspan PSE 170 to detect the enabled signature resistance of stage 7010, optional classify the power needs, and provide operating power, the enabled UVLO of stage 7010 receives power exhibiting a voltage in excess of a predetermined minimum operating level, and the provided UVLO thus enables and forwards the received power to a DC/DC converter. The DC/DC converter is operative to output a power of a predetermined voltage and charge a storage element, such as output capacitor 6100. There is no requirement for a DC/DC converter to be supplied, and the power may be passed directly to charge the storage element without exceeding the scope. Alternatively, the storage element may be provided at the input side of a DC/DC converter without exceeding the scope.

In stage 7030 the charge state of the storage element of stage 7020 is monitored, such as by storage element monitor 6120, and a signal indicative that the storage element of stage 7020 is charged above a predetermined limit is output. In stage 7040, responsive to the output signal indicative that the storage element of stage 7020 is charged above a predetermined limit, a data switch, such as 2 pole switch 6050, is set to connect a transceiver, such as transceiver 6160, to the network side connection. Preferably, the switch of stage 7040 is further operative to disconnect the data terminal side connection from the network side connection, thus removing any parallel impedance and network conflict issues.

In optional stage 7050, the signature resistance of stage 7010 is disabled, to preferably reduce any load on the received power. In stage 7060, a transceiver is enabled, such as transceiver 6160, the enabled transceiver broadcasting the multi-bit identification data of stage 7000. Preferably, the transceiver is arranged to receive an acknowledgement of the broadcast from the respective network equipment. In one embodiment a DCHP server provides acknowledgement, in another embodiment a dedicated server, preferably associated with location database 120, provide acknowledgement, and another embodiment an ARP server provides acknowledgement, and in yet another embodiment a telephone server/gateway provides acknowledgement. It is to be understood that communication is preferably in accordance with IEEE802.3, and does not require the use of common mode signaling described above in relation to FIGS. 2A-3C.

In stage 7070, preferably responsive to the received acknowledgement, the transceiver of stage 7060 is disabled, the UVLO circuit of stage 7010 is disabled thus disabling any load from the supplying PSE, or at a minimum reducing the power drawn to be less than that required for a maintain power signature. The supplying PSE, in the absence of a valid maintain power signature, is operative to remove power within a predetermined time period. Removal of power is confirmed by voltage received at the network side connection from the PSE falling below a threshold level. In an exemplary embodiment the threshold level is less than the minimum operating level voltage described above in relation to stage 7020.

In stage 7080, responsive to the confirmation of stage 7070, data transfer between the network side connection and the data terminal side connection is switchable connected, such as by the operation of 4 pole switch 6040, preferably further disconnecting the transceiver of stage 7040. A power connection for power over Ethernet is established between the network side connection and the data terminal side connection, in an exemplary embodiment by the operation of 2 pole switch 6050 described above in relation to stage 7010, preferably disconnecting the switchable signature resistance of stage 7010 from the network side connection.

In stage 7090 the charge level of the storage element of stage 7030 is monitored. In the event that the charge level of the storage element fall to a predetermined maximum discharge level, the UVLO circuit of stage 7020, or the DC/DC converter, is enabled thus charging the storage element of stage 7020 to be above the predetermined minimum level. The UVLO circuit is then again disabled.

In stage 7100 the charge level of the storage element of stage 7020 is monitored to ensure that the charge of the storage element rises above the predetermined minimum level within a predetermined time period or above a predetermined rate of charging. In the event that the charge of the storage element rises above the predetermined minimum level within the predetermined time period or above the predetermined rate of charging, stage 7090 is repeated.

In the event that the charge of the storage element does not rise above the predetermined minimum level within the predetermined time period or the rate of charging is less than the predetermined rate of charging, indicative that power over Ethernet is not actively being supplied, in stage 7110 the signature resistance of stage 7010 is enabled and connected to the network side connection, and the UVLO circuit is enabled, as described above in relation to stage 7010. In stage 7120, responsive to the operation of one of endpoint PSE 40 and midspan PSE 170 to detect the enabled signature resistance of stage 7110, optional classify the power needs, and provide operating power, the enabled UVLO of stage 7110 receives power exhibiting a voltage in excess of a predetermined minimum operating level, and the provided UVLO thus enables and forwards the received power to the DC/DC converter, thus charging the storage element of stage 7020. The charge state of the storage element of stage 7020 is monitored, such as by storage element monitor 6120, and a signal indicative that the storage element of stage 7020 is charged above a predetermined limit is output.

In stage 7130, optionally the signature resistance of stage 7110 is disabled. A power connection for power over Ethernet is established between the network side connection and the data terminal side connection, in an exemplary embodiment by the operation of 2 pole switch 6050 described above in relation to stage 7010, preferably disconnecting the switchable signature resistance of stage 7110 from the network side connection. The UVLO circuit of stage 7110 is disabled thus disabling any load from the supplying PSE, or at a minimum reducing the power drawn to be less than that required for a maintain power signature.

In the event that power over Ethernet is disconnected, such as by a failure of the connected PSE, as described above in relation to stage 7100, and as detected by a power monitor, preferably the method of FIG. 11 is performed on restart at stage 7010, as described above.

Thus, the present embodiments enable a system and method for identifying the physical location of a DTE connected in a local area network by providing a location identifier associated with each TO. The location identifier is loaded with multi-bit location data. A current limited voltage source associated with a floor distributor, and preferably further associated with either a common equipment of the floor distributor or a midspan device, is further provided. The location identifier, responsive to a pre-determined voltage level, or a signal, from the current limited voltage source transmits the multi-bit location data. In an exemplary embodiment the current limited voltage source is a PSE.

In one embodiment the TO is provided with a network side connection adapted to be connected to a networking device via horizontal cabling and a data terminal side connection adapted to be connected to a data terminal equipment. A control circuitry, memory and a transmitter are further provided, the control circuitry in communication with the transmitter, and the transmitter in communication with the memory. A switch is provided, responsive to the control circuitry, the switch arranged in a first mode to allow for data passage from the network side connection to the data terminal side connection, and in a second mode to connect the transmitter to the network side connection, preferably by disconnecting the data terminal side connection. The control circuitry is arranged to monitor characteristics of electric power available from the network side connection, and control the switch to connect the transmitter to the network side connection, and enable operation of the transmitter responsive to a predetermined condition of the electric power. The transmitter, when enabled, is operative to transmit multi-bit identifying information stored in the memory towards the network side connection. In an exemplary embodiment the predetermined condition of the electric power is indicative of a power sourcing equipment associated with power over Ethernet transitioning from a detection and/or classification mode to supplying power.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. No admission is made that any reference constitutes prior art. The discussion of the reference states what their author's assert, and the applicants reserve the right to challenge the accuracy and pertinency of the cited documents. It will be clearly understood that, although a number of prior art complications are referred to herein, this reference does not constitute an admission that any of these documents forms part of the common general knowledge in the art in any country.

In the claims of this application and in the description of the invention, except where the context requires otherwise due to express language or necessary implication, the word "comprise" or variations such as "comprises" or "comprising" is used in any inclusive sense, i.e. to specify the presence of the stated features but not to preclude the presence or addition of further features in various embodiments of the invention.

In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description and which are not in the prior art.

We claim:

1. A telecommunications outlet providing location identification in a local area network, the telecommunications outlet comprising:
    a network side connection adapted to be connected to a networking device via horizontal cabling;
    a data terminal side connection adapted to be connected to a data terminal equipment;
    a control circuitry;
    a memory adapted for storage of multi-bit data;
    a transmitter in communication with said memory; and
    a first switch responsive to said control circuitry, said first switch arranged in a first mode to connect data from said network side connection to said data terminal side connection and in a second mode to connect data from said transmitter to said network side connection and disconnect data from said network side connection to said data terminal side connection.

2. The telecommunications outlet of claim 1, wherein said network side connection comprises a first pair of center tapped data transformers, and wherein the telecommunications outlet further comprises:
a power supply coupled to the respective center taps of said first pair of data transformers, said power supply comprising an energy storage element; and
an energy storage element monitor,
the output of said energy storage element monitor in communication with said control circuitry.

3. The telecommunication outlet of claim 2, wherein said control circuitry arranged, responsive to a first condition of said output of said energy storage element monitor, to:
set said first switch to said second mode; and
operate said transmitter to transmit said multi-bit data.

4. The telecommunication outlet of claim 2, further comprising:
a power monitor coupled to the respective center taps of said first pair of data transformers, the output of said power monitor coupled to said control circuitry,
wherein said control circuitry is arranged, responsive to a condition of the output of said power monitor, to set said first switch to said first mode.

5. The telecommunications outlet of claim 2, wherein said power supply further comprises and under voltage lockout circuit arranged to disable said power supply in the event that the voltage differential across the respective center taps of said first pair of data transformers is less than a predetermined level.

6. The telecommunications outlet of claim 2, further comprising a second switch responsive to said control circuitry, wherein said data terminal side connection comprises a second pair of center tapped data transformers, said second switch arranged in a first mode to connect respective center taps of said first pair of center tapped data transformers to respective center taps of said second pair of center tapped data transformers.

7. The telecommunications outlet of claim 6, further comprising a signature resistance circuit, said second switch arranged in a second mode to connect respective center taps of said first pair of center tapped data transformer to said signature resistance circuit.

8. The telecommunications outlet of claim 7, wherein said second switch is further arranged in said second mode to disconnect respective center taps of said first pair of center tapped data transformers from respective center taps of said second pair of center tapped data transformers.

9. The telecommunications outlet of claim 7, wherein said signature resistance circuit is responsive to a first value of a control signal from said control circuitry to present a signature resistance toward said first pair of center tapped data transformers when said second switch is in said second mode.

10. The telecommunications outlet of claim 6, wherein said signature resistance circuit is responsive to a second value of said control signal from said control circuitry, said second value different from said first value, to not present said signature resistance toward said first pair of center tapped data transformers when said second switch is in said second mode.

11. The telecommunications outlet of claim 2, wherein said power supply is responsive to an output of said control circuitry, and wherein said control circuitry is arranged, responsive to a second condition of said output of said energy storage element monitor, to enable said power supply.

12. The telecommunications outlet of claim 11, further comprising:
a second switch responsive to said control circuitry; and
a signature resistance circuit,
wherein:
said data terminal side connection comprises a second pair of center tapped data transformers;
said second switch is arranged in a first mode to connect respective center taps of said first pair of center tapped data transformers to respective center taps of said second pair of center tapped data transformers and in a second mode to connect respective center taps of said first pair of center tapped data transformer to said signature resistance circuit; and
said control circuitry is arranged, responsive to a third condition of said output of said energy storage element monitor, to set said second switch to said second mode and enable said power supply.

13. A method of providing location related multi-bit data from a telecommunications outlet, the method comprising:
providing a network side connection;
providing a data terminal side connection;
providing a transmitter; and
arranging a first switch in a first mode to connect data from the network side connection to the data terminal side connection and in a second mode to connect data from said provided transmitter to the network side connection and disconnect data from the network side connection to the data terminal side connection.

14. The method of claim 13, further comprising:
switchably presenting a signature resistance towards said network side connection.

15. The method of claim 13, further comprising:
switchably presenting a signature resistance towards said provided network side connection; and
disabling power flow from said provided network side connection to said provided data terminal side connection.

16. The method of claim 13, further comprising:
providing a power supply comprising an energy storage element;
monitoring the charge status of the energy storage element; and
responsive to a first condition of the monitored charge status:
setting said first switch to said second mode; and
transmitting multi-bit data from the transmitter.

17. The method of claim 16, further comprising:
disabling said provided power supply;
confirming an absence of power received via the provided network side connection; and
setting said first switch to said first mode.

18. The method of claim 17, further comprising:
enabling power flow from said provided network side connection to said provided data terminal side connection.

19. The method of claim 18, further comprising:
monitoring the charge status of the energy storage element; and
responsive to a second condition of the monitored charge status:
enabling said provided power supply.

20. The method of claim 19, further comprising in the event that said enabling of said provided power supply does not change the monitored charge status to be above a predetermined minimum level within a predetermined time period,
switchably presenting a signature resistance towards said provided network side connection.

21. A telecommunications unit providing location identification in a local area network, the telecommunications unit comprising:
- a network side connection adapted to be coupled to a networking device;
- a data terminal side connection adapted to be coupled to a data terminal equipment;
- a control circuitry;
- a memory adapted for storage of multi-bit data;
- a transmitter in communication with said memory; and
- a first switch responsive to said control circuitry, said first switch arranged in a first mode to connect data from said network side connection to said data terminal side connection and in a second mode to connect data from said transmitter to said network side connection and disconnect data from said network side connection to said data terminal side connection.

* * * * *